US008388200B2

(12) United States Patent
Kojima et al.

(10) Patent No.: US 8,388,200 B2
(45) Date of Patent: Mar. 5, 2013

(54) VEHICLE LIGHT WITH VALUES CORRESPONDING TO THE CIE COLOR SPACE

(75) Inventors: Shinichi Kojima, Tokyo (JP); Masafumi Ohno, Tokyo (JP); Yasushi Kita, Tokyo (JP); Takako Minoda, Tokyo (JP); Naoko Takenobu, Tokyo (JP); Susumu Nakamura, Tokyo (JP); Norikatsu Myojin, Tokyo (JP); Takashi Sato, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 155 days.

(21) Appl. No.: 12/929,641

(22) Filed: Feb. 4, 2011

(65) Prior Publication Data

US 2011/0273897 A1 Nov. 10, 2011

(30) Foreign Application Priority Data

Feb. 4, 2010 (JP) ................................ 2010-023388
Feb. 8, 2010 (JP) ................................ 2010-025829
Feb. 8, 2010 (JP) ................................ 2010-025830

(51) Int. Cl.
*B60Q 1/00* (2006.01)
*F21V 1/00* (2006.01)
*F21V 11/00* (2006.01)

(52) U.S. Cl. ......................... 362/510; 362/459; 362/509

(58) Field of Classification Search ....................... None
See application file for complete search history.

(56) References Cited

U.S. PATENT DOCUMENTS

| | | | | |
|---|---|---|---|---|
| 7,316,493 | B2 * | 1/2008 | Kinoshita | 362/539 |
| 7,387,417 | B2 | 6/2008 | Sazuka et al. | |
| 2007/0047250 | A1 | 3/2007 | Kinoshita | |

FOREIGN PATENT DOCUMENTS

| | | | |
|---|---|---|---|
| JP | 11-273407 | A | 10/1999 |
| JP | 2005-141919 | A | 6/2005 |
| JP | 2007-59162 | A | 3/2007 |
| JP | 2008-78086 | A | 4/2008 |

* cited by examiner

*Primary Examiner* — Natalie Walford
(74) *Attorney, Agent, or Firm* — Kenealy Vaidya LLP

(57) ABSTRACT

A vehicle light can improve the visibility (noticeability) for pedestrians, roadside obstructs, other vehicles and the like in actual traffic environments. The vehicle light can be configured to project light beams with a predetermined white color, and can include a light source with a color temperature range of 4500 K to 7000 K. The light source emits light beams including four color light beams represented by four coordinate values of predicted colors including red, green, blue and yellow in the a* b* coordinate system corresponding to the CIE 1976 L*a*b* color space. The four coordinate values in the a* b* coordinate system can be encompassed by respective circle areas having a radius of, for example, 5, and each having center coordinate values of (41.7, 20.9) for red, (−39.5, 14.3) for green, (8.8, −29.9) for blue and (−10.4, 74.2) for yellow, for example.

31 Claims, 74 Drawing Sheets

Fig. 3A Group 1 (test subject: three persons, Mr. H, Mr. C, Mr. W)
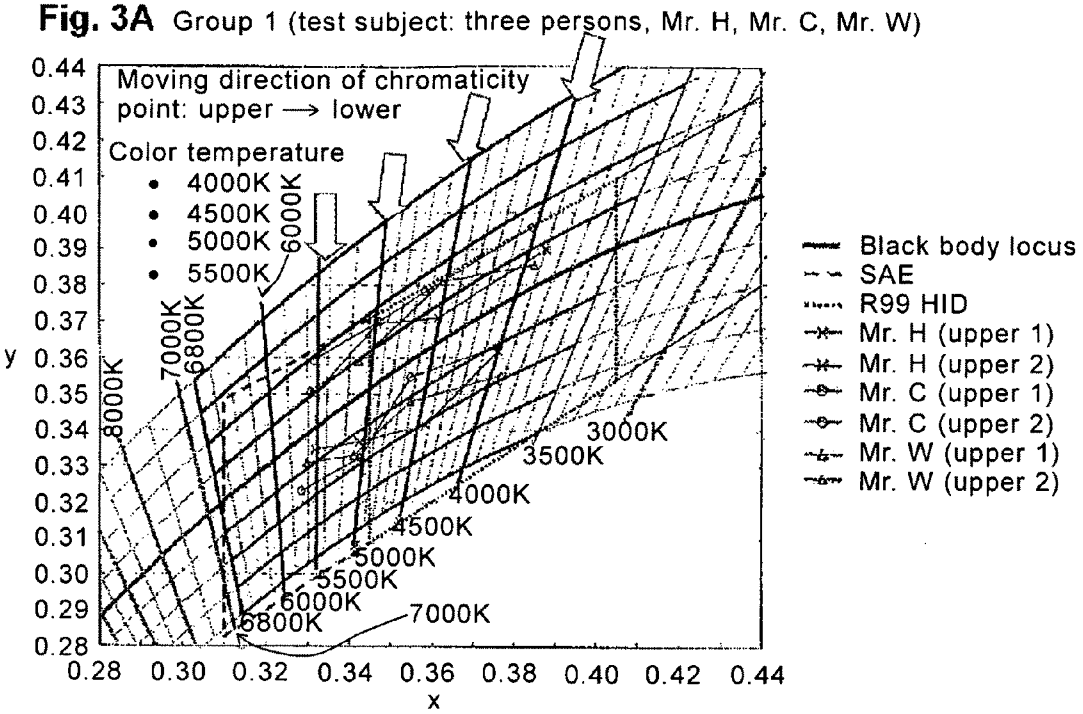
Fig. 3B Group 2 (test subject: three persons, Mr. K, Mr. S, Mr. A)
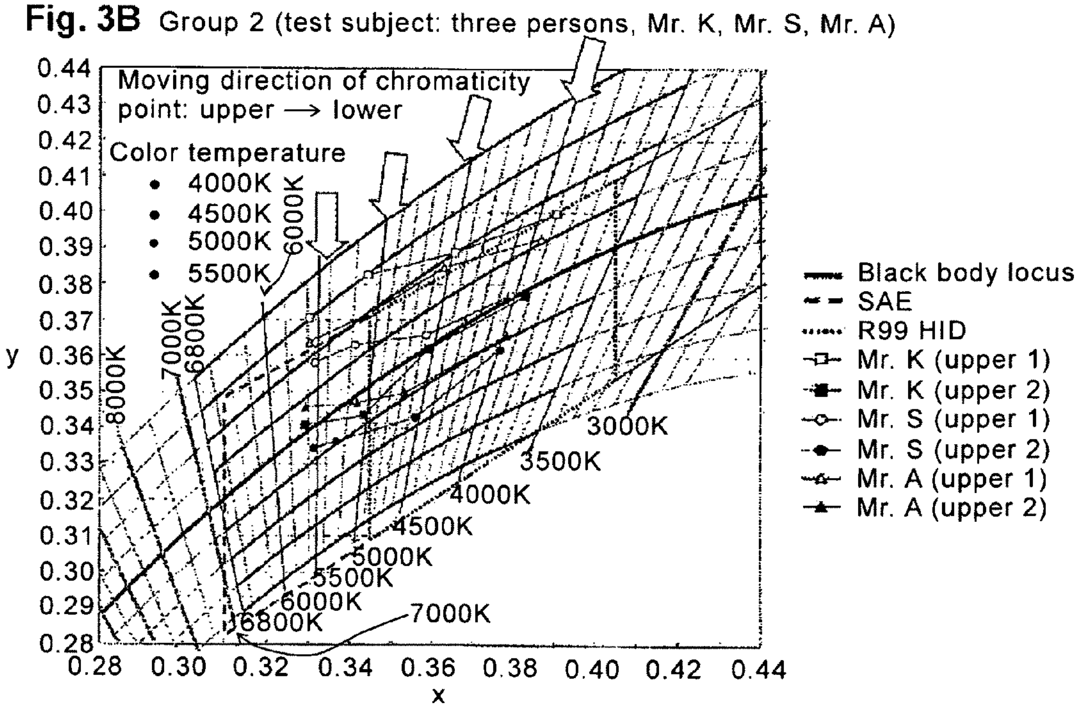

Fig. 4A Group 1 (test subject: three persons, Mr. H, Mr. C, Mr. W)
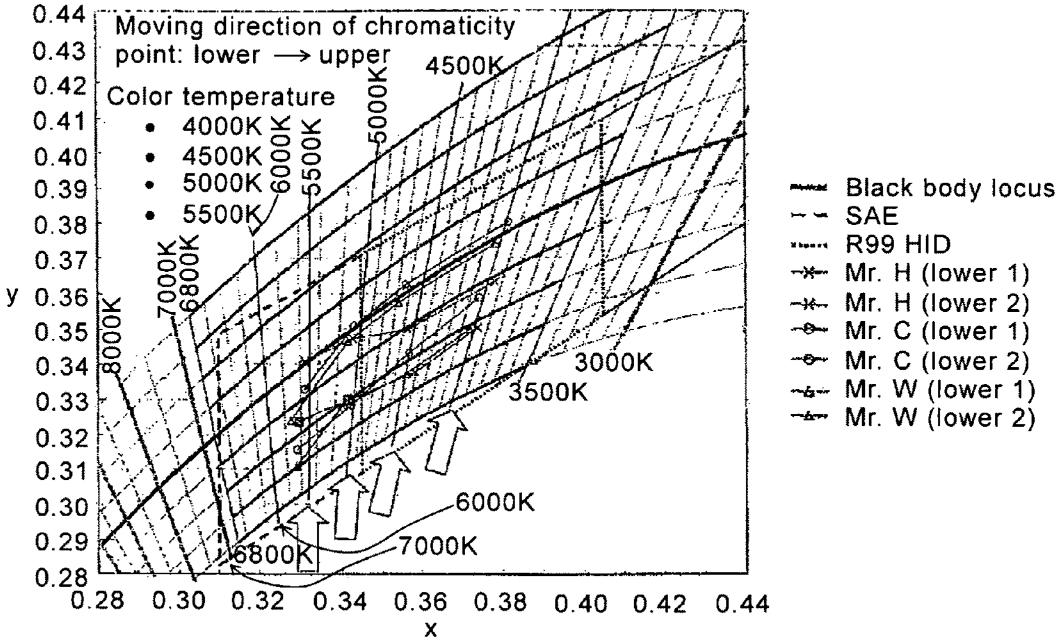
Fig. 4B Group 2 (test subject: three persons, Mr. K, Mr. S, Mr. A)
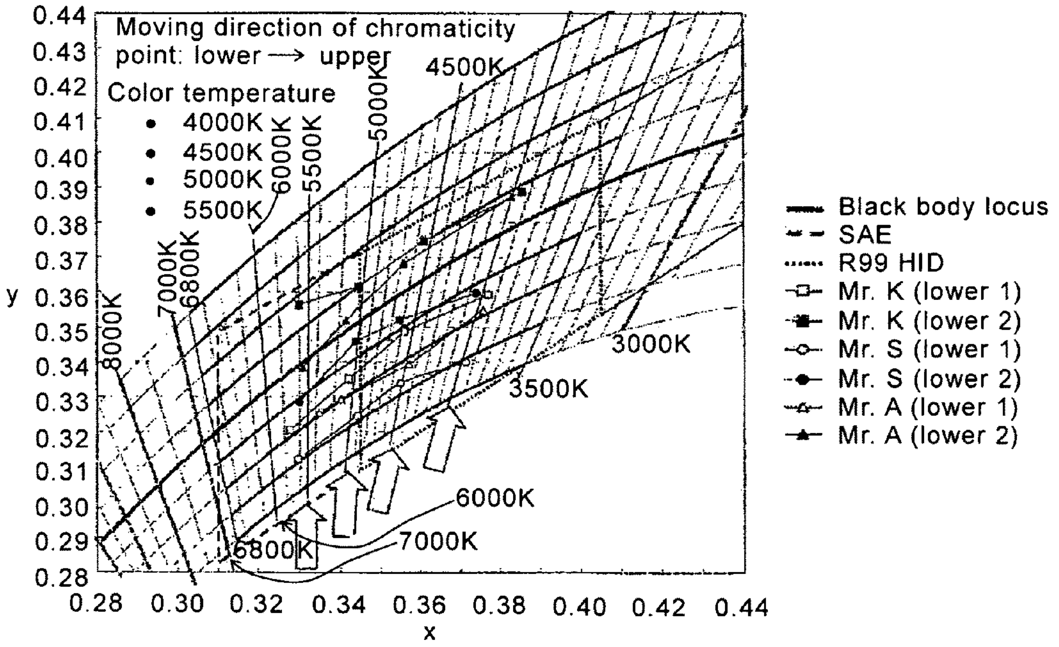

Fig. 5A Group 1 (test subject: three persons, Mr. H, Mr. C, Mr. W)
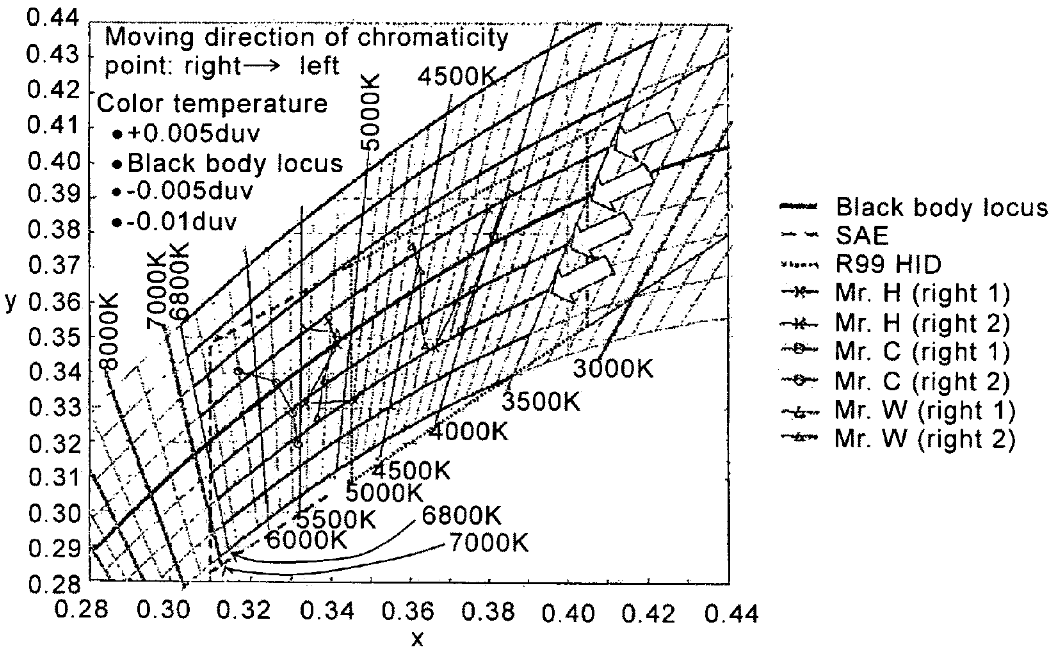
Fig. 5B Group 2 (test subject: three persons, Mr. K, Mr. S, Mr. A)
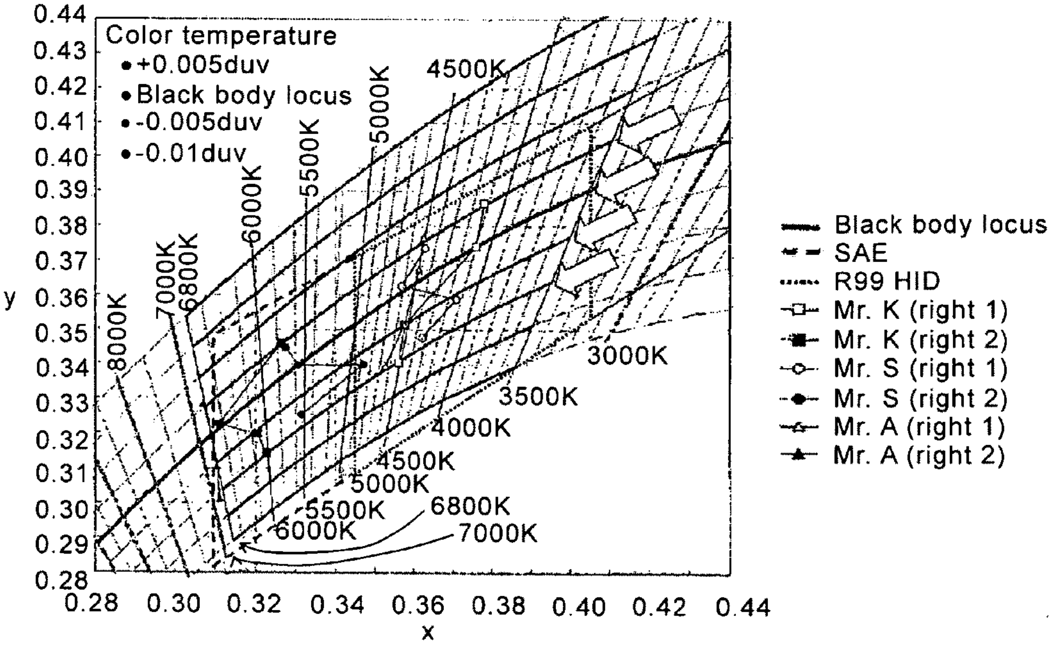

Fig. 6A Group 1 (test subject: three persons, Mr. H, Mr. C, Mr. W)
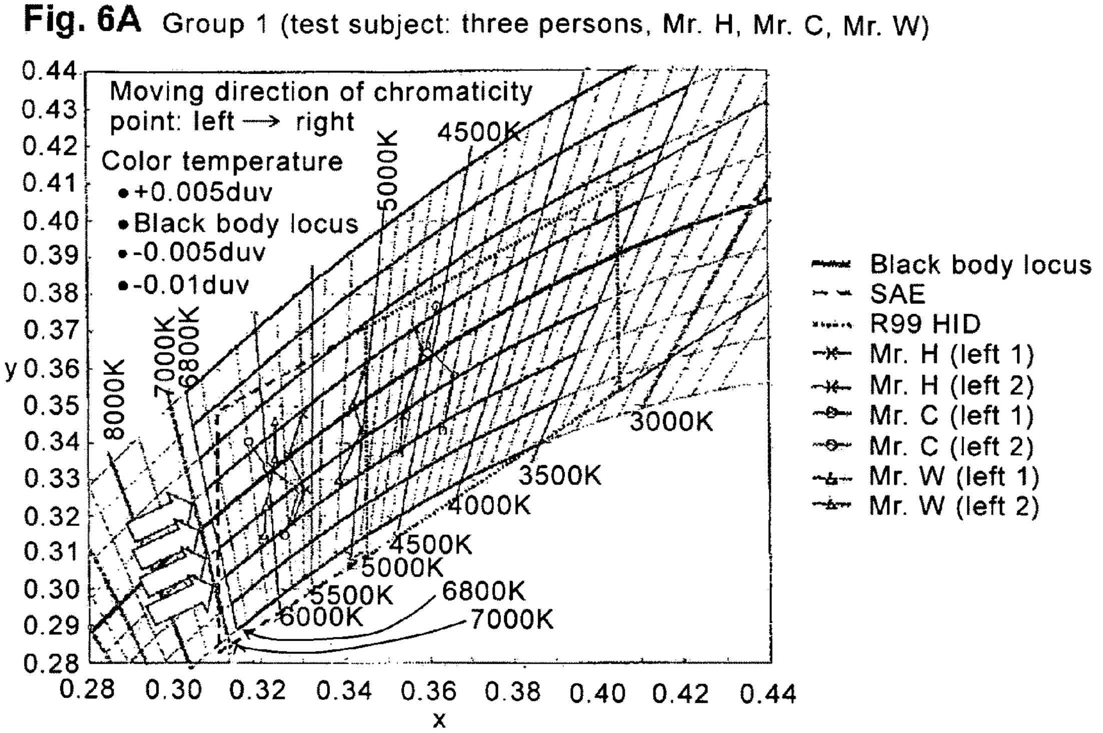
Fig. 6B Group 2 (test subject: three persons, Mr. K, Mr. S, Mr. A)
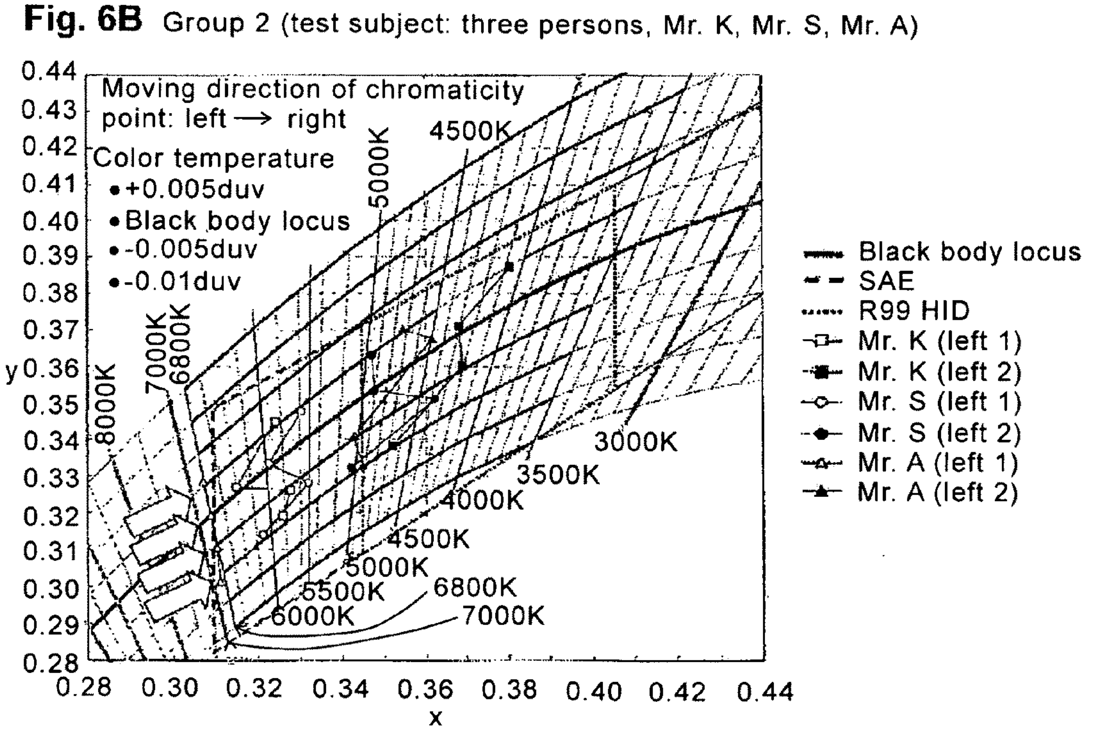

Fig. 7A Group 1 (test subject: three persons)
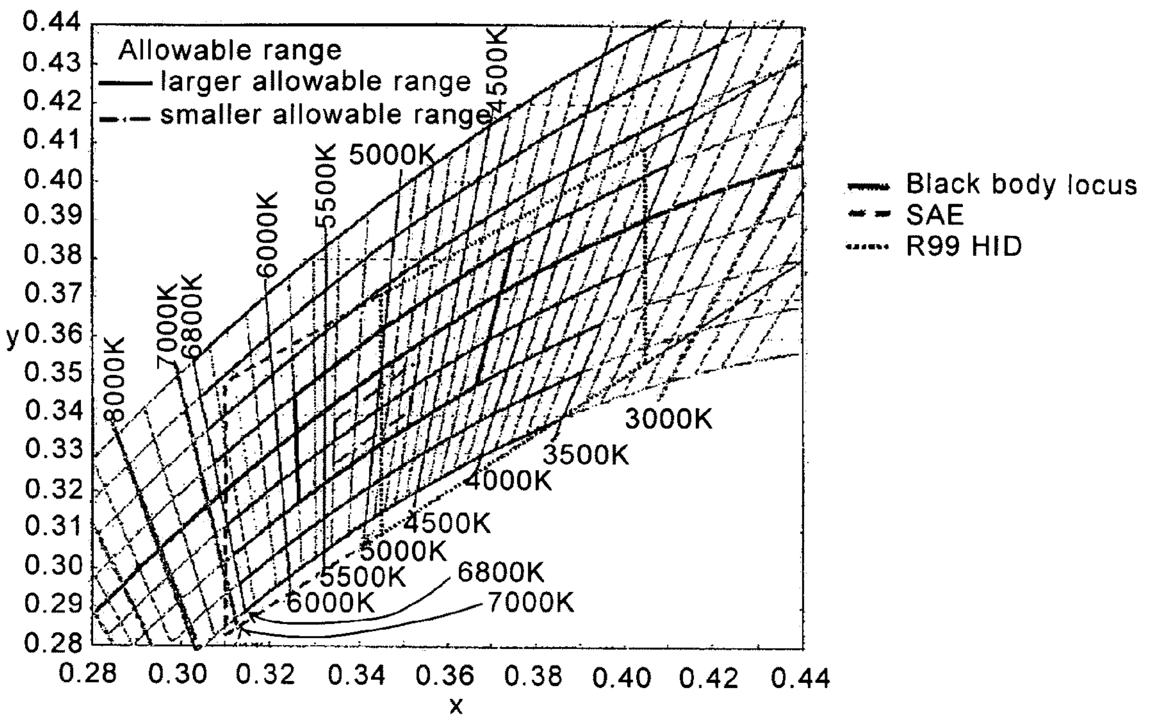
Fig. 7B Group 2 (test subject: three persons)
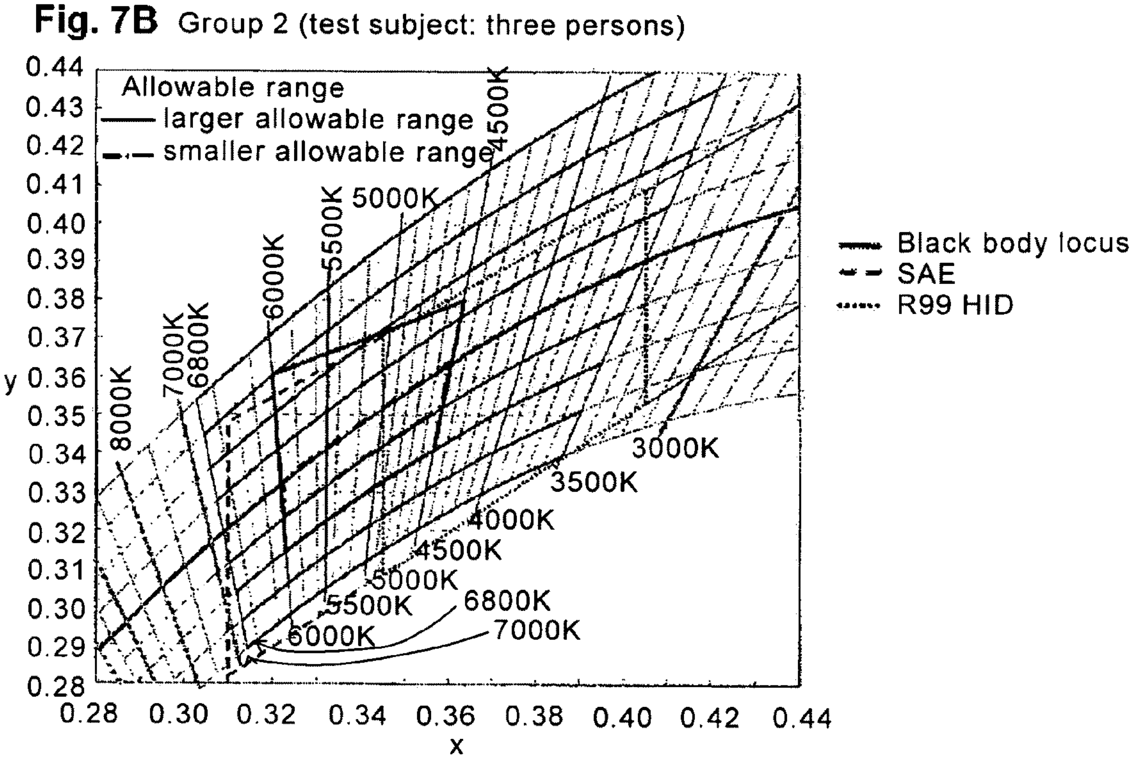

| | Reaction Time | Ratio of Reaction Number | Missing rate | Total |
|---|---|---|---|---|
| T1 | 3 | 4 | 6 | 13.00 |
| T2 | 6 | 5 | 5 | 16.00 |
| T3 | 4 | 3 | 3 | 10.00 |
| T4 | 2 | 2 | 4 | 8.00 |
| T5 | 12 | 12 | 13 | 37.00 |
| T6 | 5 | 6 | 7 | 18.00 |
| T7 | 10 | 8 | 8 | 26.00 |
| T8 | 13 | 13 | 12 | 38.00 |
| T9 | 8 | 10 | 2 | 20.00 |
| T10 | 7 | 9 | 10 | 26.00 |
| T11 | 9 | 7 | 9 | 25.00 |
| HID | 11 | 11 | 11 | 33.00 |
| TH | 1 | 1 | 1 | 3.00 |

Fig. 17
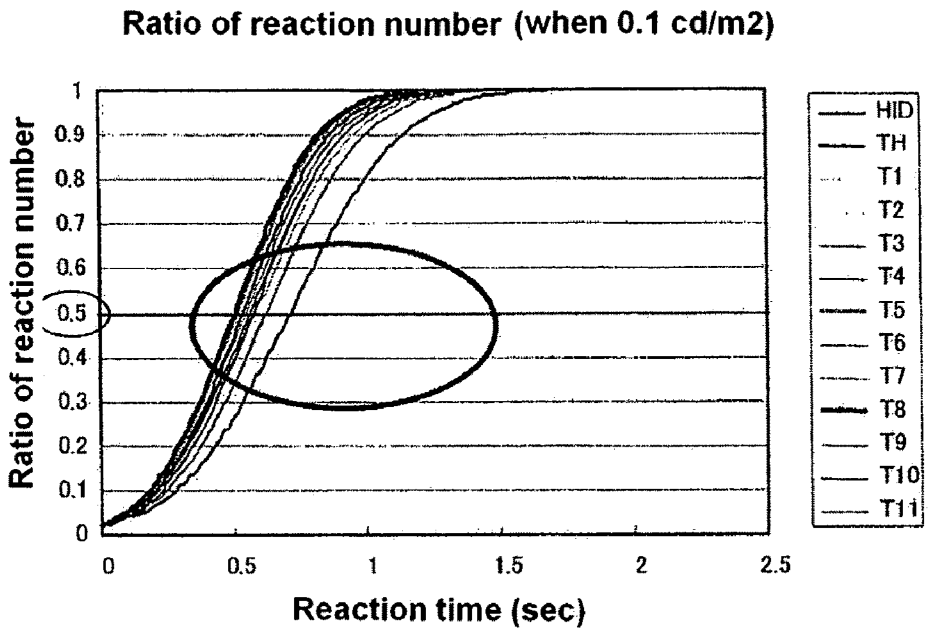
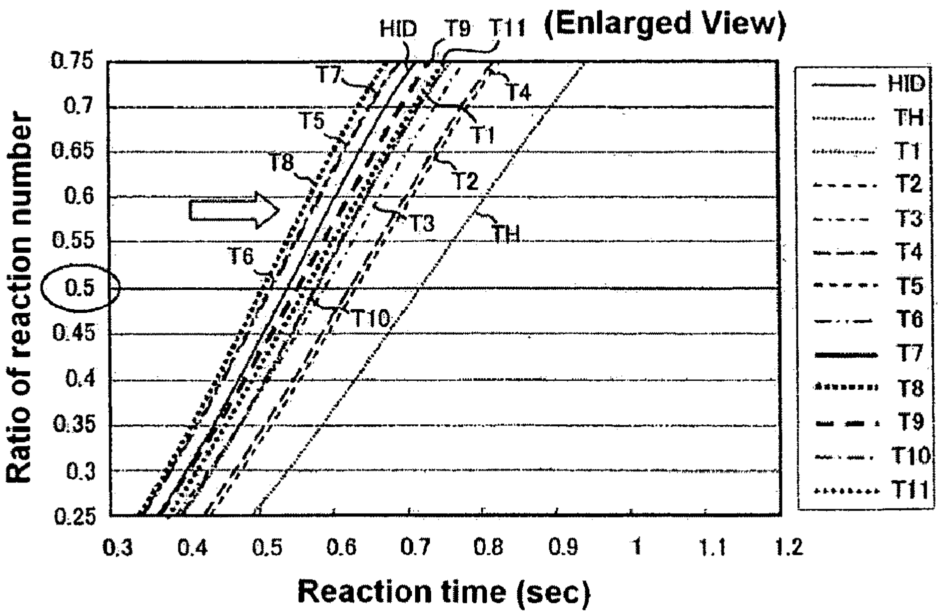

Fig. 19
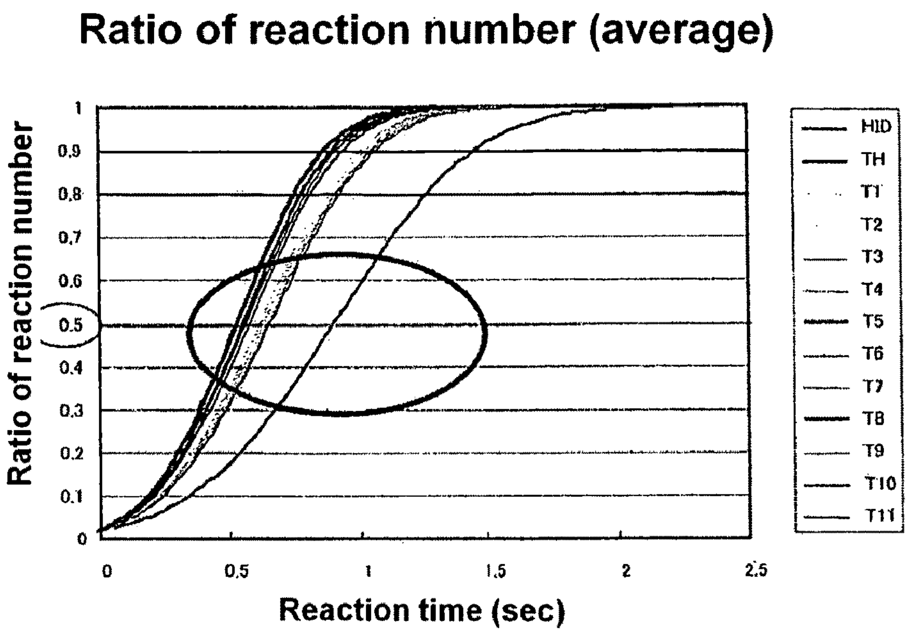
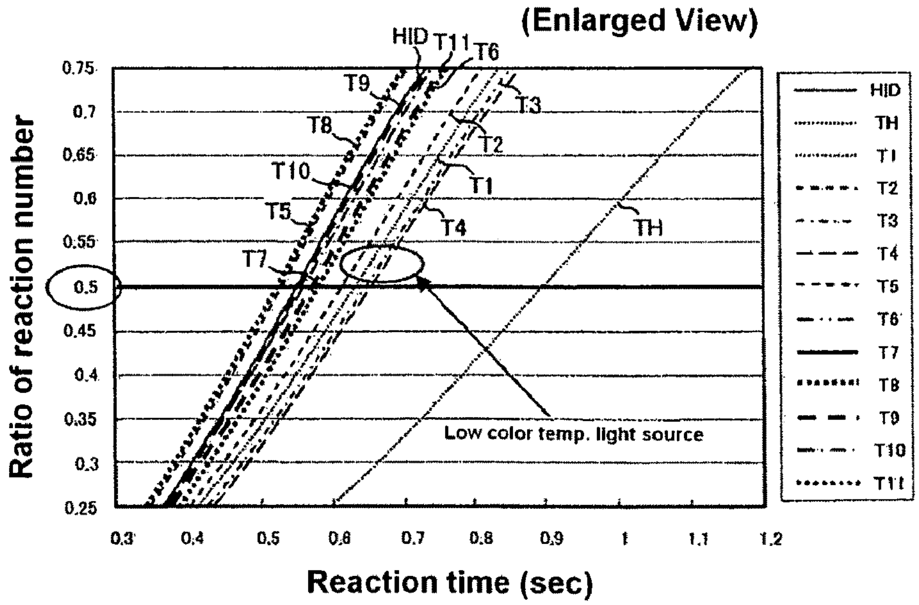

Fig. 34
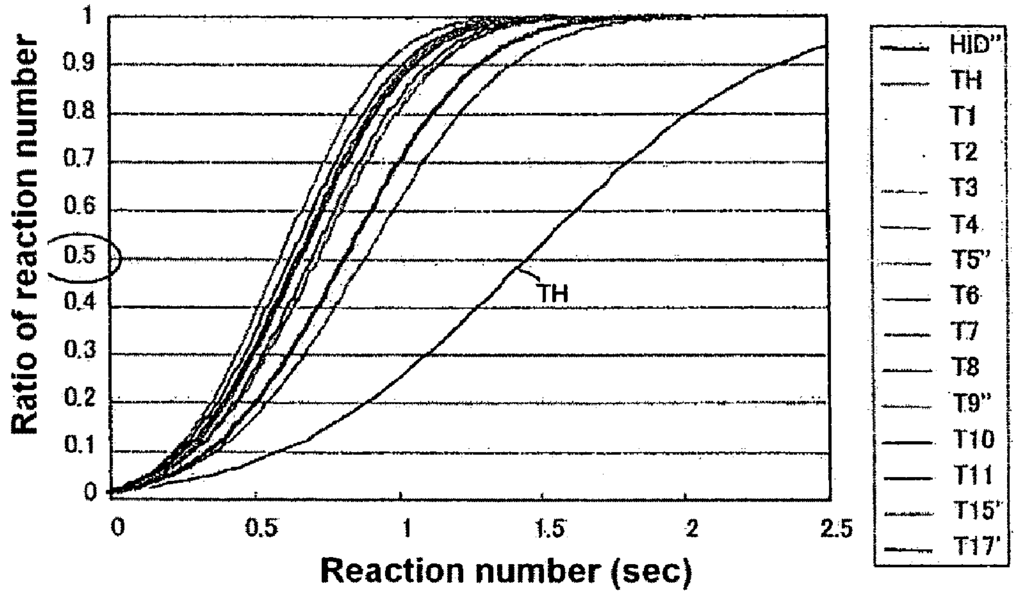
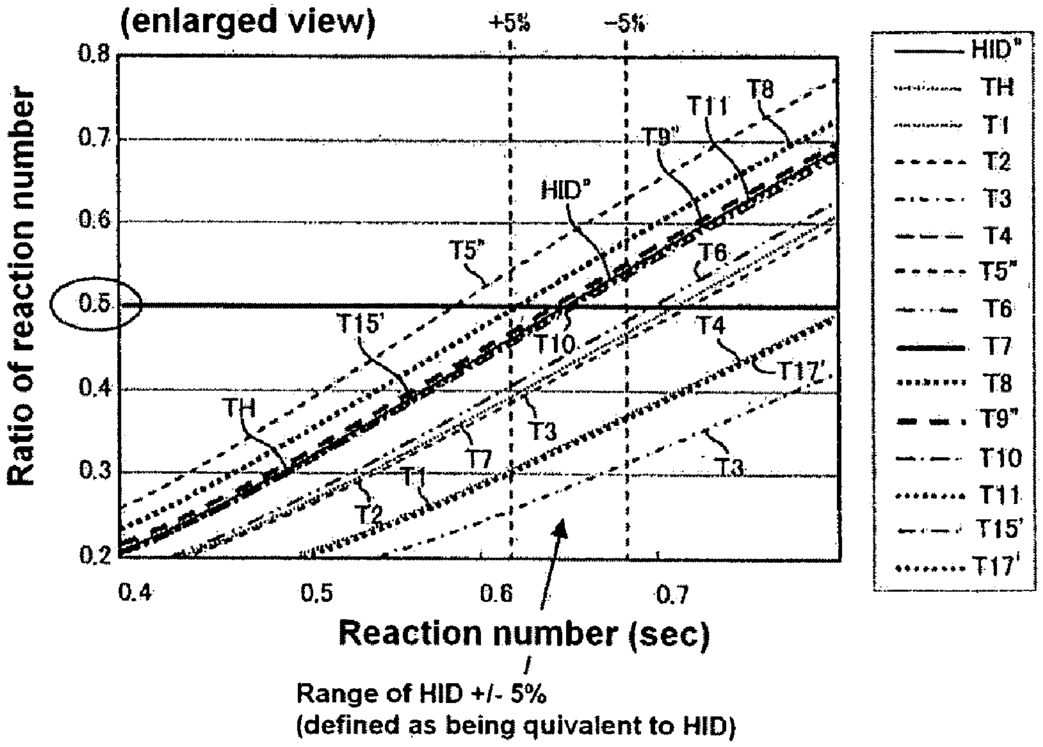

Light distribution pattern (with outer lens)

Max. luminance: 31578 cd (1.4D, 2.2L)

Luminous flux: 1247 lm

Light distribution pattern (with outer lens)

Max. luminance: 21608 cd (1.4D, 0.8L)
Luminous flux: 531 lm

| | Distance to right area | Distance to front area |
|---|---|---|
| ① | 17m | 10m |
| ② | 17m | 22m |
| ③ | 17m | 34m |
| ④ | 5.5m | 51m |

Table 1 Roles of central vision and peripheral vision

| | Central vision | Peripheral vision |
|---|---|---|
| Role/function | Recognition and discrimination of object (obstacles, preceding vehicles, and the like) | Spatial information acquisition (Movement, speed, direction, and the like) |
| Optic nerves | Cone | Rod |

Fig. 79

| | Inventive Headlamp | | | | | Conventional Headlamp | | | | |
|---|---|---|---|---|---|---|---|---|---|---|
| | x | y | Tc(K) | Light intensity (cd) | Light intensity (%) | x | y | Tc(K) | Light intensity (cd) | Light intensity (%) |
| L0 (Left 0 degrees) | 0.3201 | 0.3253 | 7611 | 22767.8 | 77.3 | 0.3428 | 0.3428 | 5137 | 17346.0 | 100.0 |
| L1 (Left 5 degrees) | 0.3203 | 0.3259 | 7583 | 29458.2 | 100.0 | 0.3566 | 0.3601 | 4622 | 16275.0 | 93.8 |
| L2 (Left 10 degrees) | 0.3232 | 0.3317 | 7256 | 19592.8 | 66.5 | 0.3586 | 0.3631 | 4569 | 6625.5 | 38.2 |
| L3 (Left 15 degrees) | 0.3212 | 0.3296 | 7442 | 15863.3 | 53.9 | 0.3674 | 0.3746 | 4359 | 4435.8 | 25.6 |
| L4 (Left 20 degrees) | 0.3222 | 0.3322 | 7323 | 12267.0 | 41.6 | 0.3520 | 0.3641 | 4800 | 1982.9 | 11.4 |
| L5 (Left 25 degrees) | 0.3247 | 0.3367 | 7076 | 8456.3 | 28.7 | 0.3507 | 0.3449 | 4755 | 1135.4 | 6.5 |
| L6 (Left 30 degrees) | 0.3292 | 0.3424 | 6720 | 6056.6 | 20.6 | 0.3639 | 0.3647 | 4406 | 620.4 | 3.6 |

VEHICLE LIGHT WITH VALUES CORRESPONDING TO THE CIE COLOR SPACE

This application claims the priority benefit under 35 U.S.C. §119 of Japanese Patent Application No. 2010-023388 filed on Feb. 4, 2010, Japanese Patent Application No. 2010-025829 filed on Feb. 8, 2010, and Japanese Patent Application No. 2010-025830 filed on Feb. 8, 2010, which are hereby incorporated in their entirety by reference.

TECHNICAL FIELD

The presently disclosed subject matter relates to a vehicle light, and in particular, to a vehicle light or a vehicle headlamp that can improve the visibility (noticeability) for pedestrians, roadside obstructs, and the like in actual traffic environments.

BACKGROUND ART

The presently disclosed subject matter is related to the subject matter disclosed in U.S. patent application Ser. No. 12/793,317 filed on Jun. 3, 2010 and U.S. patent application Ser. No. 12/901,485 filed on Oct. 8, 2010, which are both co-owned by the present Applicant. The disclosures of both of these related U.S. patent applications are hereby incorporated in their entirety by reference.

Conventionally, vehicle headlamps have been required to have an improved brightness during nighttime driving in order for a driver to be able to drive a vehicle in the same manner as if during daytime driving. In order to cope with the demand, various headlamps having improved optical systems while employing a high intensity light source such as halogen lamps, HID lamps, and the like which have been proposed. (See, for example, Japanese Patent Application Laid-Open Nos. 2007-59162 and Hei 11-273407).

Incidentally, in order to design an improved vehicle headlamp, various visual characteristics should be taken into consideration, wherein the visual characteristics are characterized by, for example, visual cells including cones concentratively distributed at the center of a retina for sensing color at the center of field of vision in a bright environment and rods distributed over a retina except for the center area thereof for sensing light in a dark environment, central vision and peripheral vision, the color matching functions, the relative luminous efficiency curve, and the like. (See FIGS. 56 to 59.) This is because the visibility (noticeability) for pedestrians, roadside obstructs, and the like in actual traffic environments may be affected by these visual characteristics.

If the vehicle headlamps are improved by supplying the lamp with a greater power to be lit with an increased light intensity, it would put the clock back because of the social trend with regard to the environmental concerns. Furthermore, it would be far from the improvement in safety by increasing the visibility (noticeability) for pedestrians, roadside obstructs, and the like in actual traffic environments with effective countermeasures.

SUMMARY

The presently disclosed subject matter was devised in view of these and other problems and features and in association with the conventional art. According to an aspect of the presently disclosed subject matter, a vehicle light can improve the visibility (noticeability) for pedestrians, roadside obstructs, and the like in actual traffic environments.

According to another aspect of the presently disclosed subject matter, a vehicle light can be configured to project light beams with a predetermined white color. The vehicle light can include a light source with a color temperature range of 4500 K to 7000 K or of 5000 K to 6000 K, the light source emitting light beams including four color light beams represented by four coordinate values of predicted four colors including red, green, blue and yellow in the a* b* coordinate system corresponding to the CIE 1976 L*a*b* color space, the four coordinate values in the a* b* coordinate system being encompassed by respective circle areas having a radius of 5 and each of center coordinate values of (41.7, 20.9) for red, (−39.5, 14.3) for green, (8.8, −29.9) for blue and (−10.4, 74.2) for yellow.

The above conditions have been found on the basis of experimental results conducted by the inventors of the present application, and the vehicle light configured as described above can improve the visibility (noticeability) for pedestrians, roadside obstructs, and the like in actual traffic environments (in particular, in the case where the vehicle is turning to the right).

In the above vehicle light, the above-mentioned white color can be defined within a color range surrounded by lines connecting coordinate values of (0.31, 0.28), (0.44, 0.38), (0.50, 0.38), (0.50, 0.44), (0.455, 0.44), and (0.31, 0.35) in the xy color coordinate system. This range can conform to a certain regulation for white color of light beams of headlamps.

Alternatively, the above-mentioned white color can be defined within a color range surrounded by lines connecting coordinate values of (0.323, 0.352), (0.325, 0.316), (0.343, 0.331), and (0.368, 0.379) in the xy color coordinate system.

The above conditions have been found on the basis of experimental results conducted by the inventors of the present application, and the vehicle light configured as described above can improve the visibility (noticeability) for pedestrians, roadside obstructs, and the like in actual traffic environments (in particular, in the case where the vehicle is turning to the right).

In the above vehicle light, the light source can be an LED light source. In particular, the LED light source can be a white LED light source having a blue or ultraviolet light emitting device and a wavelength conversion material.

According to another aspect of the presently disclosed subject matter, a vehicle light can be configured to include a plurality of optical units (or called as headlamp units) each of which includes an LED light source for projecting light beams with a predetermined white color, each of the optical units for forming a partial light distribution pattern of a low beam light distribution pattern. Each of the optical units can include a first optical unit and a second optical unit, with the first optical unit being configured to converge the light beams at or near an intersection of a horizontal line and a vertical line in a virtual light distribution plane so as to form a hot zone light distribution pattern including an elbow line and with the second optical unit being configured to form a diffusion light distribution pattern to be overlaid on the hot zone light distribution pattern and diffused in the horizontal direction. The LED light source can have a color temperature range of 4500 K to 7000 K or of 5000 K to 6000 K, and emit light beams including four color light beams represented by four coordinate values of predicted four colors including red, green, blue and yellow in the a* b* coordinate system corresponding to the CIE 1976 L*a*b* color space, the four coordinate values in the a* b* coordinate system being encompassed by respective circle areas having a radius of 5 and each of center coordinate values of (41.7, 20.9) for red, (−39.5, 14.3) for green, (8.8, −29.9) for blue and (−10.4, 74.2) for yellow.

The above conditions have been found on the basis of experimental results conducted by the inventors of the present application, and the vehicle light configured as described above can improve the visibility (noticeability) for pedestrians, roadside obstructs, and the like in actual traffic environments (in particular, in the case where the vehicle is turning to the right).

The above vehicle light can be configured to form a horizontally wide light distribution pattern optimized for a low beam light distribution pattern including the diffusion light distribution pattern, the hot zone light distribution pattern, and the like individual partial light distribution pattern, the wide light distribution pattern being designed such that light intensity decreases toward its outside. In this case, the visibility of left side (or right side) by the peripheral vision can be improved while glare light toward the surrounding pedestrians can be prevented or suppressed.

In the above vehicle light, each of the plurality of optical units can include a third optical unit and a fourth optical unit, with the third optical unit being configured to form a middle diffusion light distribution pattern that is horizontally diffused to a certain degree smaller than that for the diffusion light distribution pattern and overlaps the hot zone and diffusion light distribution patterns and with the fourth optical unit being configured to form a large diffusion light distribution pattern that is horizontally diffused to a certain degree larger than that for the diffusion light distribution pattern and overlaps the hot zone, diffusion, and middle diffusion light distribution patterns.

The above vehicle light can be configured to form a remarkably horizontally wide light distribution pattern optimized for a low beam light distribution pattern including the diffusion light distribution pattern, the hot zone light distribution pattern, the middle diffusion light distribution pattern, the large diffusion light distribution pattern, and the like individual partial light distribution pattern, the wide light distribution pattern being designed such that light intensity decreases toward its outside. In this case, the visibility of left side (or right side) by the peripheral vision can be improved while glare light toward the surrounding pedestrians can be prevented or suppressed.

In the above vehicle light, the plurality of optical units can have light emission areas arranged adjacent to each other in a width direction of a vehicle body so that the light emission areas are not adjacent to each other in a vertical direction when viewed from its front side.

Conventionally, vehicle lights utilizing an LED light source have been known (for example, see Japanese Patent No. 4115921 (corresponding to U.S. Pat. No. 7,387,417)). FIG. 60 shows the disclosed vehicle light 300 which can use a plurality of optical units 310 and 312 each including an LED light source in order to compensate the lack of light flux of an LED light source.

The plurality of optical units 310 and 312 of the vehicle light 300 are arranged at an upper position and a lower position, and can emit light beams to form individual partial light distribution patterns PL1 to PL4 to form a low beam light distribution pattern as shown in FIG. 61.

However, since the vehicle light 300 has the upper optical units 310 and the lower optical units 312 at different levels, the upper edge CL2 (bright/dark boundary line) of the partial light distribution pattern PL4 formed by the lower optical unit 312 can be formed lower than the upper edge CL1 (bright/dark boundary line) of the partial light distribution patterns PL1 to PL3 formed by the upper optical units 310 (see, for example, FIG. 61). In this case, there may be formed a stepped area in the luminance intensity (uneven luminance) (see, for example, FIGS. 62 and 63).

In order to cope with this problem, the configuration of the above vehicle light can include the plurality of optical units that are not arranged in the lower and upper portions, but configured such that the light emission areas thereof are arranged adjacent to each other in the width direction of a vehicle body so that the light emission areas are not adjacent to each other in the vertical direction when viewed from its front side (see, for example, FIGS. 64, 67, 69, and 71). The thus configured plurality of optical units (light emission areas) can emit light beams for forming the respective partial light distribution patterns for the low beam light distribution pattern. This arrangement can form the vertically continuous light emission area without a discontinuous area (see, for example, FIGS. 64, 67, 69, and 71). Accordingly, the uneven luminance due to the installation height difference between the upper and lower optical units can be prevented (see, for example, FIGS. 65, 68, and 70).

In the above vehicle light, the plurality of optical units can be disposed such that the optical unit with a larger horizontal diffusion is arranged at a more sideward and more rearward position and the optical unit at a more sideward position is inclined sideward by a larger angle with respect to a standard axis extending in a front to rear direction of a vehicle body.

In this case, even if the plurality of optical units are arranged from the front surface of the vehicle body to the side surface thereof along the vehicle body design (see, for example, FIG. 40), the light path from the optical unit positioned sideward (for example, the optical unit 10D in FIG. 40) can be prevented from being shielded by the adjacent optical unit (for example, the optical unit 10C in FIG. 40), thereby forming a suitable diffusion light distribution pattern (for example, the light distribution patterns P2 to P4 in FIG. 41).

In the above vehicle light, the above-mentioned white color can be defined within a color range surrounded by lines connecting coordinate values of (0.31, 0.28), (0.44, 0.38), (0.50, 0.38), (0.50, 0.44), (0.455, 0.44), and (0.31, 0.35) in the xy color coordinate system. This range can conform to a certain regulation for white color of light beams of headlamps.

Alternatively, the above-mentioned white color can be defined within a color range surrounded by lines connecting coordinate values of (0.323, 0.352), (0.325, 0.316), (0.343, 0.331), and (0.368, 0.379) in the xy color coordinate system.

The above conditions have been found on the basis of experimental results conducted by the inventors of the present application, and the vehicle light configured as described above can improve the visibility (noticeability) for pedestrians, roadside obstructs, and the like in actual traffic environments (in particular, in the case where the vehicle is turning to the right).

In the above vehicle light, the LED light source can be a white LED light source having a blue or ultraviolet light emitting device and a wavelength conversion material.

According to still another aspect of the presently disclosed subject matter, a vehicle light can be configured to include an optical unit (or referred to as a headlamp unit) which is configured to project light beams with a predetermined white color, the optical unit for forming a partial light distribution pattern of a low beam light distribution pattern. The optical unit can include an LED light source and a solid lens body having a light incident surface through which light beams emitted from the LED light source can enter the lens body, a light exiting surface, and a light reflecting surface by which the entering light beams can be reflected toward the light exiting surface so as to form the partial light distribution pattern having a bright/dark boundary line. The light reflecting surface can include a first reflecting area, a second reflecting area, and a third reflecting area. The first reflecting area can reflect light beams at a standard wavelength that has been emitted from one side of the LED light source corresponding to light beams for forming the bright/dark boundary line and has entered the lens body through the light incident surface perpendicular with respect to the light incident surface without being subjected refraction so as to form the bright/dark boundary line. The second reflecting area can reflect part of the light beams that has been emitted from one side of the LED light source corresponding to the light beams for forming the bright/dark boundary line, has entered the lens body through the light incident surface by a certain incident angle other than 90 degrees with respect to the light incident surface with the light beams being subjected to refraction according to the light incident angle, and have wavelengths longer than the standard wavelength so as to distribute the light beams on or below the bright/dark boundary line. The third reflecting area can reflect part of the light beams that has been emitted from one side of the LED light source corresponding to the light beams for forming the bright/dark boundary line, has entered the lens body through the light incident surface by another certain incident angle other than 90 degrees with respect to the light incident surface with the light beams being subjected to refraction according to the another light incident angle, and have wavelengths shorter than the standard wavelength so as to distribute the light beams on or below the bright/dark boundary line. The LED light source can have a color temperature range of 4500 K to 7000 K or of 5000 K to 6000 K, and emit light beams including four color light beams represented by four coordinate values of predicted four colors including red, green, blue and yellow in the a* b* coordinate system corresponding to the CIE 1976 L*a*b* color space, the four coordinate values in the a* b* coordinate system being encompassed by respective circle areas having a radius of 5 and each of center coordinate values of (41.7, 20.9) for red, (−39.5, 14.3) for green, (8.8, −29.9) for blue and (−10.4, 74.2) for yellow.

The above conditions have been found on the basis of experimental results conducted by the inventors of the present application, and the vehicle light configured as described above can improve the visibility (noticeability) for pedestrians, roadside obstructs, and the like in actual traffic environments (in particular, in the case where the vehicle is turning to the right).

Conventionally, known vehicle lights utilizing an LED light source are disclosed, for example, Japanese Patent Application Laid-Open No. 2008-78086. For example, FIG. 74 shows such a known vehicle light 400 that includes an optical unit including an LED light source 410 and a light guide 420.

The light guide 420 of the vehicle light 400 includes a reflecting surface 421 by which the incident light from the LED light source 410 can be reflected to the light exiting surface 422, thereby forming a light distribution pattern including a bright/dark boundary line.

However, the conventional vehicle light 400 disclosed in the above publication may have the problem in that the rainbow coloring (or color blurring) can occur near the bright/dark boundary line due to the effect of chromatic aberration. This coloring (color blurring) Can occur remarkably when the light guide is made of a transparent resin material with a relatively high refractivity, such as acrylic resins, polycarbonate resins, or the like.

To cope with this problem, the light beams from an LED light source that have been subjected to refraction according to incident angles to cause rainbow coloring (color blurring) near the bright/dark boundary line (the light beams with wavelengths longer or shorter than a standard wavelength) can be distributed on or below the bright/dark boundary line by the action of the second and third reflecting areas. Accordingly, the above configuration can eliminate or suppress the rainbow coloring occurring near the bright/dark boundary line due to chromatic aberration.

In the above vehicle light, the second reflecting area can be configured to reflect the light beams that have wavelengths longer than the standard wavelength so as to distribute the light beams on the bright/dark boundary line or within the light distribution pattern, and the third reflecting area can be configured to reflect the light beams that have wavelengths shorter than the standard wavelength so as to distribute the light beams on the bright/dark boundary line or within the light distribution pattern.

In this configuration, the light beams that have been subjected to refraction according to incident angles to cause rainbow coloring (color blurring) near the bright/dark boundary line (the light beams with wavelengths longer or shorter than a standard wavelength) can be distributed on the bright/dark boundary line or within the light distribution pattern by the action of the second and third reflecting areas. Accordingly, the above configuration can eliminate or suppress the chromatic unevenness occurring within the light distribution pattern.

In the above vehicle light, the light reflecting surface can be formed so that light beams emitted from edges of the LED light source are projected from the light exiting surface and distributed on the bright/dark boundary line and within the light distribution pattern. This configuration can overlay the light beams emitted from the edges of the LED light source on the light beams emitted from other light emission area of the LED light source than the edges.

Accordingly, the light beams emitted from the edges of the LED light source can be mixed with the light beams emitted from the other light emission areas of the LED light source than the edges, thereby preventing or suppressing the chromatic unevenness of the light distribution pattern due to the chromatic unevenness due to the edges of the LED light source.

In the above vehicle light, the above-mentioned white color can be defined within a color range surrounded by lines connecting coordinate values of (0.31, 0.28), (0.44, 0.38), (0.50, 0.38), (0.50, 0.44), (0.455, 0.44), and (0.31, 0.35) in the xy color coordinate system. This range can conform to a certain regulation for white color of light beams of headlamps.

Alternatively, the above-mentioned white color can be defined within a color range surrounded by lines connecting coordinate values of (0.323, 0.352), (0.325, 0.316), (0.343, 0.331), and (0.368, 0.379) in the xy color coordinate system.

The above conditions have been found on the basis of experimental results conducted by the inventors of the present application, and the vehicle light configured as described above can improve the visibility (noticeability) for pedestrians, roadside obstructs, and the like in actual traffic environments (in particular, in the case where the vehicle is turning to the right).

In the above vehicle light, the LED light source can be a white LED light source having a blue or ultraviolet light emitting device and a wavelength conversion material.

According to the presently disclosed subject matter, it is possible to provide a vehicle light that can improve the visibility (noticeability) for pedestrians, roadside obstructs, and the like in actual traffic environments.

BRIEF DESCRIPTION OF DRAWINGS

These and other characteristics, features, and advantages of the presently disclosed subject matter will become clear from the following description with reference to the accompanying drawings, wherein:

FIG. 3A is a graph showing the measured results of Experiment 1 (group 1) in an xy color coordinate system, and FIG. 3B is a graph showing the measured results of Experiment 1 (group 2) in the xy color coordinate system;

FIG. 4A is a graph showing the measured results of Experiment 1 (group 1) in the xy color coordinate system, and FIG. 4B is a graph showing the measured results of Experiment 1 (group 2) in the xy color coordinate system;

FIG. 5A is a graph showing the measured results of Experiment 1 (group 1) in the xy color coordinate system, and FIG. 5B is a graph showing the measured results of Experiment 1 (group 2) in the xy color coordinate system;

FIG. 6A is a graph showing the measured results of Experiment 1 (group 1) in the xy color coordinate system, and FIG. 6B is a graph showing the measured results of Experiment 1 (group 2) in the xy color coordinate system;

FIG. 7A is a graph showing the allowable range of light beams from a headlamp according to the measured results of Experiment 1 (group 1), and FIG. 7B is a graph showing the allowable range of light beams from a headlamp according to the measured results of Experiment 1 (group 2);

FIG. 11 is a diagram for explaining the relative color temperature of a light source used in Experiment 2 and the like;

FIG. 17 includes graphs showing the relationship between the ratio of the reaction number and the reaction time for a light source (luminance: 0.1 $cd/m^2$)) used in Experiment 2;

FIG. 19 includes graphs showing the averaged values shown in the graphs of FIGS. 16 to 18;

FIG. 34 includes graphs showing the relationship between the ratio of the reaction number and the reaction time for a light source (luminance: 0.01 $cd/m^2$)) used in Additional Experiment;

FIG. 56 is a diagram for explaining the visual characteristics that are characterized by visual cells including cones and rods, central vision and peripheral vision, and the like;

FIG. 57 is a diagram for explaining the visual characteristics that are characterized by central vision and peripheral vision, and the like;

FIG. 58 is a table for explaining the visual characteristics that are characterized by visual cells including cones and rods, central vision and peripheral vision, and the like;

FIG. 59 is a diagram for explaining the visual characteristics that are characterized by visual cells including cones and rods, central vision and peripheral vision, and the like;

FIG. 79 is a table indicating the measured value of chromaticity and light intensities within the light distribution pattern of the illuminated light from the vehicle light of FIG. 76;

DESCRIPTION OF EXEMPLARY EMBODIMENTS

A description will now be made below to vehicle lights of the presently disclosed subject matter with reference to the accompanying drawings in accordance with exemplary embodiments.

Hereinafter, the conditions for a vehicle light to improve the visibility (noticeability) for pedestrians, roadside obstructs, and the like in actual traffic environments will be described.

[White Color Range for a Light Beam of a Vehicle Headlamp]

Figure 1:
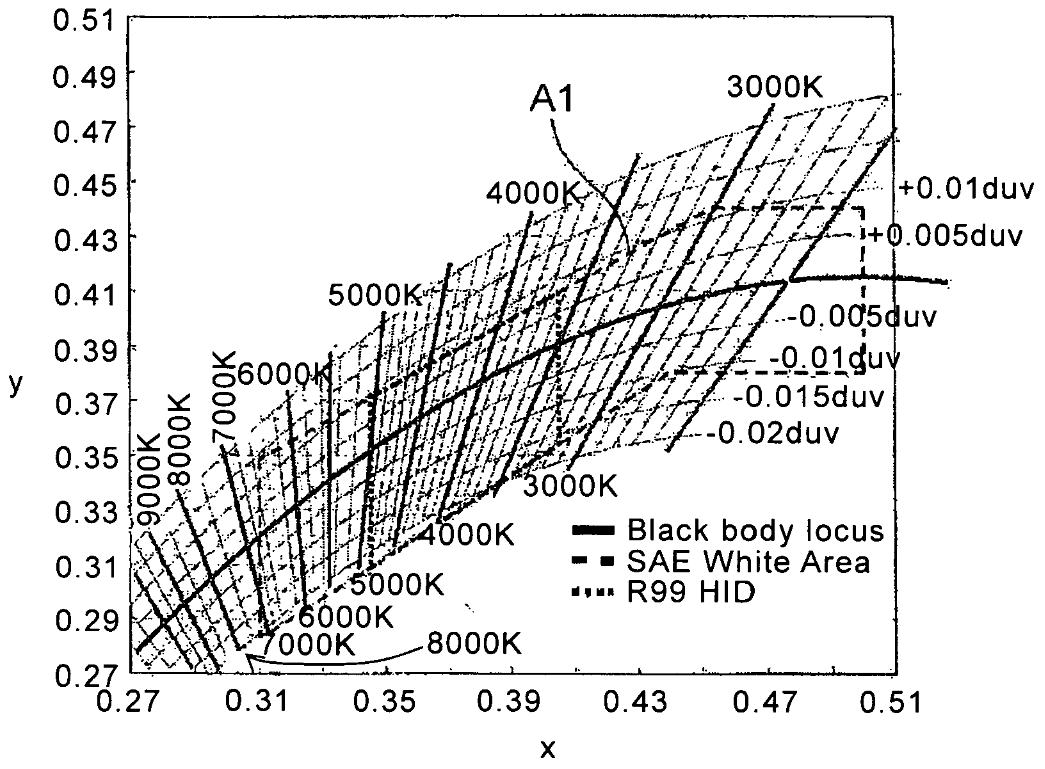
FIG. 1 is a graph for explaining the white color range A1 of a vehicle headlamp as specified by a certain regulation.

As shown in FIG. 1, the white color range A1 of a vehicle headlamp can be specified by a certain regulation in accordance with each of domestic traffic systems. Since the white color range A1 of a vehicle headlamp as specified by a certain regulation (the color range surrounded by lines connecting coordinate values of (0.31, 0.28), (0.44, 0.38), (0.50, 0.38), (0.50, 0.44), (0.455, 0.44) and (0.31, 0.35) in the xy color coordinate system) is determined irrespective of the color used in a headlamp, all light beams falling within the white color range A1 cannot always be used as a headlamp. In view of this, the present inventors have examined appropriate white color ranges within the white color range A1 specified by a certain regulation in order to clarify the useable white color range as a color of a headlamp.

Experiment 1

Figure 2:
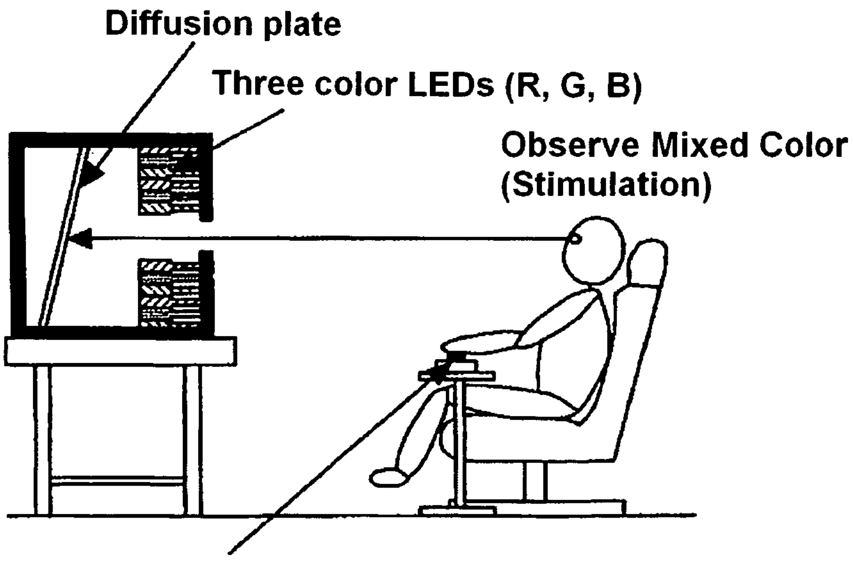
FIG. 2 is a diagram illustrating the configuration of an experimental apparatus for use in Experiment 1, examining an appropriate white color range as a headlamp.

Experiment Environment: A dark box was prepared in which red (R), green (G), and blue (B) LEDs and a diffusion plate configured to diffuse the light beams emitted from the LEDs were arranged as shown in FIG. 2. Test subjects were six persons divided into Group 1 and Group 2 each including three persons.

Experiment procedure: The LEDs are controlled to change the light source color for illuminating the diffusion plate such that the light source color is changed gradually in the directions of the arrows shown in FIGS. 3A, 3B, 4A, 4B, 5A, 5B, 6A, and 6B. If the test subject prefers the light source color presented through the opening of the dark box, he/she pushes a button to indicate his/her favorable environment. The chromaticity at that time when the button was pushed was measured as a preferred color within the white range.

Figure 8:
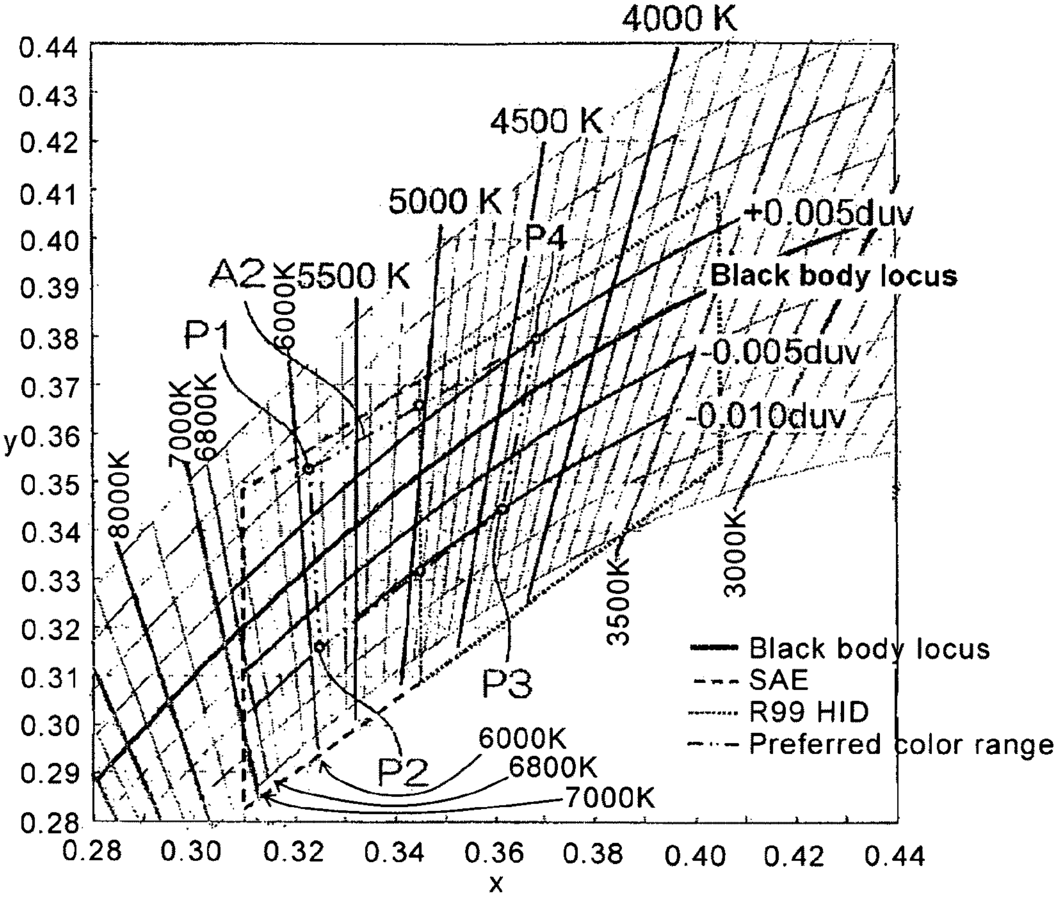
FIG. 8 is a graph for explaining the white range A2 used as light beams of a headlamp based on the results of FIGS. 7A and 7B.
Figure 9:
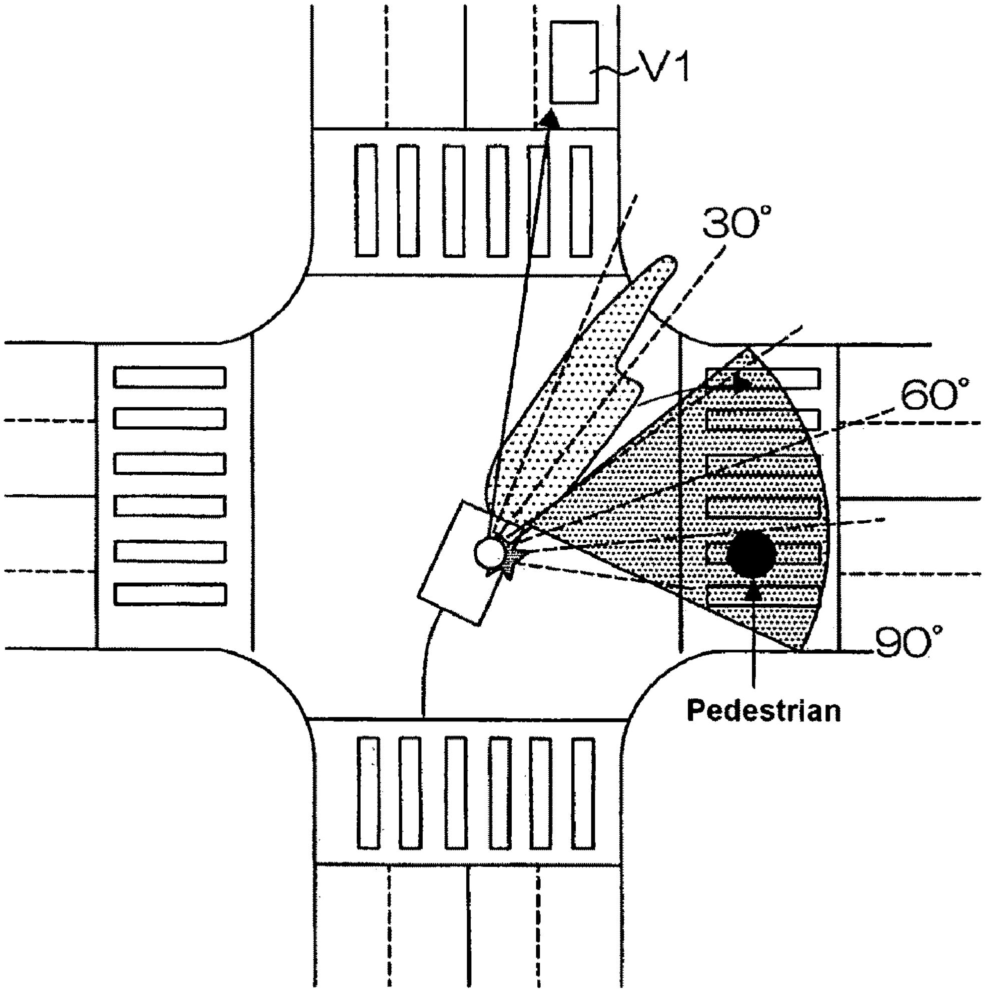
FIG. 9 is a diagram for explaining the status in an actual traffic environment (in particular, in the case where the vehicle is turning to the right), in which a driver sees an opposed vehicle V1 with the central vision while the driver recognizes pedestrians, roadside obstructs, and the like with the peripheral vision.

The measured chromaticity values were plotted in the xy color coordinate system (see FIGS. 3A to 6B). The results revealed the allowable range or preferred range of color as a color of a headlamp (see FIGS. 7A and 7B). The present inventors have clarified the preferred white color range as a light color of a headlamp and found that the range is the color range surrounded by lines connecting coordinate values P1 to P4 as shown in FIG. 8.

[White Color Range within which the Visibility (Noticeability) with a Peripheral Vision can be Improved]

In an actual traffic environment (in particular, in the case where the vehicle is turning to the right), it is believed that a driver sees an opposed vehicle V1 with the central vision while the driver recognizes pedestrians, roadside obstructs, and the like with the peripheral vision.

The present inventors have investigated the white color range (preferred color range of light beams as a vehicle headlamp) within which the visibility (noticeability) by the peripheral vision can be improved among the white color range A2 that has been determined as a preferred light beam of a vehicle headlamp.

Experiment 1

Figure 10:
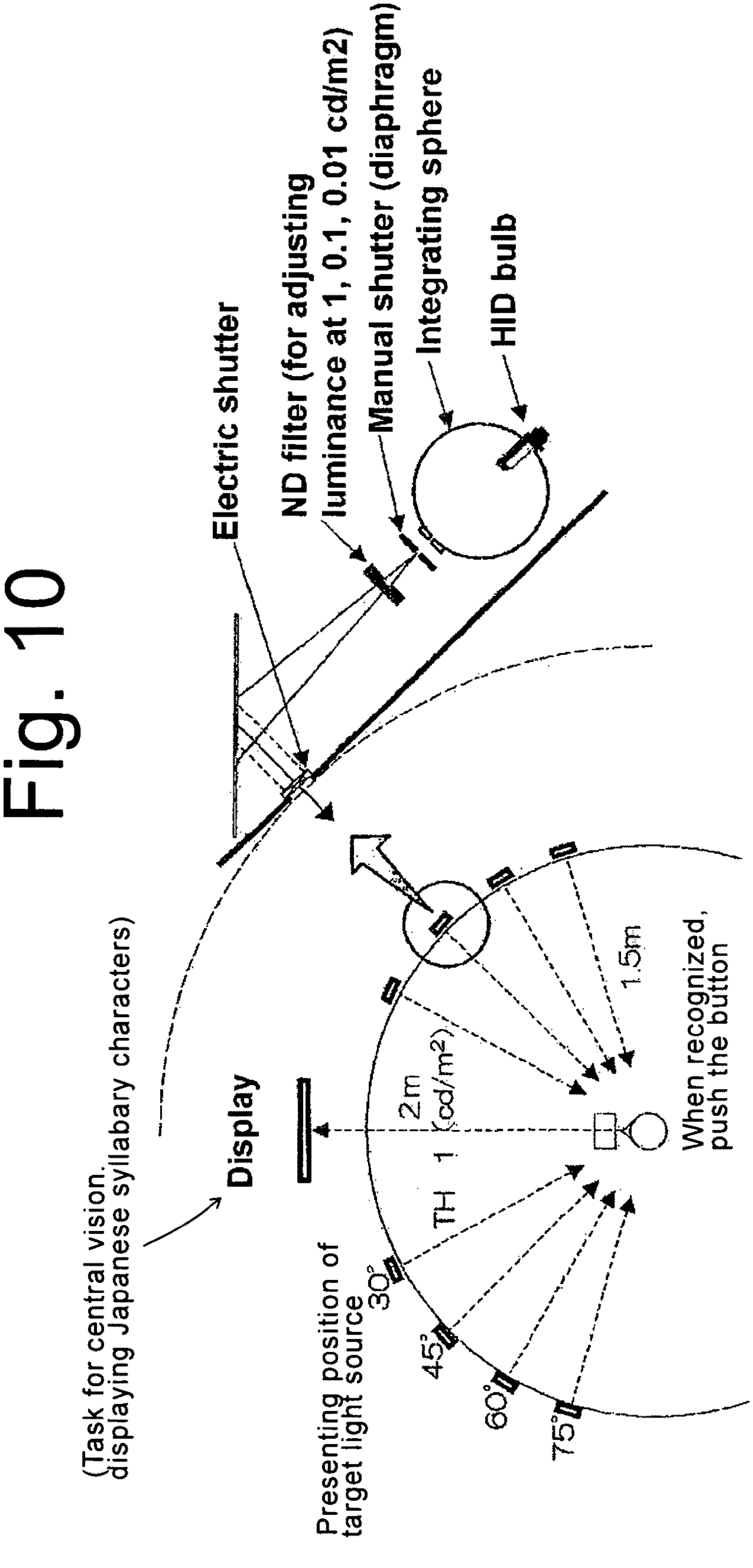
FIG. 10 is a diagram showing the configuration of an apparatus for use in Experiment 2, in which the apparatus can determine a white range (color range suitable for a headlamp) within which light beams from a headlamp can provide improved visibility (noticeability) with the peripheral vision.
Figure 11:
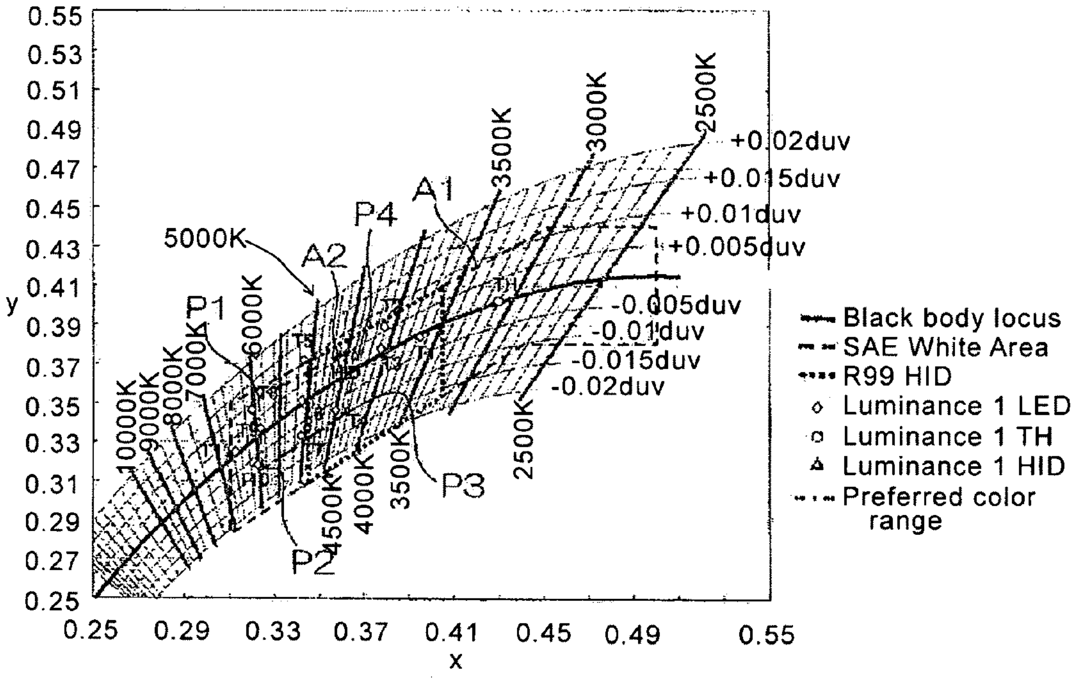

Experiment Environment: The device with the configuration shown in FIG. 10 and a plurality of light sources T1 to T11, TH, and HID with various correlated color temperatures as a presenting light source as shown in FIG. 11 were used. T1 to T11 represent LEDs, TH a halogen lamp, and HID an HID lamp. The number of test subjects was 18 persons.

Experiment procedure: While a test subject is allowed to see a display (showing Japanese syllabary characters) disposed 2 m away from its front, a gray color material illuminated with a light source (T1 to T11, TH or HID) having a constant light luminance (1 or 0.1 cd/m$^2$) is presented at each of positions of 30 degrees, 45 degrees, 60 degrees, and 75 degrees leftward (rightward) with respect to the front. Time (reaction time) at which the test subject recognizes (notices)

the presented light (reflected light from the gray color material) was measured for each light source at each presenting position.

[Reaction Time for Each Light Source at Each Presenting Position]

Figure 12:
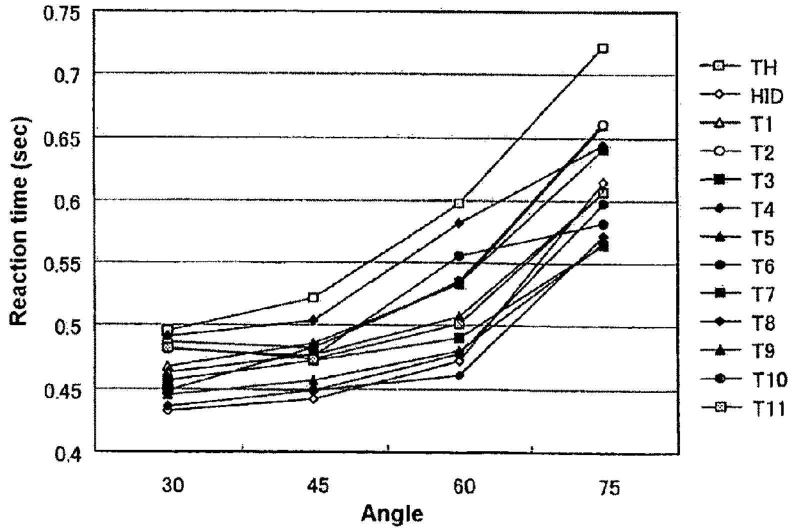
FIG. 12 is a graph showing the relationship between a reaction time and a presenting position as determined in Experiment 2 for each light source.
Figures 13A, 13B:
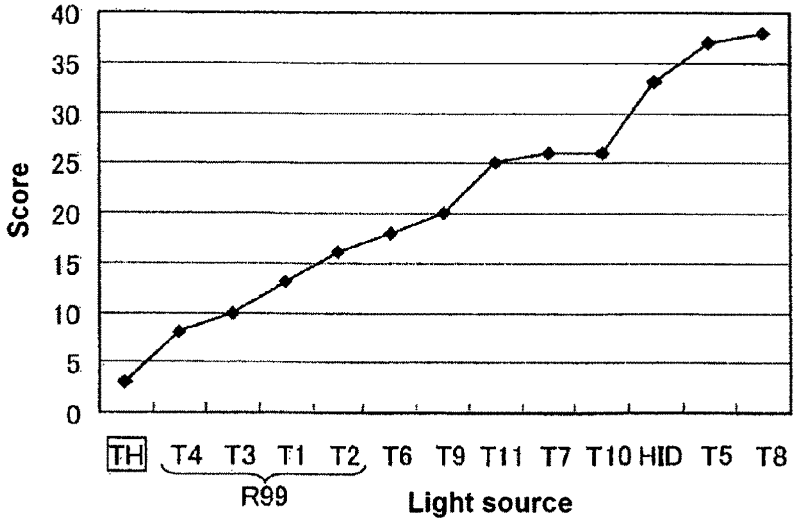
FIG. 13A is a table showing the evaluation results of each light source on the basis of the reaction time and the like, and FIG. 13B is a graph showing the relationship between the each light source and the evaluation point.

FIG. 12 is a graph showing the relationship between a reaction time and a presenting position as determined in Experiment 2 above for each light source. The item of the reaction time in the table of FIG. 13A shows the evaluation results of each light source on the basis of the reaction time. The light source with which the reaction time is short is said to be a light source that can improve the visibility (noticeability) by the peripheral vision, and accordingly, such a light source is assigned to a higher evaluation score.

With reference to the item of "reaction time" in FIGS. 12 and 13A, the light source with higher color temperature was likely to cause test subjects to recognize (notice) the reflected light from the gray color material with a shorter time (higher evaluation score). Namely, it is revealed that the light source with higher color temperatures can improve the visibility (noticeability) with a peripheral vision with regard to the noticeability of white light.

[Missing Rate]

Figure 14:
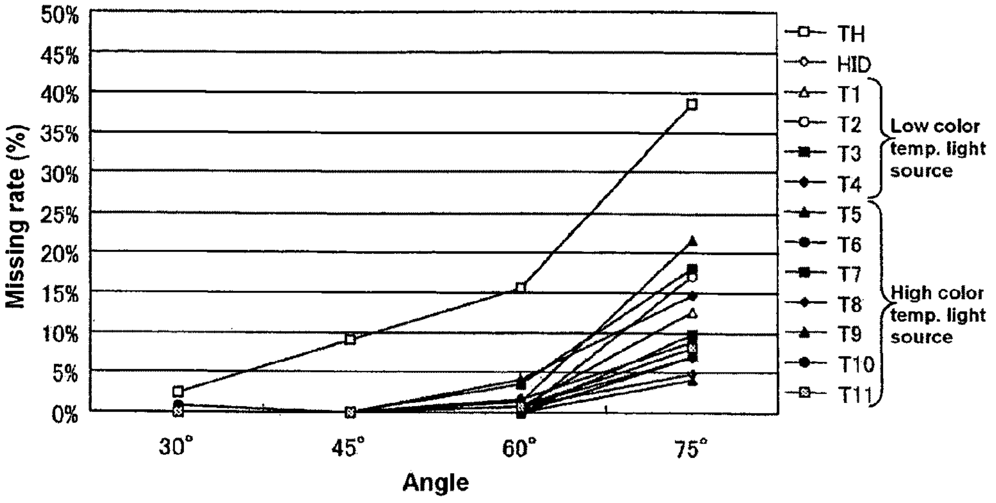
FIG. 14 is a graph showing the relationship between the presenting position and the missing rate (rate of persons who can notice the presented light over 2 seconds) calculated on the basis of the reaction time measured in Experiment 2 for each light source.

FIG. 14 is a graph showing the relationship between the presenting position and the missing rate (rate of persons who can notice the presented light over 2 seconds) calculated on the basis of the reaction time measured in Experiment 2 for each light source. The item of "missing rate" in the table of FIG. 13A shows the evaluation results of each light source on the basis of the missing rate. The light source with which the missing rate is small is said to be a light source that can improve the visibility (noticeability) by the peripheral vision, and accordingly, such a light source is assigned to a higher evaluation score.

With reference to the item of "missing rate" in FIGS. 14 and 13A, the light source with higher color temperature was likely to provide a smaller missing rate (higher evaluation score). Namely, it is revealed that the light source with higher color temperatures can improve the visibility (noticeability) with a peripheral vision with regard to the noticeability of white light.

[Ratio of Reaction Number]

Figure 15:
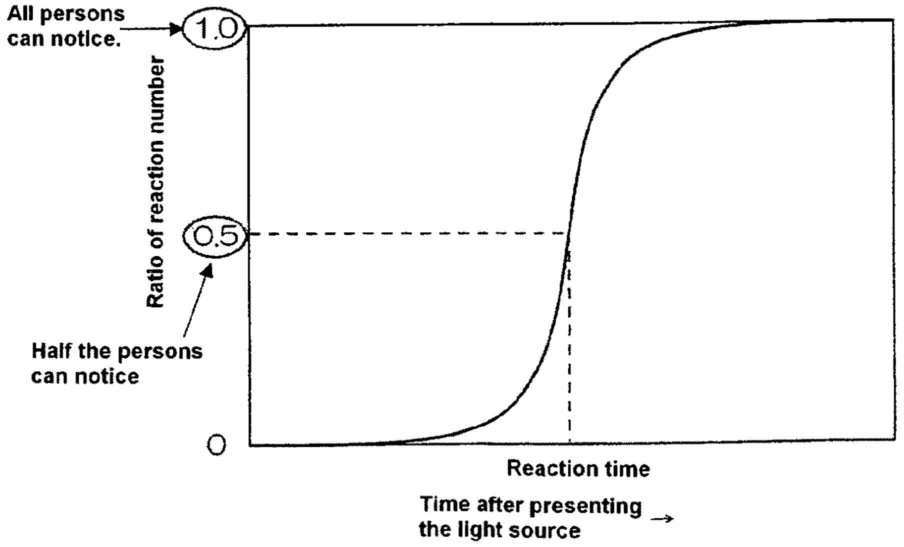
FIG. 15 is a diagram for explaining the concept of the ratio of reaction number.

FIG. 15 is a diagram for explaining the concept of the ratio of reaction number. The ratio of reaction number is defined by (the number of reaction within a certain time of period)/(the number of data in which a test subject notices the gray color material within 2 seconds (reaction time is 2 seconds or shorter)). In these conditions, the time of period within which half the test subjects can notice the reflected light with respect to a light source is evaluated as a reaction time. It should be noted that the reaction time over 2 seconds is defined as missing.

Figure 16:
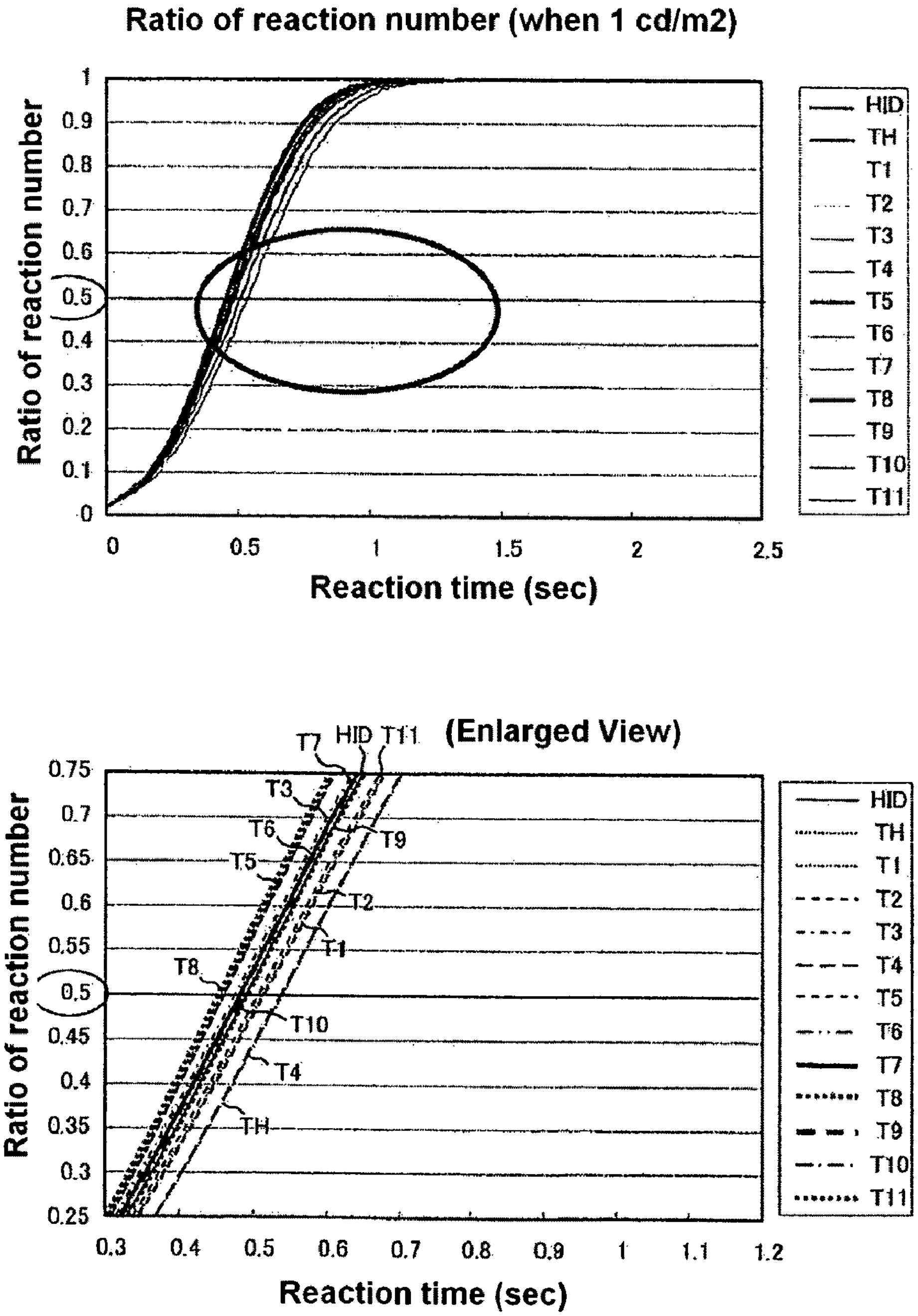
FIG. 16 includes graphs showing the relationship between the ratio of the reaction number and the reaction time for a light source (luminance: 1 $cd/m^2$)) used in Experiment 2.

FIG. 16 includes graphs showing the relationship between the ratio of the reaction number and the reaction time for a light source (luminance: 1 cd/m$^2$)) used in Experiment 2 as above.

With reference to FIG. 16, the order that the ratio of the reaction number reaches 0.5 is that of T10, T8, T5, T3, T7, T9, HID, T11, T2, T1, TH, and T4. In view of this, the light source with higher color temperature was likely to provide a shorter reaction time within which the ratio of the reaction number reaches 0.5. Namely, it is revealed that the light source with higher color temperatures can improve the visibility (noticeability) with a peripheral vision with regard to the noticeability of white light.

FIG. 17 includes graphs showing the relationship between the ratio of the reaction number and the reaction time for a light source (luminance: 0.1 cd/m$^2$)) used in Experiment 2 above.

With reference to FIG. 17, the order that the ratio of the reaction number reaches 0.5 is that of T8, T5, T7, HID, T9, T6, T11, T1, T10, T3; T4, T2, and TH. In view of this, the light source with higher color temperature was likely to provide a shorter reaction time within which the ratio of the reaction number reaches 0.5. Namely, it is revealed that the light source with higher color temperatures can improve the visibility (noticeability) with a peripheral vision with regard to the noticeability of white light.

Figure 18:
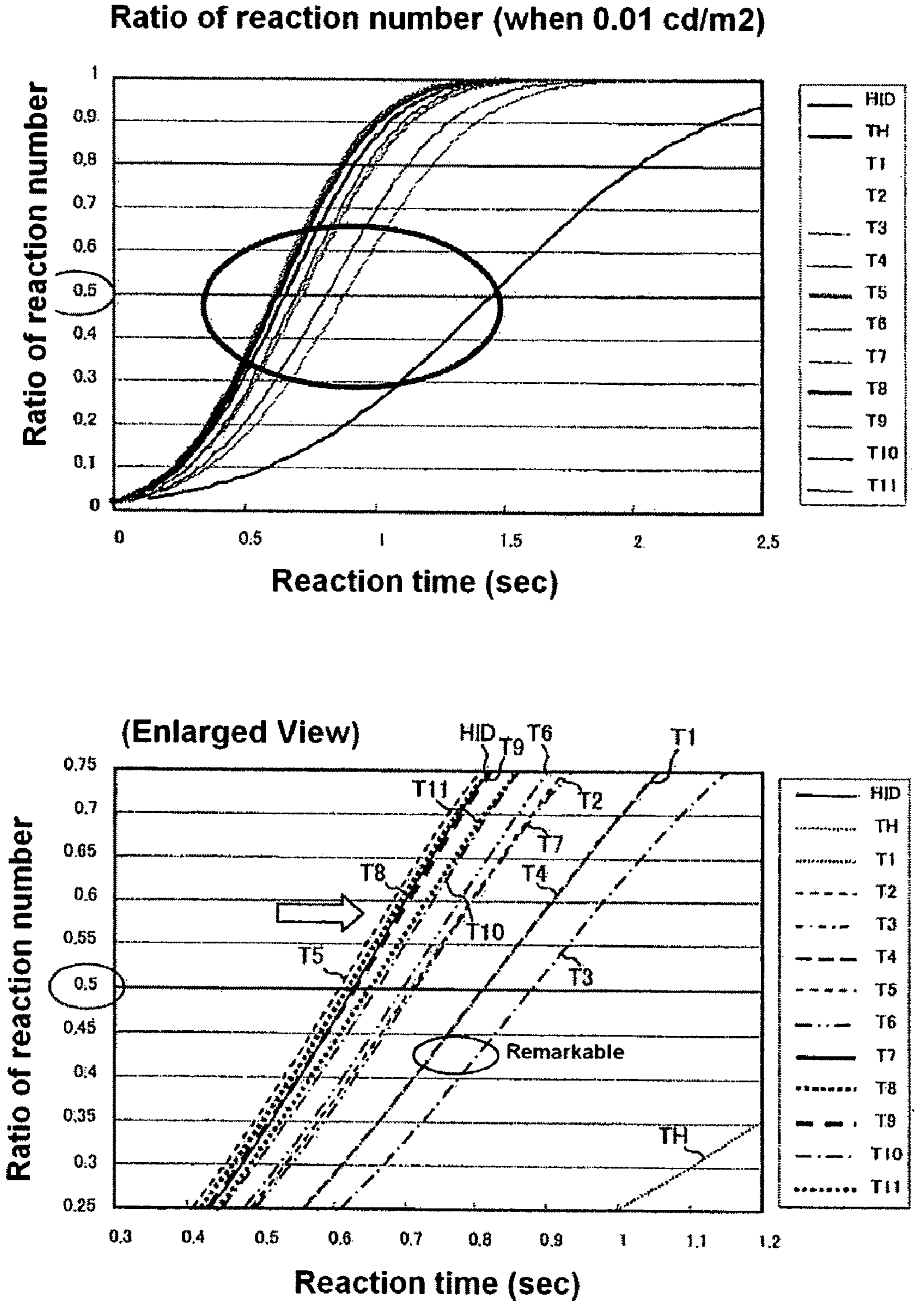
FIG. 18 includes graphs showing the relationship between the ratio of the reaction number and the reaction time for a light source (luminance: 0.01 $cd/m^2$)) used in Experiment 2.
Figure 20:
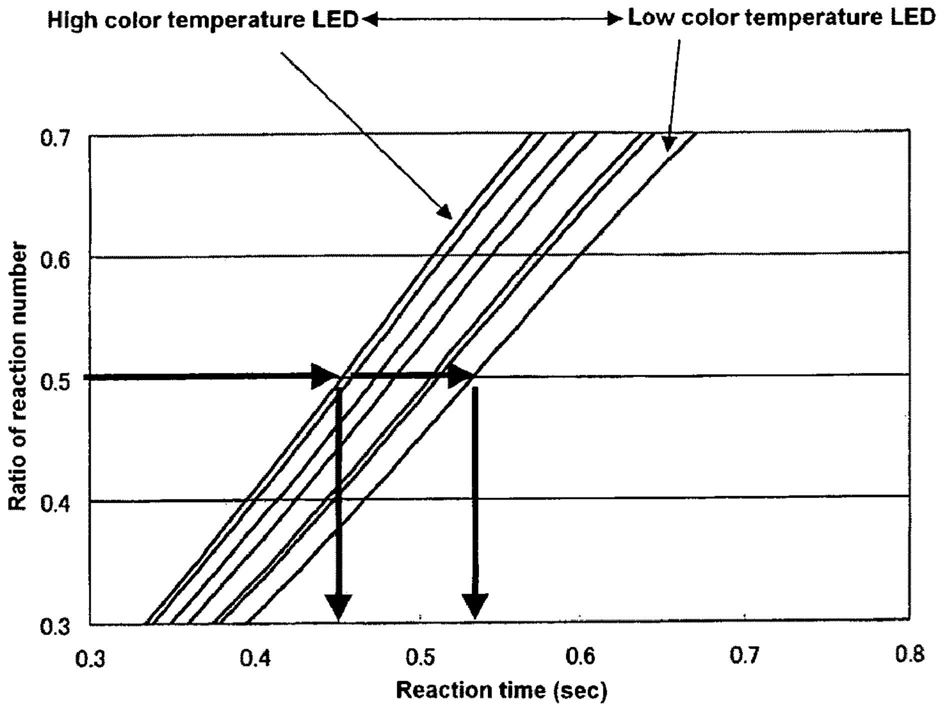
FIG. 20 is a graph for explaining the improved visibility (noticeability) with a peripheral vision when using a light source with a higher color temperature with regard to the noticeability of white light.

FIG. 18 includes graphs showing the relationship between the ratio of the reaction number and the reaction time for a light source (luminance: 0.01 cd/m$^2$)) used in Experiment 2 above.

With reference to FIG. 18, the order that the ratio of the reaction number reaches 0.5 is that of T5, T8, T9, HID, T11, T10, T6, T2, T7, T3, T1, T3, and TH. In view of this, the light source with higher color temperature was likely to provide a shorter reaction time within which the ratio of the reaction number reaches 0.5. Namely, it is revealed that the light source with higher color temperatures can improve the visibility (noticeability) with a peripheral vision with regard to the noticeability of white light.

FIG. 19 includes graphs showing the averaged values shown in the graphs of FIGS. 16 to 18. The item of "ratio of reaction number" in the table of FIG. 13A shows the evaluation results of each light source on the basis of the reaction time within which the ratio of the reaction number reaches 0.5. The light source with which the reaction time within which the ratio of the reaction number reaches 0.5 is short is said to be a light source that can improve the visibility (noticeability) by the peripheral vision, and accordingly, such a light source is assigned to a higher evaluation score.

With reference to the item of "ratio of reaction number" in the table of FIGS. 19 and 13A, the order that the ratio of the reaction number reaches 0.5 is that of T8, T5, HID, T9, T10, T7, T11, T6, T2, T1, T3, T4, and TH. In view of this, the light source with higher color temperature was likely to provide a shorter reaction time within which the ratio of the reaction number reaches 0.5. Namely, it is revealed that the light source with higher color temperatures can improve the visibility (noticeability) with a peripheral vision with regard to the noticeability of white light.

As discussed above, the total scores of the reaction time, the ratio of reaction number, and the missing rate as scored described above are utilized to evaluate overall judgment for respective light sources (see FIGS. 13A and 13B), whereby it is revealed that the light source with higher color temperatures can improve the visibility (noticeability) with a peripheral vision with regard to the noticeability of white light.

[Noticeability of Color Material]

In an actual traffic environment, the reflected light from a headlamp does not include only a white light beam but light beams with other colors. The present inventors have conducted the next experiment for confirming whether the visibility (noticeability) by peripheral vision is different for respective colors other than white.

Experiment 2

Figure 21:
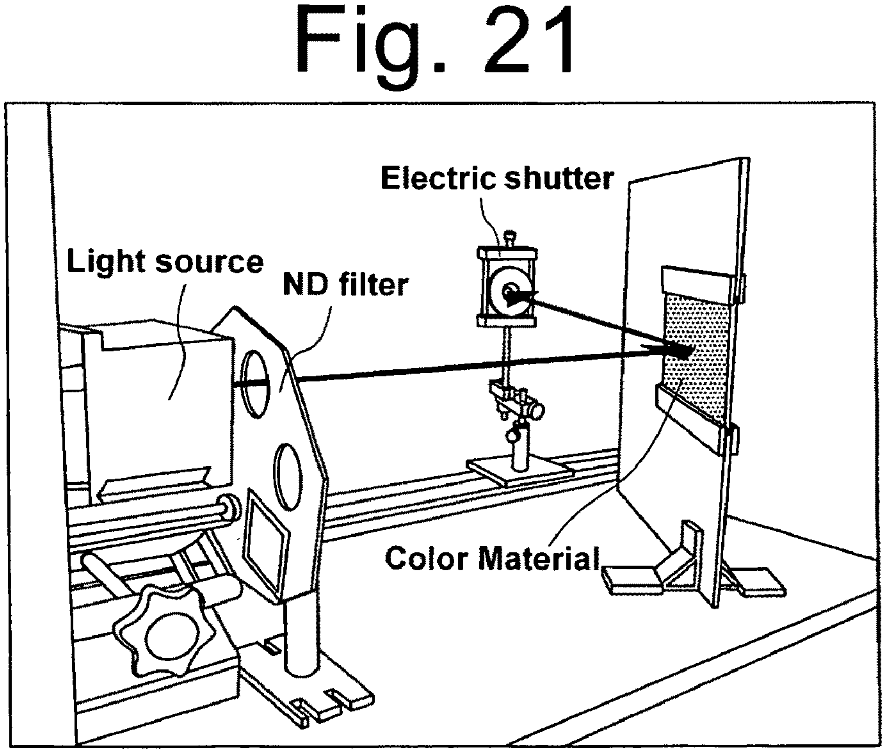
FIG. 21 is a diagram illustrating the configuration of an apparatus for use in Experiment 3 for determining the difference in visibility (noticeability) by the peripheral vision with respect to colors other than white.

Experiment Environment: The device with the configuration shown in FIG. 21 and a plurality of light sources T5, T6, T7, T9, TH, and HID with various correlated color temperatures as a presenting light source as shown in FIG. 11 were used. T5, T6, T7, and T9 represent LEDs, TH a halogen lamp, and HID an HID lamp. The number of test subjects was 18 persons.

Experiment procedure: While a test subject is allowed to see a display (showing Japanese syllabary characters) disposed 2 m away from its front, a color material (red, green, blue, and yellow) illuminated with a light source (T5, T6, T7, T9, TH or HID) having a constant light luminance is presented at positions of 30 degrees, 45 degrees, 60 degrees, and 75 degrees leftward (rightward) with respect to the front. Time (reaction time) at which the test subject recognizes (notices) the presented light was measured for each light source at each presenting position.

Figure 22:
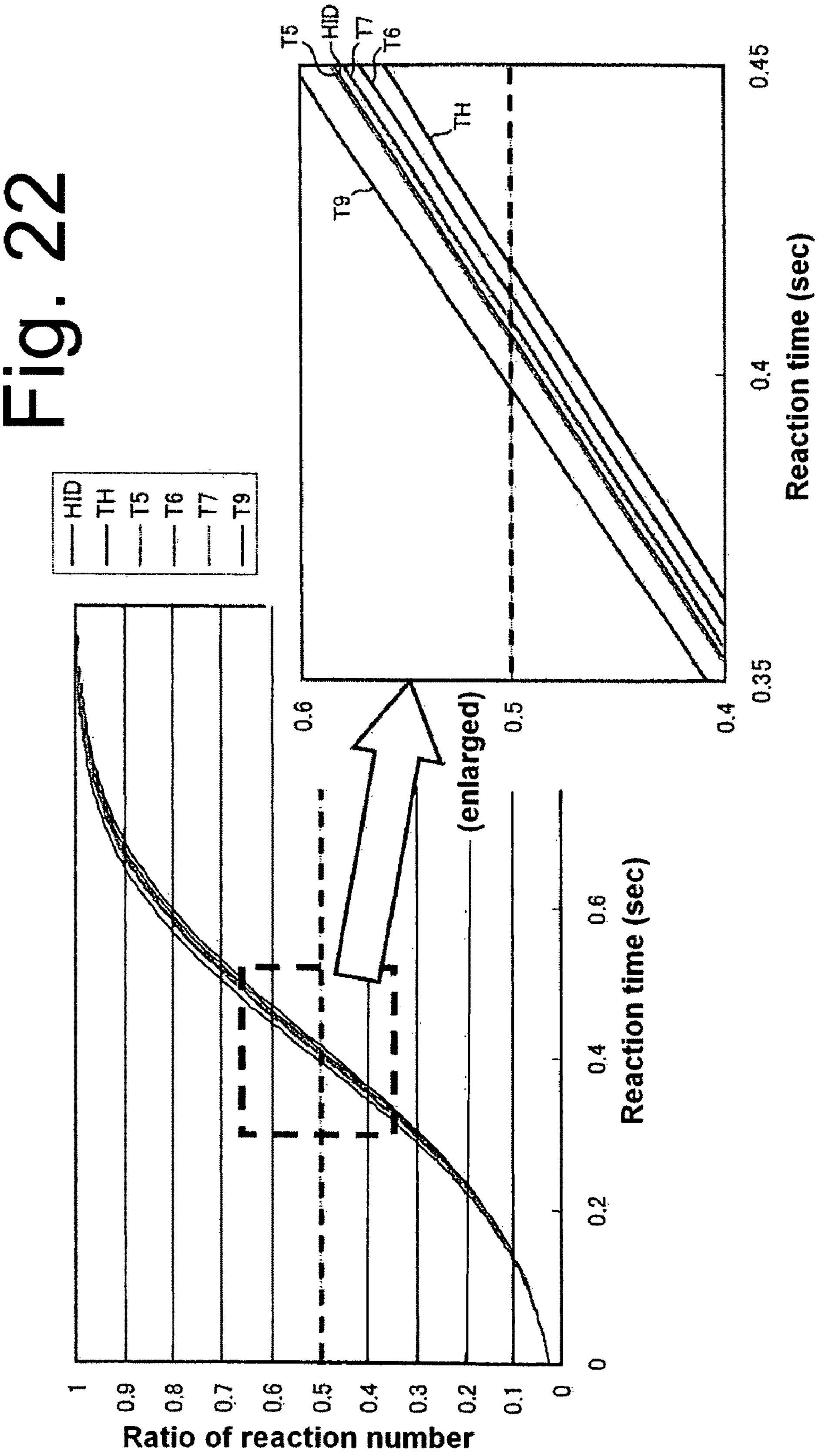
FIG. 22 is a graph showing the relationship between the rate of the reaction number and the reaction time for the light source used in Experiment 3.

FIG. 22 includes graphs showing the relationship between the ratio of the reaction number and the reaction time for a light source used in Experiment 3 above.

With reference to FIG. 22, it is revealed that the light source providing a shorter reaction time within which the ratio of the reaction number reaches 0.5 is the LED (T9) with regard to the noticeability of a color material.

Figure 23:
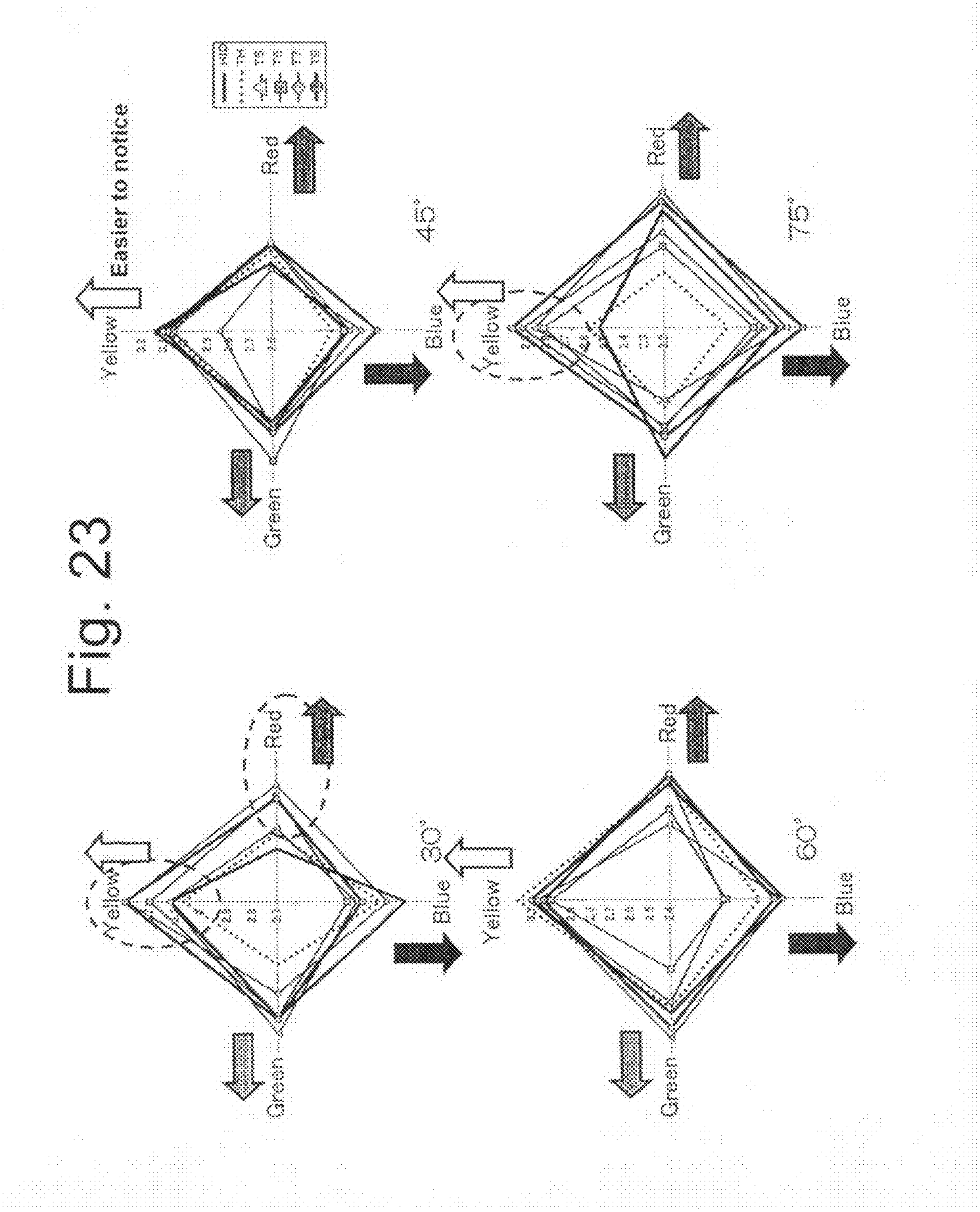
FIG. 23 includes graphs obtained by plotting the reciprocals of averaged reaction times with respect to the color materials of light sources used in Experiment 3 in a coordinate system wherein the plus side of the vertical axis represents Yellow, the minus side thereof represents Blue, the plus side of the horizontal axis represents Red, and the minus side thereof represents Green.

FIG. 23 includes graphs obtained by plotting the reciprocals of averaged reaction times with respect to the color materials of light sources used in Experiment 3 above in a coordinate system wherein the plus side of the vertical axis represents Yellow, the minus side thereof represents Blue, the plus side of the horizontal axis represents Red, and the minus side thereof represents Green. The light source with the larger rhombus connecting the coordinate values shall means the higher degree of improvement in visibility (noticeability) by the peripheral vision.

Figure 24:
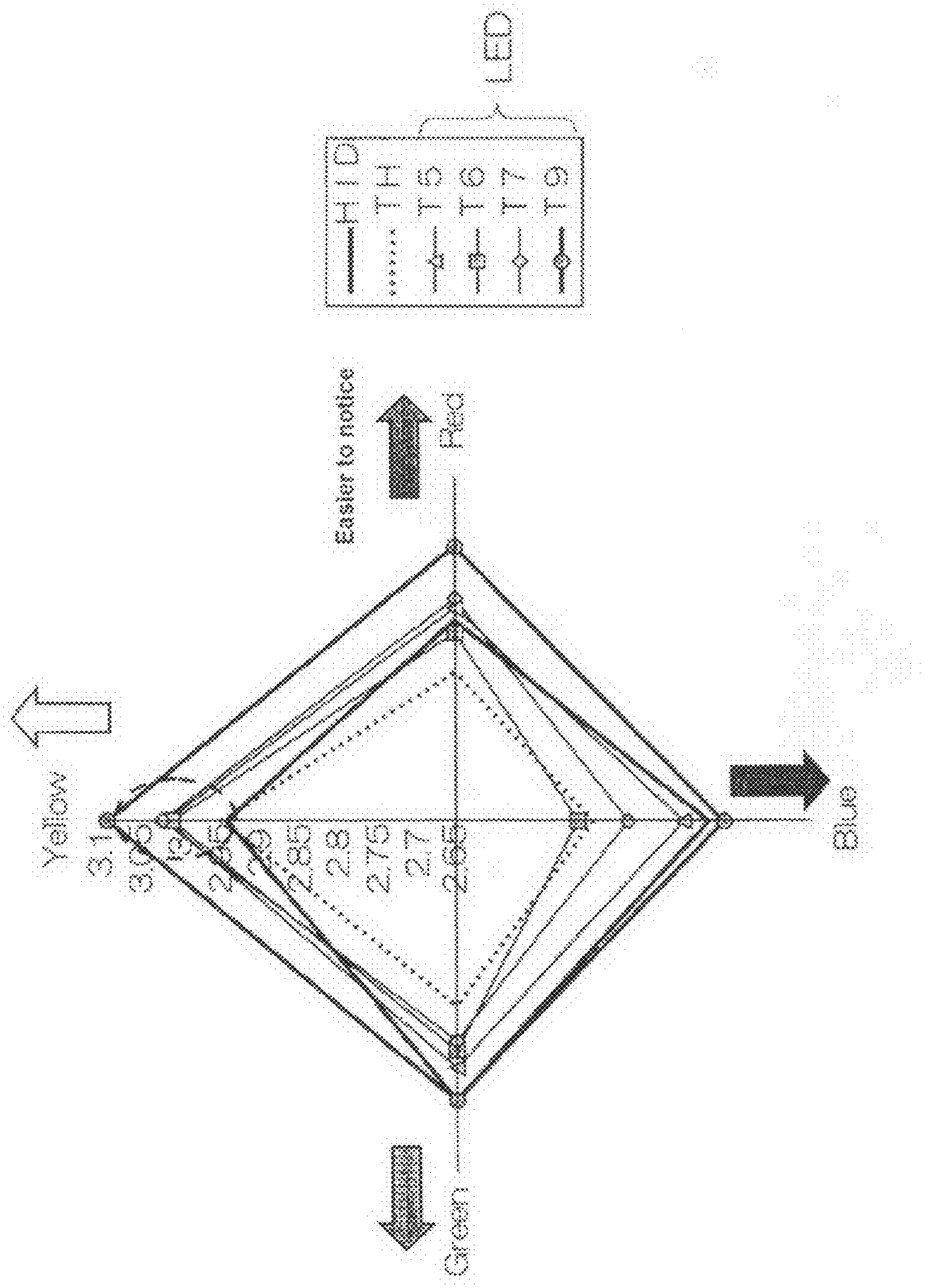
FIG. 24 is a graph showing the averaged values showing in the four graphs of FIG. 23.

FIG. 24 is a graph showing the averaged values showing in the four graphs shown in FIG. 23. Referring to FIG. 24, the rhombuses for LEDs are larger than those for TH and HID, meaning that the visibility (noticeability) by the peripheral vision with regard to the noticeability of color (color material) illuminated with LEDs is improved better than those in the cases of TH and HID.

Figure 25:
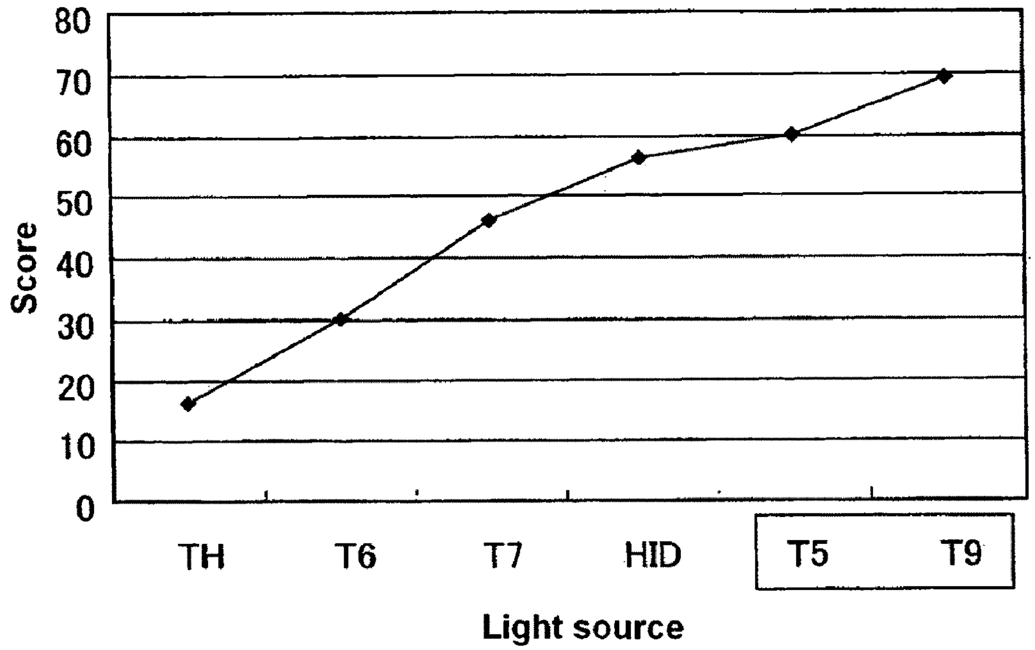
FIG. 25 is a graph showing the relationship between each light source and the evaluation points.
Figure 26:
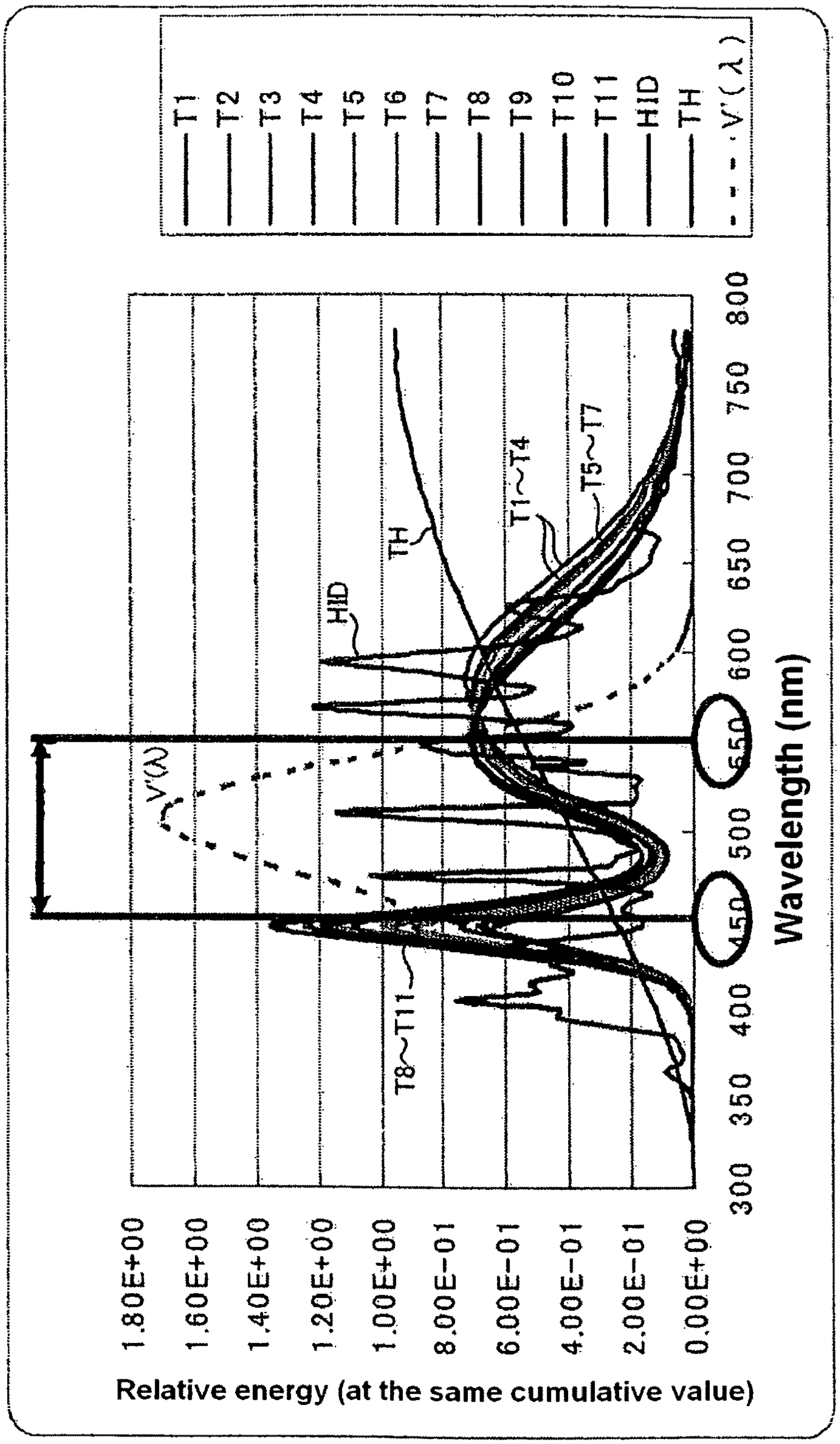
FIG. 26 is a graph for explaining the fact that the sensitivity to light with specific wavelengths (450 nm to 550 nm) becomes higher in the case of dim light vision (also in the case of mesopic vision) than in the case of photopic vision.
Figure 27:
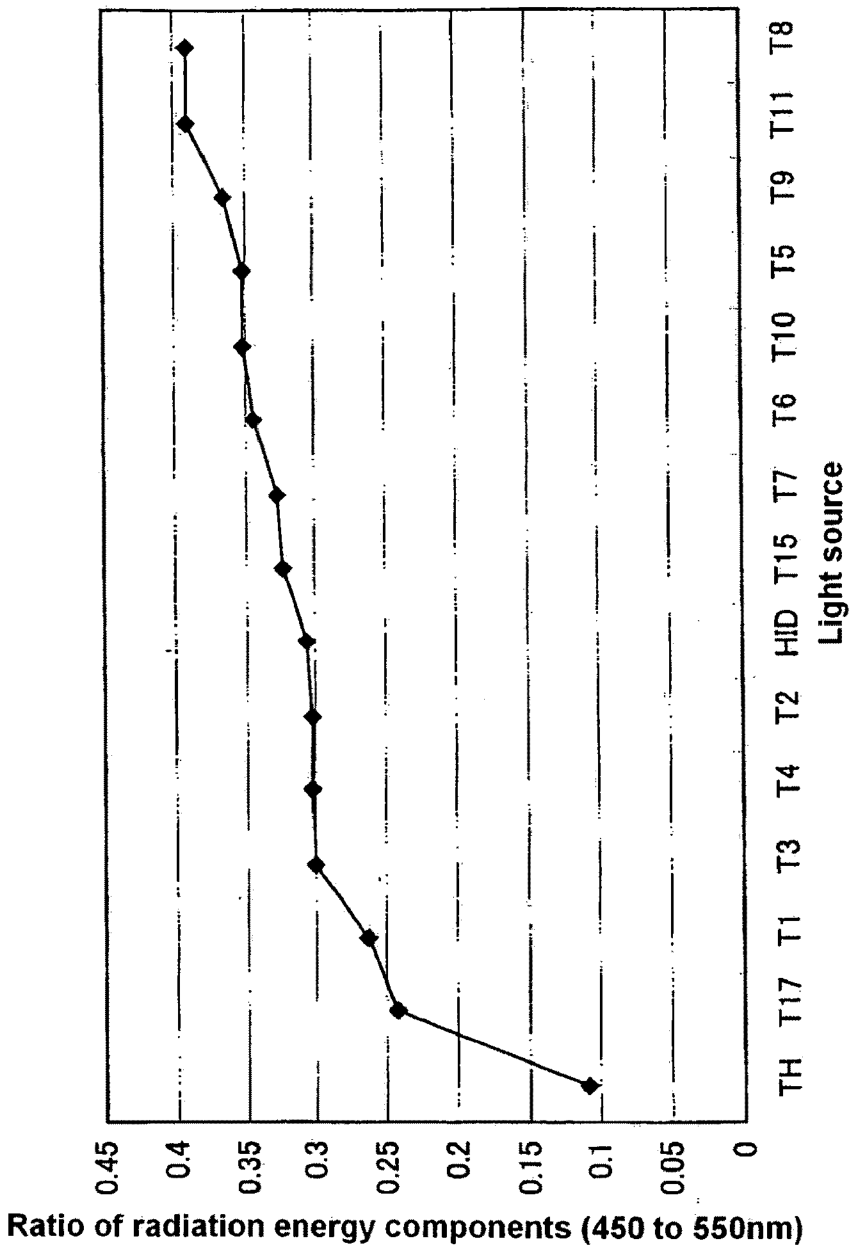
FIG. 27 is a graph for explaining the fact that the light source with higher color temperatures tends to include higher radiation energy components.

When the results of Experiments 2 and 3 are gathered to conduct the evaluation, it is revealed that the light source with higher color temperatures can improve the visibility (noticeability) with a peripheral vision with regard to the noticeability of white light and color (color material) (see FIG. 25. This can also confirm by referring to FIGS. 26 and 27. FIG. 26 shows the fact that the sensitivity to light with specific wavelengths (450 nm to 550 nm) becomes higher in the case of dim light vision (also in the case of mesopic vision) than in the case of photopic vision. Furthermore, FIG. 27 shows the fact that the light source with higher color temperatures tends to include higher radiation energy components. It should be noted that the "ratio of radiation energy components" equals to (radiation energy components existing in a particular range)/(radiation energy components existing in the visible range).

Figure 28:
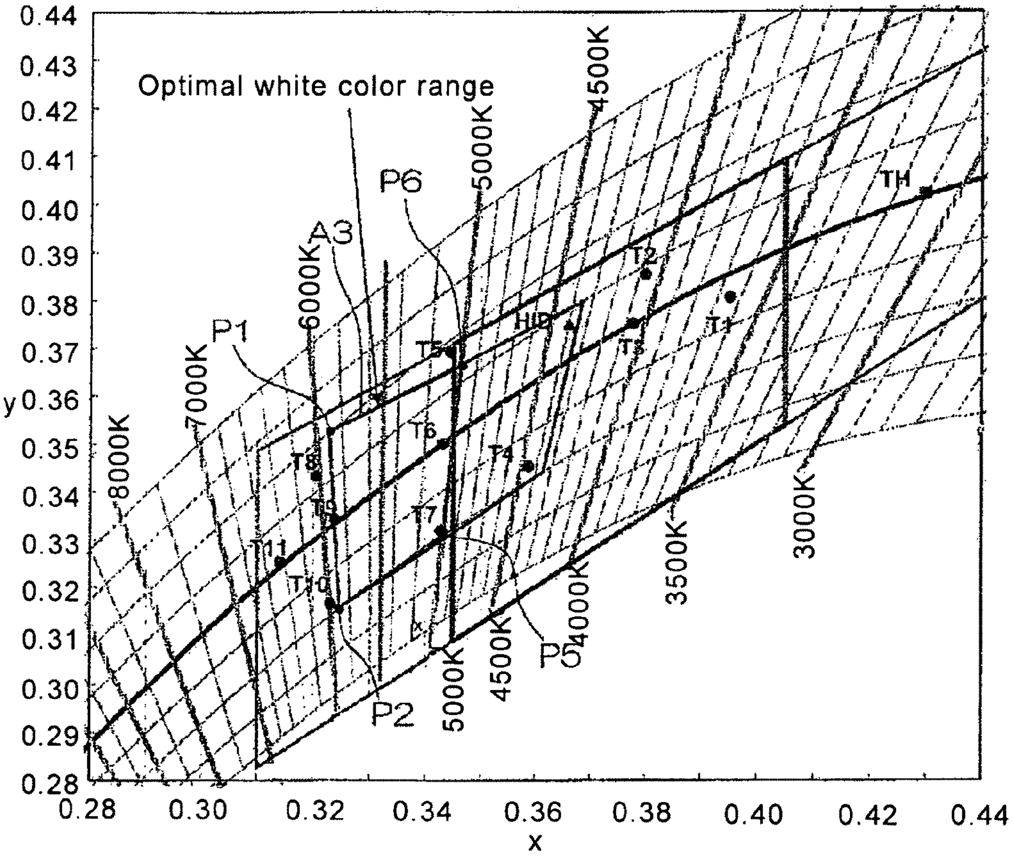
FIG. 28 is a graph for explaining the white range A3 (color range suitable for a headlamp) within which light beams from a headlamp can provide improved visibility (noticeability) with the peripheral vision.
Figure 29:
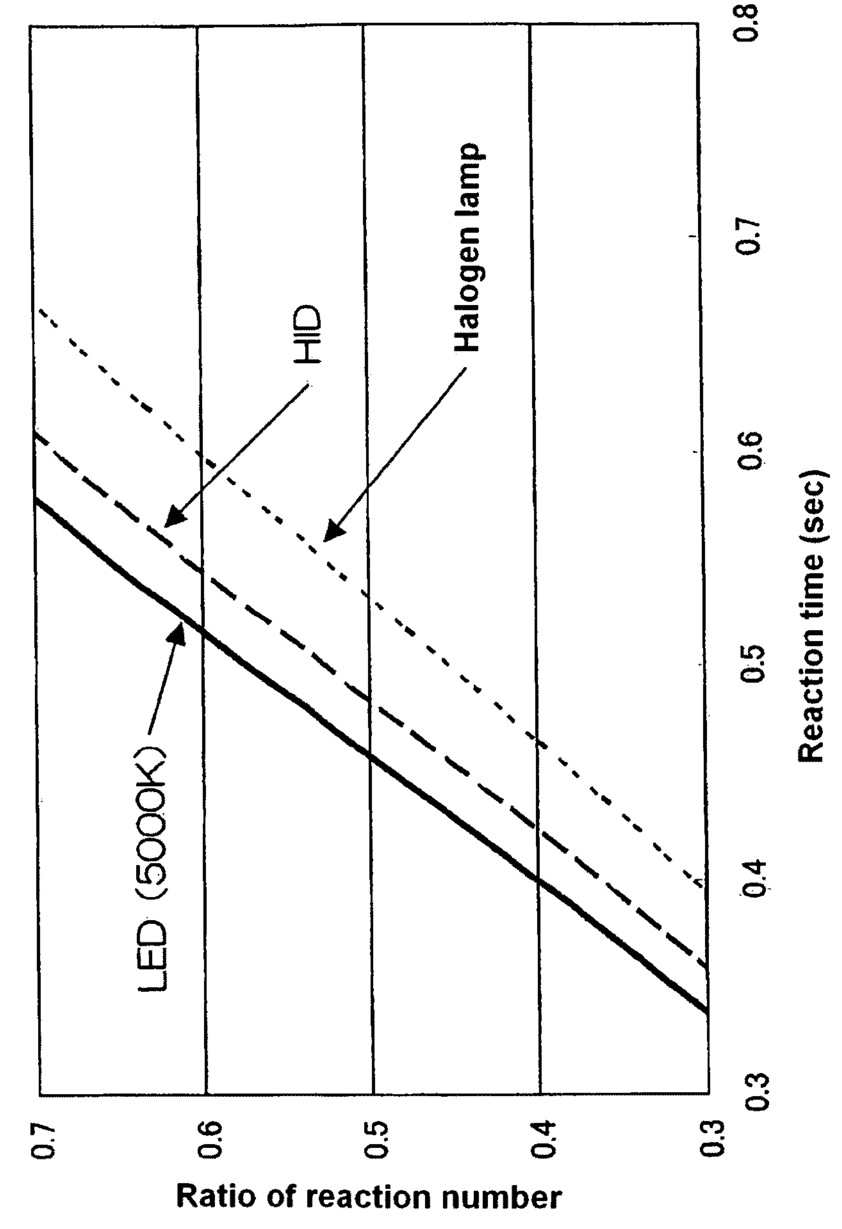
FIG. 29 is a diagram for explaining the fact that the LED with the color temperature of 5000 K or higher can allow a person to notice the light from the LED at a time shorter than a halogen lamp (TH) and an HID lamp (HID)

In conclusion, based on the above results, it can be confirmed that the white color range (preferred range of color as a color of a headlamp) within which the visibility (noticeability) with a peripheral vision can be improved with regard to the noticeability of white light or color (color material) can be defined by the color range A3 surrounded by lines connecting coordinate values of P1, P2, P5, and P6 in the xy color coordinate system as shown in FIG. 28.

In view of this color range A3 (see FIG. 28) and the fact revealed as described above with reference to FIGS. 13A and 13B (the light source with higher color temperatures can improve the visibility (noticeability) with a peripheral vision) as well as the fact that the visibility (noticeability) with LEDs of color temperatures of 5000 K or more is improved better than those in the cases of TH and HID, one of the conditions for improving the visibility (noticeability) with a peripheral vision is appeared to be a color temperature of 5000 K to 6000 K.

The present inventors further conducted additional experiment described below to clarify whether light within the area (see FIG. 30) among the white color range A2 that had been confirmed as preferred color of light as a headlamp can also improve the visibility (noticeability) with a peripheral vision (the area where the relationship between the color of white light and the noticeability had not been confirmed by the above Experiments 2 and 3).

Additional Experiment

Figure 30:
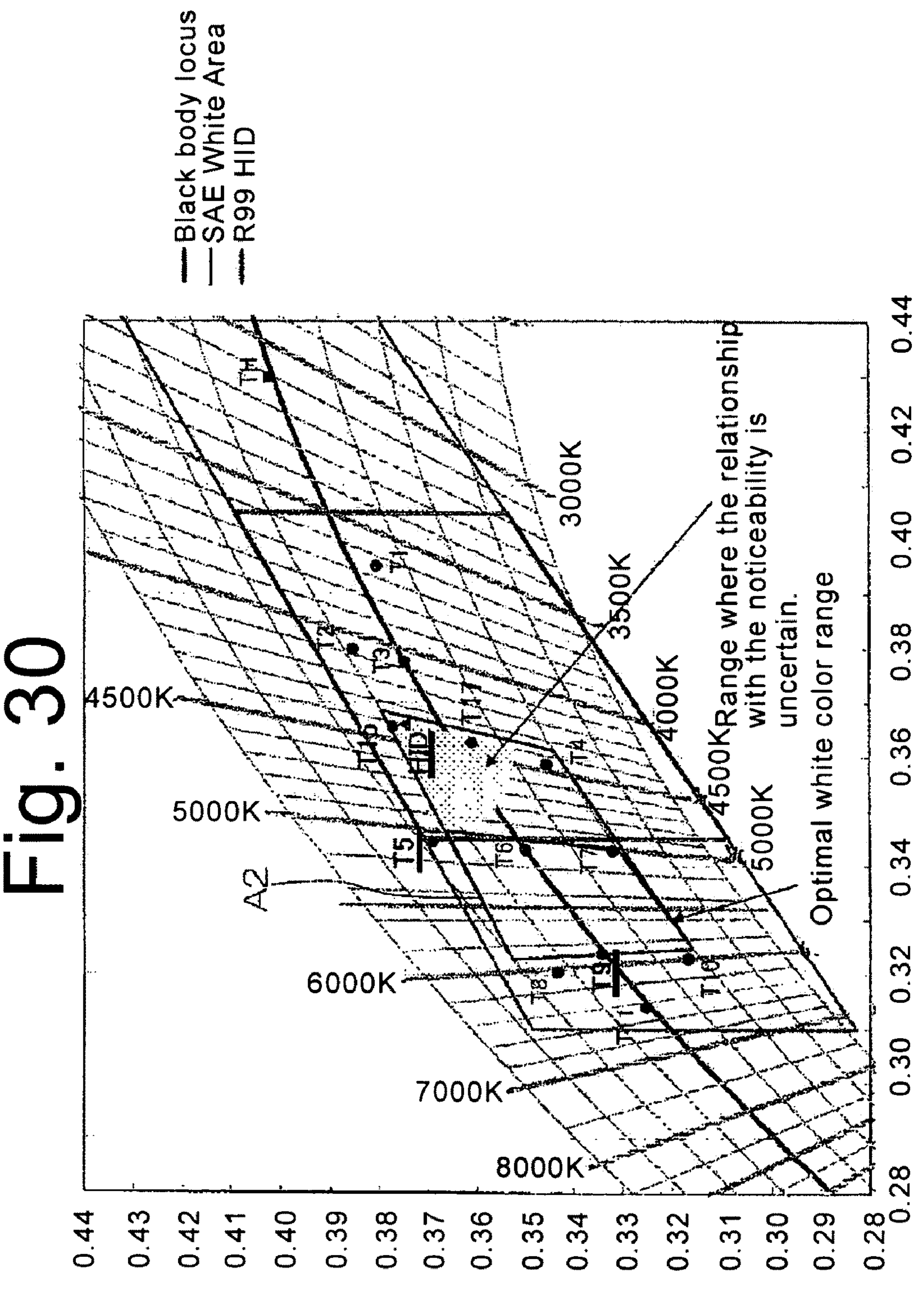
FIG. 30 is a graph for explaining the area where the relationship with the noticeability has not been clarified by Experiment 2 and Experiment 3.

Experiment Environment: The device with the configuration shown in FIG. 10 and a plurality of light sources T1 to T11, TH, and HID with various correlated color temperatures as a presenting light source as shown in FIG. 11 were used. In addition, LEDs T15 and T17 with the correlated color temperatures as shown in FIG. 30 were used. T1 to T11 and T15 and T17 represent LEDs, TH a halogen lamp, and HID an HID lamp. The number of test subjects was 18 persons.

Experiment procedure: While a test subject is allowed to see a display (showing Japanese syllabary characters) disposed 2 m away from its front, a light source (T1 to T11, T15, T17, TH or HID) having a constant light luminance (1 or 0.1 cd/m$^2$) is presented at each of positions of 30 degrees, 45 degrees, 60 degrees, and 75 degrees leftward (rightward) with respect to the front. Time (reaction time) at which the test subject recognizes (notices) the presented light was measured for each light source at each presenting position.

[Reaction Time for Each Light Source at Each Presenting Position]

The relationship between a reaction time and a presenting position as determined in Additional Experiment above was the same as in Experiment 2 (see FIG. 12, and a redundant description is omitted here.

[Missing Rate]

Figure 31:
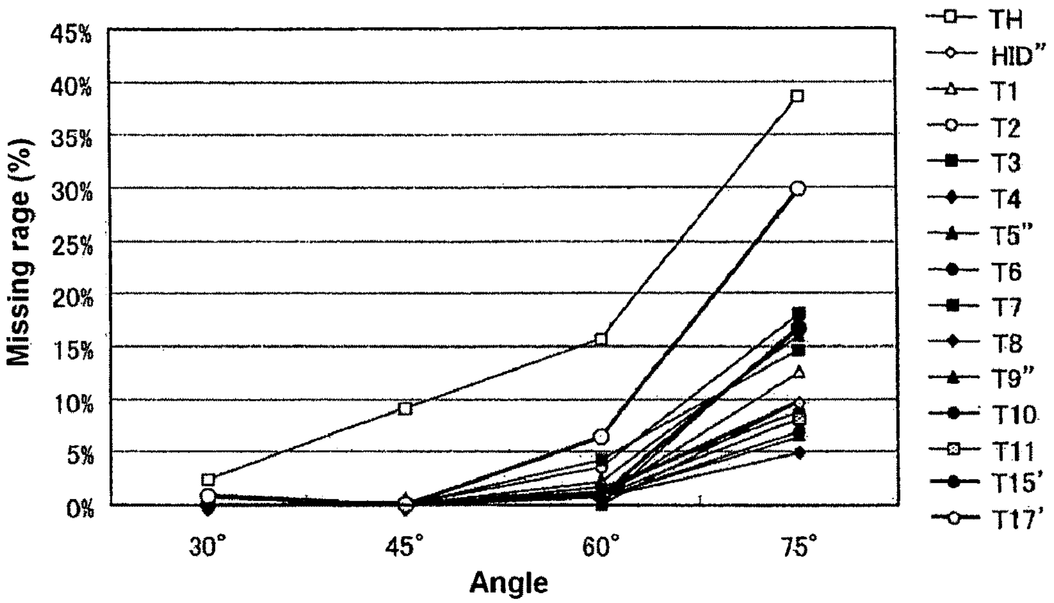
FIG. 31 is a graph showing the relationship between the reaction position and the missing rate (rate of persons who can notice the presented light over 2 seconds) calculated on the basis of the reaction time measured in Additional Experiment for each light source.

FIG. 31 is a graph showing the relationship between the presenting position and the missing rate (rate of persons who can notice the presented light over 2 seconds) calculated on the basis of the reaction time measured in the above Additional Experiment for each light source. The calculated missing rate was derived from the reaction time data that had been corrected on the basis of the data for HID.

With reference to FIG. 31, it was revealed that LED T15 corresponds to a light source with a low color temperature in terms of missing rate.

[Ratio of Reaction Number]

Figure 32:
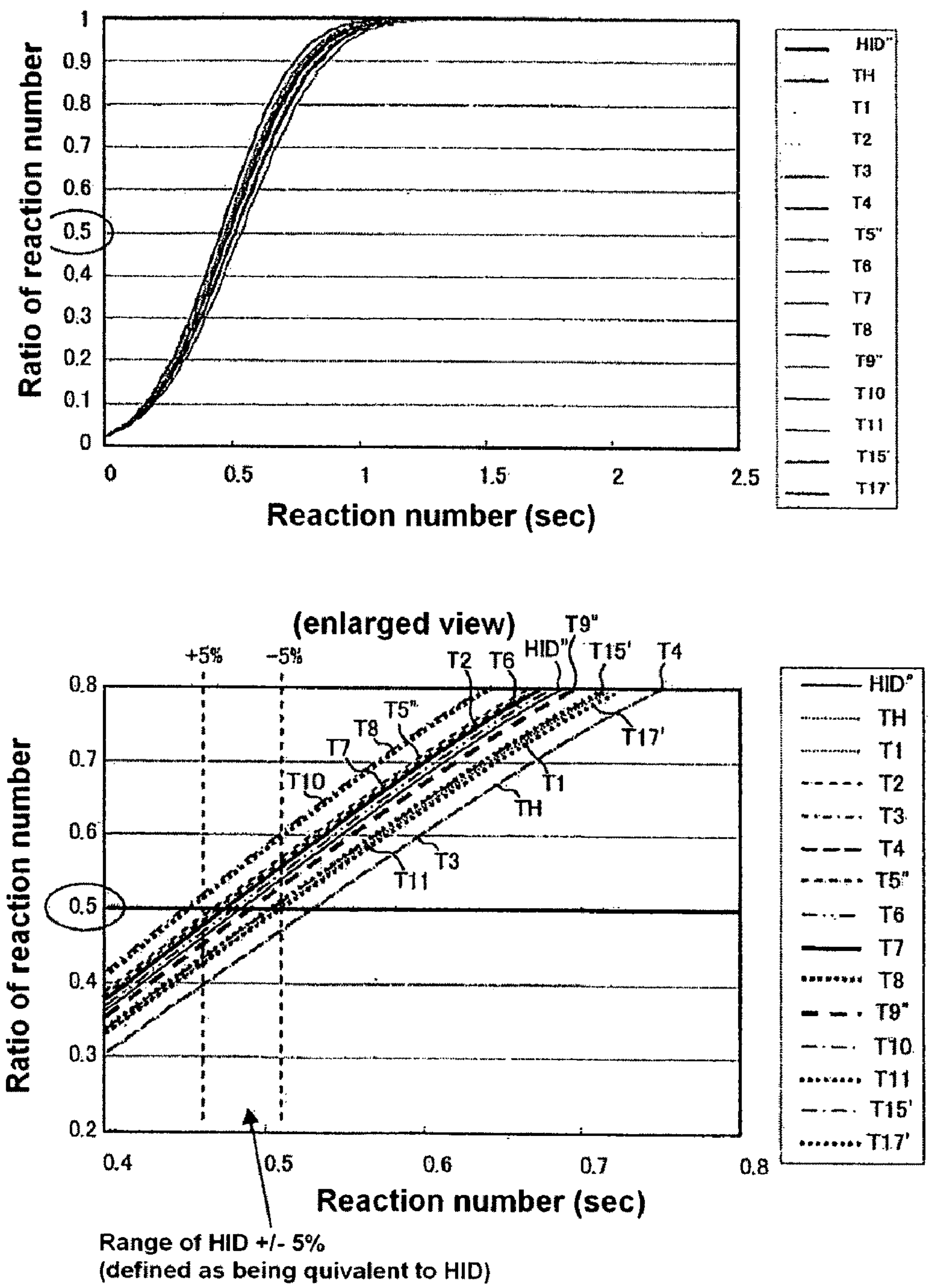
FIG. 32 includes graphs showing the relationship between the ratio of the reaction number and the reaction time for a light source (luminance: 1 $cd/m^2$)) used in Additional Experiment.

FIG. 32 includes graphs showing the relationship between the ratio of the reaction number and the reaction time for a light source (luminance: 1 cd/m$^2$)) used in Additional Experiment as above. The calculated ratio of reaction number was derived from the reaction time data that had been corrected on the basis of the data for HID.

With reference to FIG. 32, the order that the ratio of the reaction number reaches 0.5 is that of T10, T8, T5=T3=T7=T6=HID=T9=T11=T15, T2, T17, T1, TH, and T4.

Figure 33:
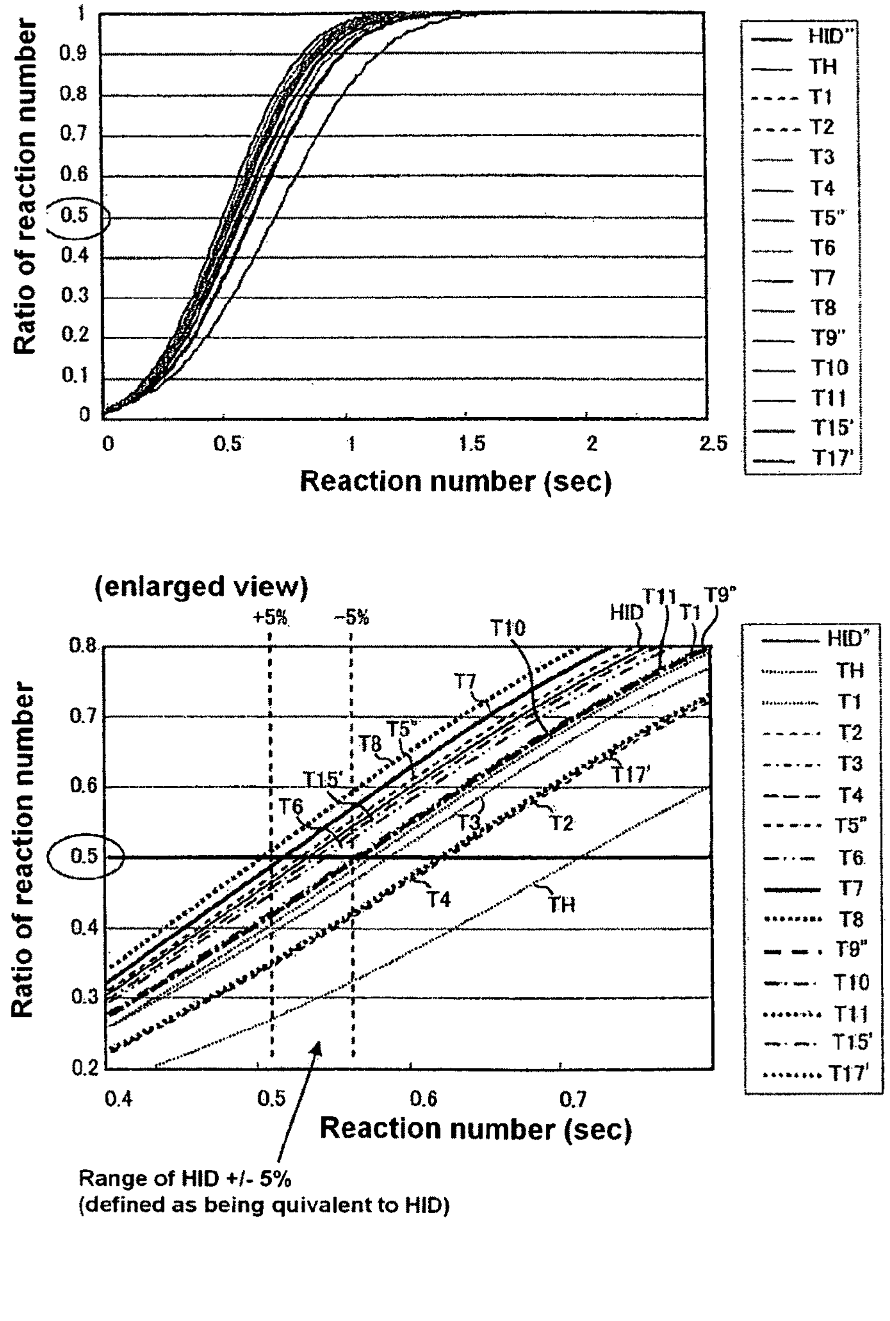
FIG. 33 includes graphs showing the relationship between the ratio of the reaction number and the reaction time for a light source (luminance: 0.1 $cd/m^2$)) used in Additional Experiment.

FIG. 33 includes graphs showing the relationship between the ratio of the reaction number and the reaction time for a light source (luminance: 0.1 cd/m$^2$)) used in Additional Experiment as above. The calculated ratio of reaction number was derived from the reaction time data that had been corrected on the basis of the data for HID. With reference to FIG.

33, the order that the ratio of the reaction number reaches 0.5 is that of T8, T7=T5=HID=T15=T6, T11, T9, T1, T10, T3, T17, T4, T2, and TH.

FIG. 34 includes graphs showing the relationship between the ratio of the reaction number and the reaction time for a light source (luminance: 0.01 cd/m$^2$)) used in Additional Experiment as above. The calculated ratio of reaction number was derived from the reaction time data that had been corrected on the basis of the data for HID. With reference to FIG. 34, the order that the ratio of the reaction number reaches 0.5 is that of T5, T8=T9=HID=T11=T15=T10, T6, T2, T7, T4, T1, T17, T3, and TH.

Figure 35:
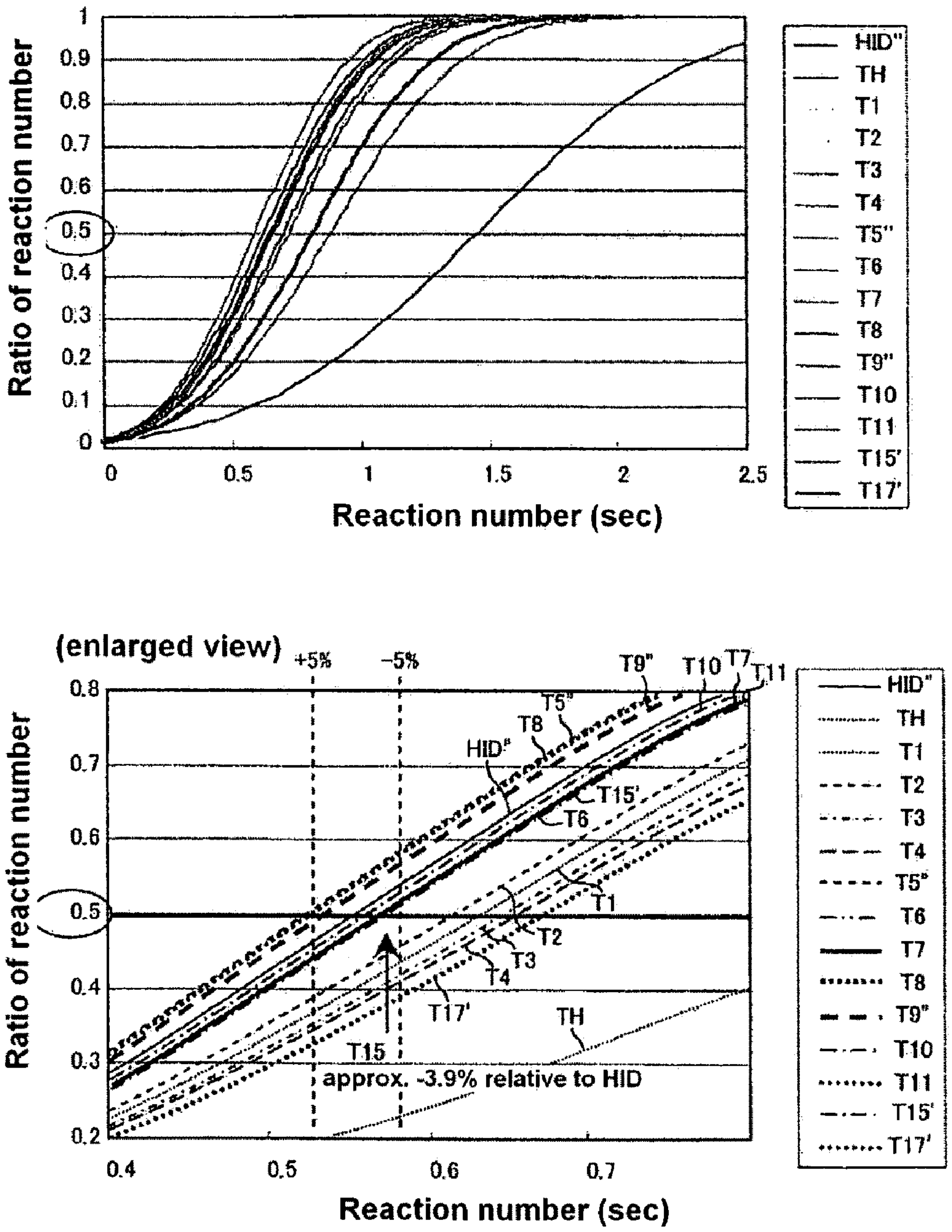
FIG. 35 includes graphs showing the averaged values shown in the graphs of FIGS. 32 to 34.

FIG. 35 includes graphs showing the averaged values shown in the graphs of FIGS. 32 to 34. With reference to FIG. 35, the order that the ratio of the reaction number reaches 0.5 is that of T5, T8, T9=HID=T10=T7=T11=T6=T15, T2, T1, T3, T4, T17, and TH. Namely, it was revealed that the reaction time for T15 was almost the same level as that for HID.

Accordingly, the results of the above Additional Experiment reveals that LED T15 has a reaction time same as the light sources with higher color temperatures, and that LED T17 has a reaction time similar to the light sources with lower color temperatures.

Figure 36:
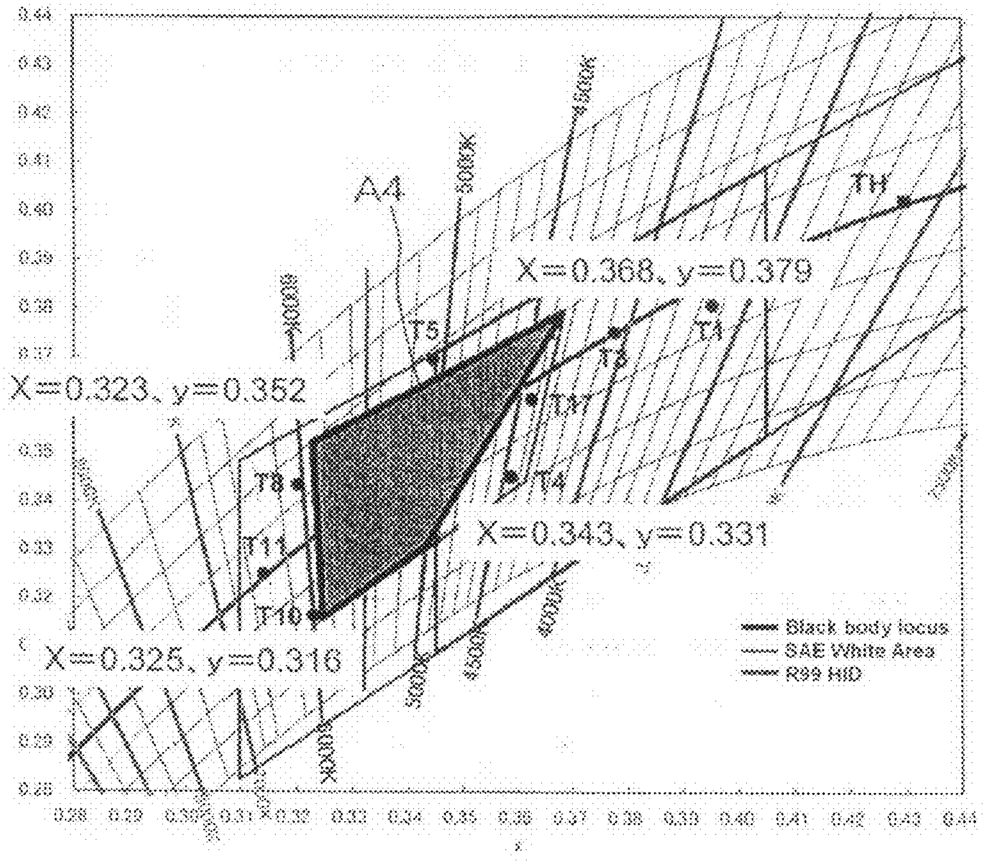
FIG. 36 is a graph for explaining the white range (color range suitable for a headlamp) within which light beams from a headlamp can provide improved visibility (noticeability) with the peripheral vision.

In conclusion, based on the above results from Experiments 1 to 3 and Additional Experiment, it can be confirmed that the white color range (preferred range of color as a color of a headlamp) within which the visibility (noticeability) with a peripheral vision can be improved can be defined by the color range A4 surrounded by lines connecting coordinate values of (0.323, 0.352), (0.325, 0.316), (0.343, 0.331), and (0.368, 0.379) in the xy color coordinate system as shown in FIG. 36.

In view of this color range A4 (see FIG. 36) and the fact revealed as described above with reference to FIGS. 13A and 13B (the light source with higher color temperatures can improve the visibility (noticeability) with a peripheral vision), one of the conditions for improving the visibility (noticeability) with a peripheral vision is appeared to be a color temperature of 4500 K to 7000 K.

[Predicted Color]

In general, a color can be observed as a different color depending on a kind of light, source. This is because light sources have respective spectra as well as human eyes can be accustomed (adaptation) to the different color of light source. It is said that an observed color can be predicted by a known formula to a certain extent.

Figure 37:
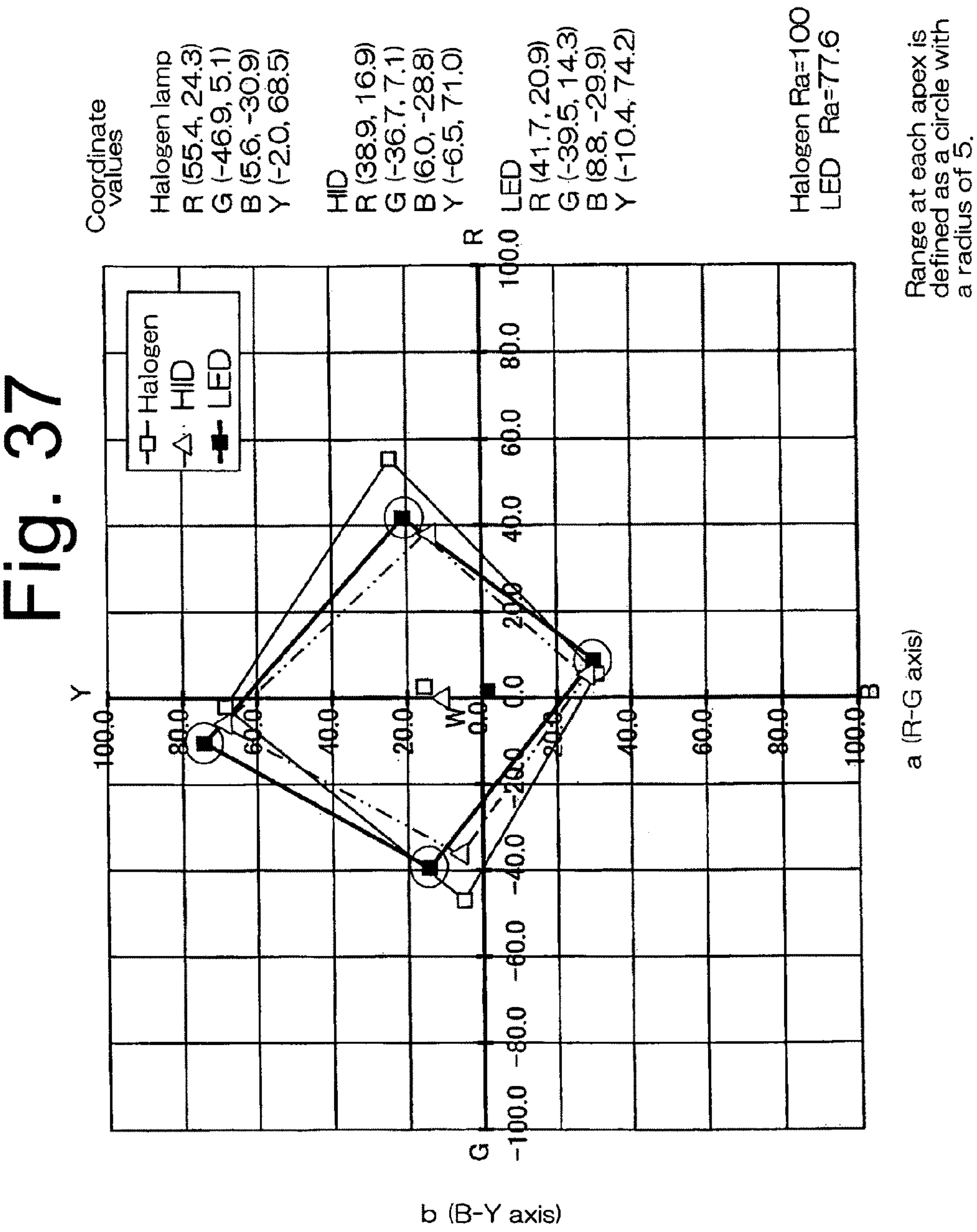
FIG. 37 is a graph obtained by plotting four coordinate values of predicted four colors including red, green, blue and yellow in the a* b* coordinate system corresponding to the CIE 1976 L*a*b* color space (+a* is a red direction, −a* is a green direction, b* is a yellow direction, and −b* is a blue direction) for each light source of TH, HID and LED (T9), the values being calculated on the basis of respective spectra of TH, HID, and LED (T9) using a known numerical expression.

FIG. 37 is a graph obtained by plotting four coordinate values of predicted four colors including red, green, blue and yellow in the a* b* coordinate system corresponding to the CIE 1976 L*a*b* color space (+a* is a red direction, −a* is a green direction, b* is a yellow direction, and −b* is a blue direction) for each light source of TH, HID and LED (T9). In this graph, the values are calculated on the basis of respective spectra of TH, HID, and LED (T9) using a known numerical expression. This graph can show a calculated observed color of light for each light source TH, HID, or LED (T9) as a predicted color. In FIG. 37, the closer to 100 the coordinate value is (namely, the larger the rhombus formed by connecting the four coordinate values is), the closer to the standard light source (corresponding sunlight with a color temperature of 6500 K) the light source can be considered (namely, the better the faithful reproduction of color is) when viewing color (color tags).

With reference to FIG. 37, the rhombus formed by connecting the coordinate values of R(41.7, 20.9), G(−39.5, 14.3), B(8.8, −29.9), and Y(−10.4, 74.2) for LED (T9) was large as compared with those for TH and HID. This means that the color tags can be observed more faithfully under the illumination with LED (T9) than under the illumination with TH or HID (more close to the observed state under the illumination with the standard light source), meaning that the colors are faithfully reproduced better.

Figure 38:
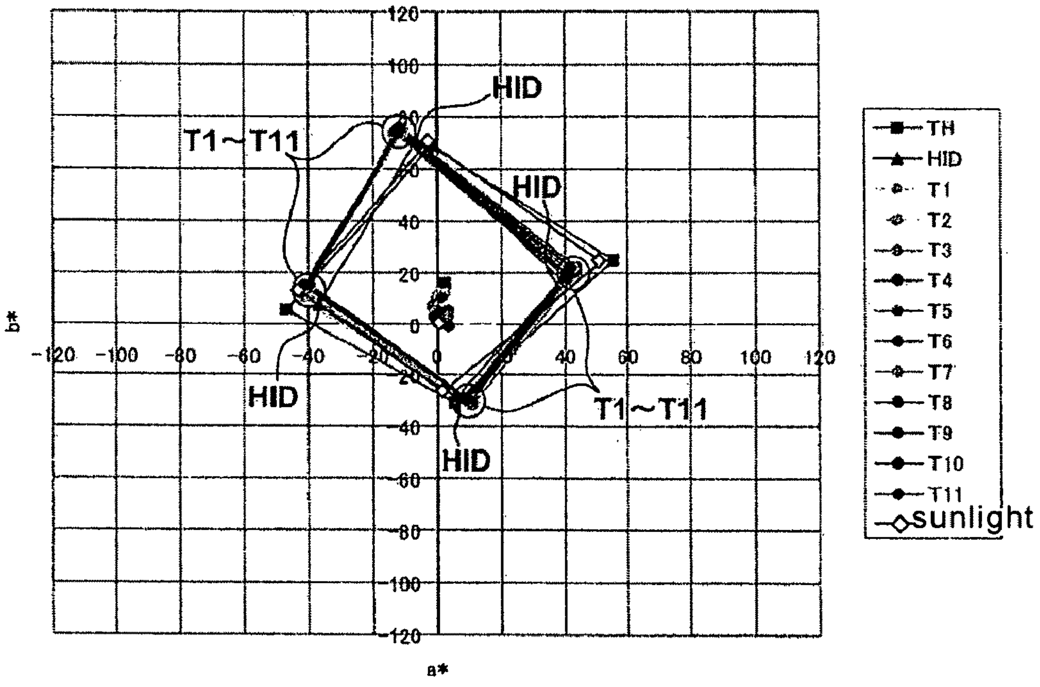
FIG. 38 is a diagram for explaining that the four coordinate values for other LEDs (T6, T7 and the like) other than LED (T9) are located within respective circle areas having a radius of 5 and each of center coordinate values of (41.7, 20.9) for red, (−39.5, 14.3) for green, (8.8, −29.9) for blue and (−10.4, 74.2) for yellow.

With reference to FIG. 38, the four coordinate values for LEDs (T6, T7, and the like) other than LED (T9) are located within respective circle areas having a radius of 5 and each of center coordinate values of (41.7, 20.9) for red, (−39.5, 14.3) for green, (8.8, −29.9) for blue and (−10.4, 74.2) for yellow, and the rhombuses formed by connecting the coordinate values of R, G, B, and Y for LEDs (T6, T7, and the like) other than LED (T9) were large as compared with those for TH and HID. This means that the color atlas can be observed faithfully under the illumination with LEDs (T6, T7, and the like) similar to with LED (T9), and more than under the illumination with TH or HID (more close to the observed state under the illumination with the standard light source), meaning that the colors are faithfully reproduced better.

In conclusion, the following conditions are satisfied to faithfully reproduce the observed color: the used LED light sources can emit light beams including four color light beams represented by four coordinate values of predicted four colors including red, green, blue and yellow in the a* b* coordinate system corresponding to the CIE 1976 L*a*b* color space, the four coordinate values in the a* b* coordinate system being encompassed by respective circle areas having a radius of 5 and each of center coordinate values of (41.7, 20.9) for red, (−39.5, 14.3) for green, (8.8, −29.9) for blue or (−10.4, 74.2) for yellow.

In view of this result, the fact that the white color range within which the visibility (noticeability) with a peripheral vision can be improved can be defined by the color range A3 (or A4), and the fact revealed as described above with reference to FIGS. 13A and 13B (the light source with higher color temperatures can improve the visibility (noticeability) with a peripheral vision), one of the conditions for improving the visibility (noticeability) with a peripheral vision is the above mentioned condition relating to the predicted four color ranges.

Accordingly, it is revealed that the conditions for improving the visibility (noticeability) with a peripheral vision include the use of an LED light source with a color temperature range of 4500 K to 7000 K (preferably, of 5000 K to 6000 K) and that can emit light beams including four color light beams represented by four coordinate values of predicted four colors including red, green, blue and yellow in the a* b* coordinate system corresponding to the CIE 1976 L*a*b* color space, the four coordinate values in the a* b* coordinate system being encompassed by respective circle areas having a radius of 5 and each of center coordinate values of (41.7, 20.9) for red, (−39.5, 14.3) for green, (8.8, −29.9) for blue and (−10.4, 74.2) for yellow. In an exemplary embodiment, the color of light beams as a headlamp falls within the color range A4 surrounded by lines connecting coordinate values of (0.323, 0.352), (0.325, 0.316), (0.343, 0.331), and (0.368, 0.379) in the xy color coordinate system as shown in FIG. 36.

Examples of the light source satisfying these conditions include LEDs T6, T7, and T9 with correlated color temperatures shown in FIG. 11.

It is known that the apparent luminance of LEDs are approx. 110% that of TH and HID in the case of dim light vision (also in the case of mesopic vision). This is also one advantageous reason for utilizing LED light sources 11 as a light source for a headlamp 100.

[Configuration of Headlamp]

Next, a description will be given of a configuration of a headlamp that satisfies the above conditions for improving the visibility (noticeability) with a peripheral vision as clarified above.

Figure 39:
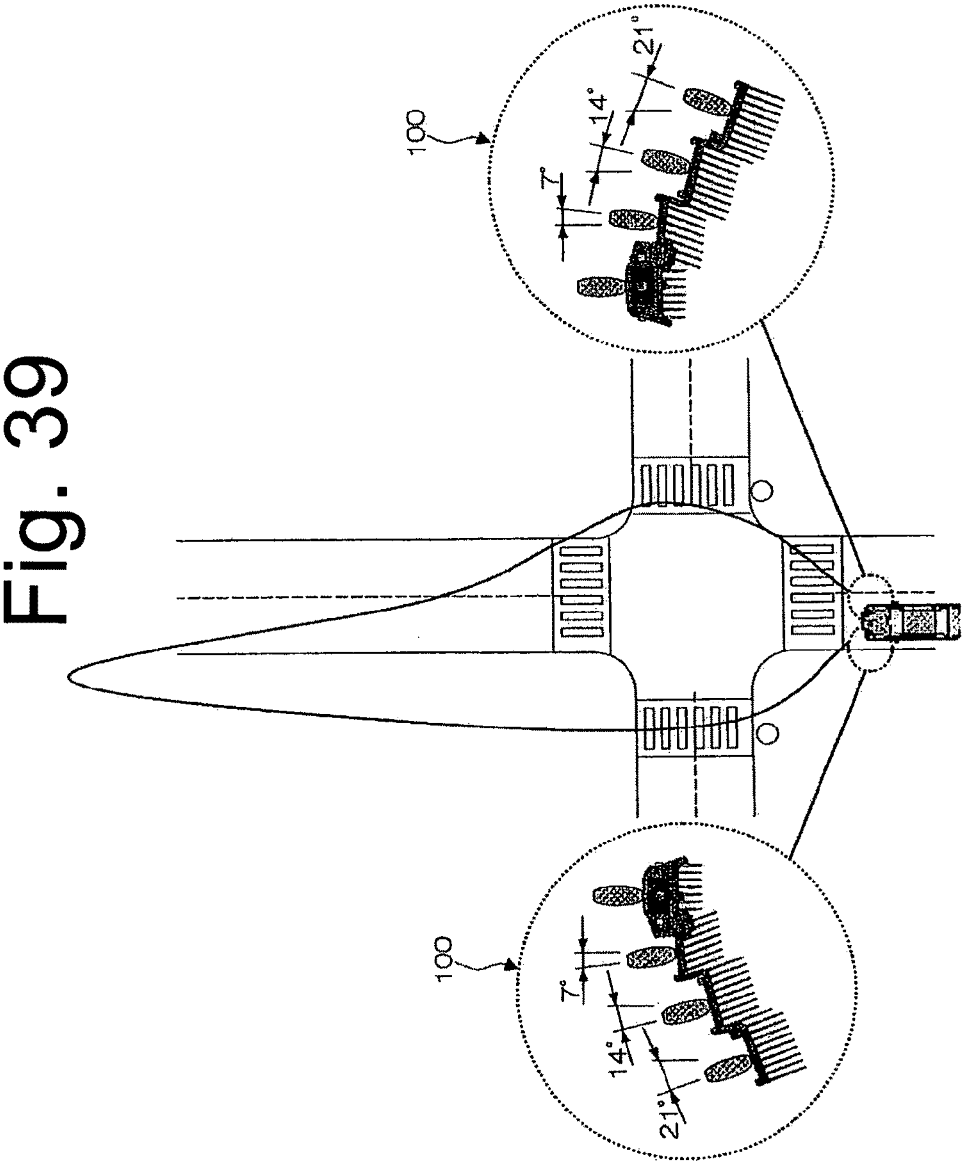
FIG. 39 is a diagram for explaining the arrangement of a headlamp 100 made in accordance with principles of the presently disclosed subject matter.

The headlamp 100 according to the present exemplary embodiment can be arranged on both sides of a vehicle front area as shown in FIG. 39. The configurations of the right and left headlamps 100 are the same as each other, and accordingly, the left headlamp 100 will mainly be described hereinafter.

Figure 40:
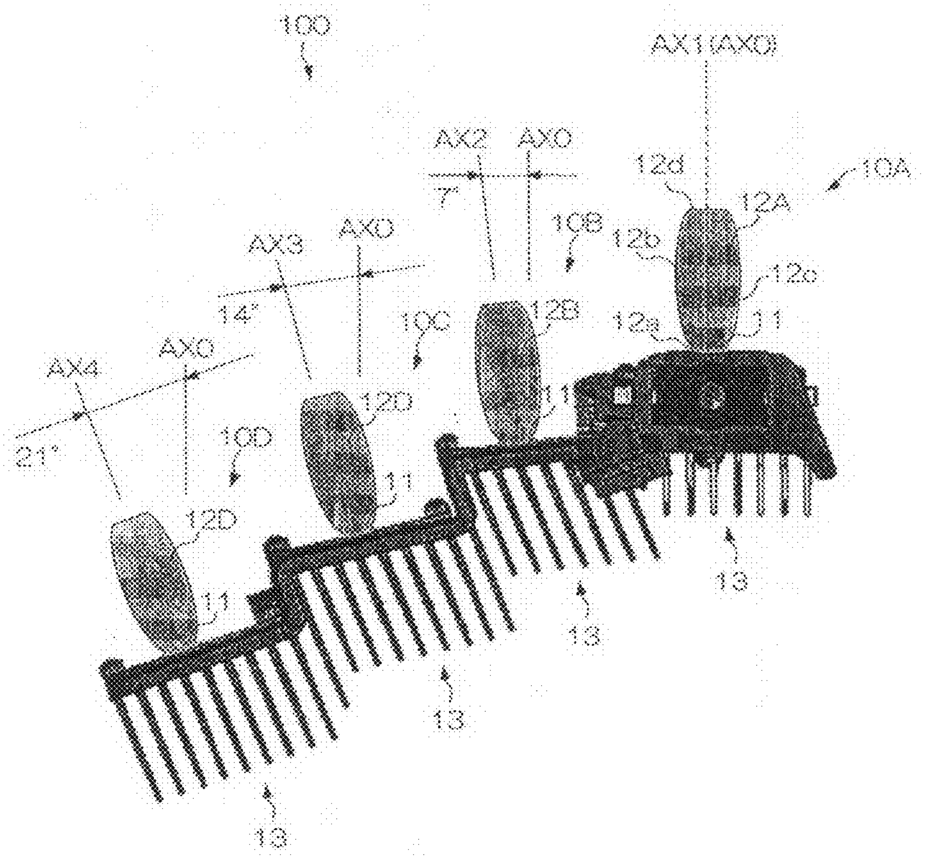
FIG. 40 is an enlarged view of the headlamp 100 arranged at the left side in FIG. 39.

FIG. 40 is an enlarged view of the headlamp 100 arranged at the left side.

The headlamp 100 according to the present exemplary embodiment can include four headlamp units 10A to 10D disposed side by side in a horizontal direction.

The four headlamp units 10A to 10D can have a common configuration including an LED light source 11, a lens body 12 disposed in front of the LED light source 11, a heat sink 13 for heat dissipation, to which a substrate mounting the LED light source 11 is fixed, and the like.

The LED light source 11 can be an LED light source that satisfies the conditions for improving the visibility (noticeability) with a peripheral vision as clarified above. Namely, the LED light source 11 can be an LED light source with a color temperature range of 4500 K to 7000 K (preferably, of 5000 K to 6000 K) and that can emit light beams including four color light beams represented by four coordinate values of predicted four colors including red, green, blue and yellow in the a* b* coordinate system corresponding to the CIE 1976 L*a*b* color space, the four coordinate values in the a* b* coordinate system being encompassed by respective circle areas having a radius of 5 and each of center coordinate values of (41.7, 20.9) for red, (−39.5, 14.3) for green, (8.8, −29.9) for blue and (−10.4, 74.2) for yellow.

As the LED light source 11, a light source including a combination of a blue LED and a wavelength conversion material (for example, a yellow phosphor) can be utilized. Example thereof includes LEDs T6, T7, and T9 with the correlated color temperatures as shown in FIG. 11. In this case, for example, the yellow phosphor can be adjusted in terms of concentration, composition, and the like, to thereby satisfy the conditions for improving the visibility (noticeability). The LED light source 11 is not limited to the above, but an LED light source including a UV LED and a white phosphor (emitting three colored light) in combination, an LED light source including R, G, and B LEDs, and the like.

Hereinafter, an example will be described in which the LED light source 11 can be an LED light source including a blue LED and a yellow phosphor in combination (correlated color temperature: 6000 K, luminous flux: 1100 lm).

The lens body 12 can be a solid lens body including a light incident surface 12*a*, side reflecting surfaces 12*b* and 12*c*, and a light exiting surface 12*d*. Light beams emitted from the LED light source 11 can enter the lens body 12 through the light incident surface 12*a*, and can be reflected by both the side reflecting surfaces 12*b* and 12*c*. Then, the entering light beams and reflected light beams can exit through the light exiting surface 12*d*.

As the lens body 12, the lens body disclosed in Japanese Patent Application Laid-Open No. 2009-238469, and other lens bodies described later can be used.

The lens bodies 12 of the respective headlamp unit 10A to 10D can be disposed such that the respective optical axes can be inclined with respect to the reference axis AX0 directed in the front-to-rear direction of a vehicle body more with an increasing distance from its center side (in the shown example, by a larger angle toward the left side as shown in FIG. 40). Hereinafter, the lens bodies 12 are assigned from the center side to the left side as a first lens body 12A, a second lens body 12B, a third lens body 12C, and a fourth lens body 12D.

The headlamp unit 10A can be configured to form a hot zone light distribution pattern P1 including an elbow line by gathering the light beams at the intersection of the horizontal line and the vertical line in a virtual light distribution plane vertically extending and disposed at a distance away from the headlamp unit 10A.

The first lens body 12A of the headlamp unit 10A can be disposed such that the optical axis AX1 thereof coincides with the reference axis AX0. The light incident surface 12*a*, the side reflecting surfaces 12*b* and 12*c*, and the light exiting surface 12*d* of the first lens body 12A can be configured such that the light beams entering the first lens body 12A form the hot zone light distribution pattern P1 including the elbow line by gathering the light beams at the intersection of the horizontal line and the vertical line in the virtual light distribution plane. In order to clearly form the elbow line, such a light shielding member as disclosed in Japanese Patent Application Laid-Open No. 2008-78086 can be used.

The headlamp unit 10C can be configured so as to form a diffusion light distribution pattern P3 that is to be overlaid on the hot zone light distribution pattern P1 and diffused horizontally.

The third lens body 12C of the headlamp unit 10C can be disposed so that its optical axis AX3 is inclined with respect to the reference axis AX0 by a larger angle (14 degrees in the illustrated example in FIG. 40). The light incident surface 12*a*, the side reflecting surfaces 12*b* and 12*c*, and the light exiting surface 12*d* of the third lens body 12C can be configured such that the light beams entering the third lens body 12C form the diffusion light distribution pattern P3 that is to be overlaid on the hot zone light distribution pattern P1 and diffused horizontally in the virtual light distribution plane. Herein, the diffusion light distribution pattern P3 can be a horizontally wider light distribution pattern than an intermediate diffusion light distribution pattern P2 described later with reference to FIG. 41.

The headlamp unit 10B can be configured so as to form the intermediate diffusion light distribution pattern P2 that is to be overlaid on the light distribution patterns P1 and P3 and diffused horizontally but smaller than the diffusion light distribution pattern P3.

The second lens body 12B of the headlamp unit 10B can be disposed so that its optical axis AX2 is inclined with respect to the reference axis AX0 by a larger angle (7 degrees in the illustrated example in FIG. 40). The light incident surface 12*a*, the side reflecting surfaces 12*b* and 12*c*, and the light exiting surface 12*d* of the second lens body 12B can be configured such that the light beams entering the second lens body 12B form the intermediate diffusion light distribution pattern P2 that is to be overlaid on the light distribution patterns P1 and P3 and diffused horizontally less than the diffusion light distribution pattern P3 in the virtual light distribution plane. Herein, the intermediate diffusion light distribution pattern P2 can be a horizontally wider light distribution pattern than the hot zone light distribution pattern P1 with reference to FIG. 41.

The headlamp unit 10D can be configured so as to form a large diffusion light distribution pattern P4 that is to be overlaid on the light distribution patterns P1, P2 and P3 and diffused horizontally larger than the diffusion light distribution pattern P3.

The fourth lens body 12D of the headlamp unit 10D can be disposed so that its optical axis AX4 is inclined with respect to the reference axis AX0 by a larger angle (21 degrees in the illustrated example in FIG. 40). The light incident surface 12*a*, the side reflecting surfaces 12*b* and 12*c*, and the light exiting surface 12*d* of the fourth lens body 12D can be configured such that the light beams entering the fourth lens body 12D form the large diffusion light distribution pattern P4 that is to be overlaid on the light distribution patterns P1, P2, and P3 and diffused horizontally more than the diffusion light distribution pattern P3 in the virtual light distribution plane. Herein, the large diffusion light distribution pattern P4 can be a horizontally wider light distribution pattern than the diffusion light distribution pattern P3 with reference to FIG. 41.

The headlamp unit out of the headlamp units 10A to 10D with largely diffused light distribution pattern can be arranged at a more sideward and more rearward position (see FIG. 40). Furthermore, the headlamp unit out of them disposed at a more sideward position has an optical axis inclined by a larger inclined angle with respect to the reference axis AX0 (also see FIG. 40).

In this configuration, the headlamp units can be arranged at positions from near the front end to the side of the vehicle body in order to conform to the vehicle body design (for example, see FIG. 40). Even in this case, the headlamp unit disposed more sideward (for example, the headlamp unit 10D in FIG. 40) is not hindered by the adjacent headlamp unit thereto (for example, the headlamp unit 10C in FIG. 40), thereby enabling to form desired diffusion light distribution patterns (for example, P2 to P4 in FIG. 41).

Furthermore, the headlamp units 10A to 10D can form the respective light distribution patterns including the hot zone light distribution pattern P1, the intermediate diffusion light distribution pattern P2, the diffusion light distribution pattern P3, and the large diffusion light distribution pattern P4 overlaid with each other. The overlaid light distribution patterns can form a whole super-wide light distribution pattern optimized for a low beam, with the decreased luminance toward the side in a gradation manner (see FIGS. 41 and 46).

Since the super-wide light distribution pattern thus formed has a gradation of luminance toward the side (see FIGS. 41 and 46), the visibility at the left side position (or right side position) with a peripheral vision can be improved while any glare light to pedestrians can be suppressed or prevented. It should be noted that the light source with a high ratio of radiation energy components can deteriorate the reaction time to some extent, but the deterioration degree is not so high even with the lowered luminance (see FIGS. 42 to 45).

Comparative Example

Hereinafter, comparative examples will be described as compared with the headlamp 100 of the present embodiment (utilizing the LED light source 11 with a correlated color temperature of 6000 K and luminous flux of 1100 lm. The comparative examples include a conventional LED headlamp as Conventional Example 1 (correlated color temperature: 4300 K, luminous flux: 540 lm) and a conventional HID headlamp as Conventional Example 2 (correlated color temperature: 4100 K, luminous flux: 1100 lm).

Figure 46:
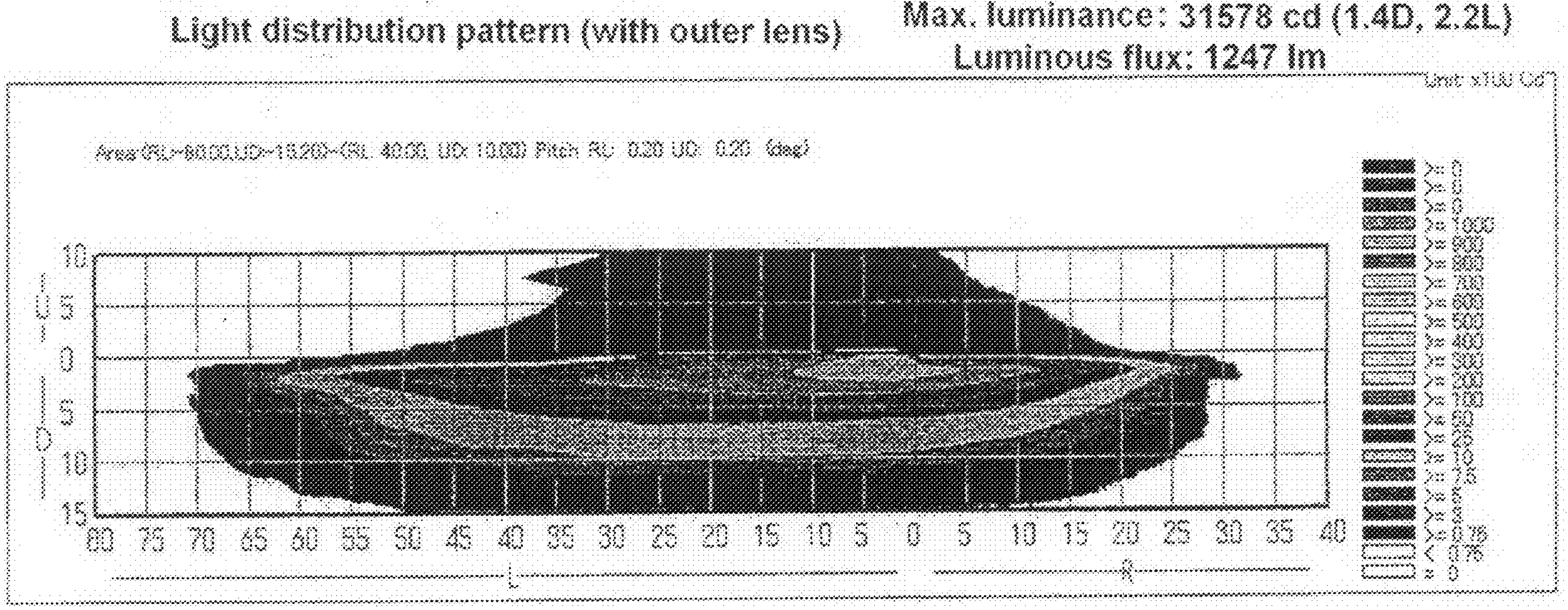
FIG. 46 is a diagram showing a light distribution pattern (luminous intensity distribution) formed on a vertical virtual screen in front of a vehicle by the headlamp 100 of the present exemplary embodiment.
Figure 47:
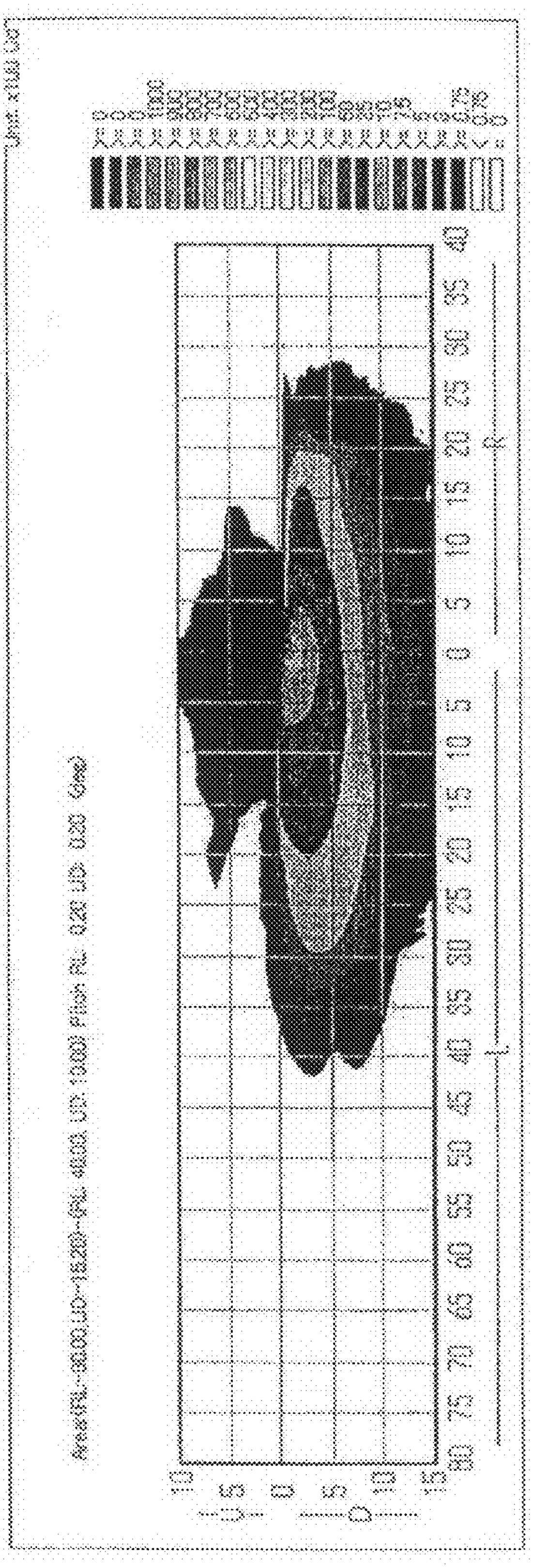
FIG. 47 is a diagram showing a light distribution pattern (luminous intensity distribution) formed on a vertical virtual screen in front of a vehicle by a headlamp of Conventional Example 1.
Figure 48:
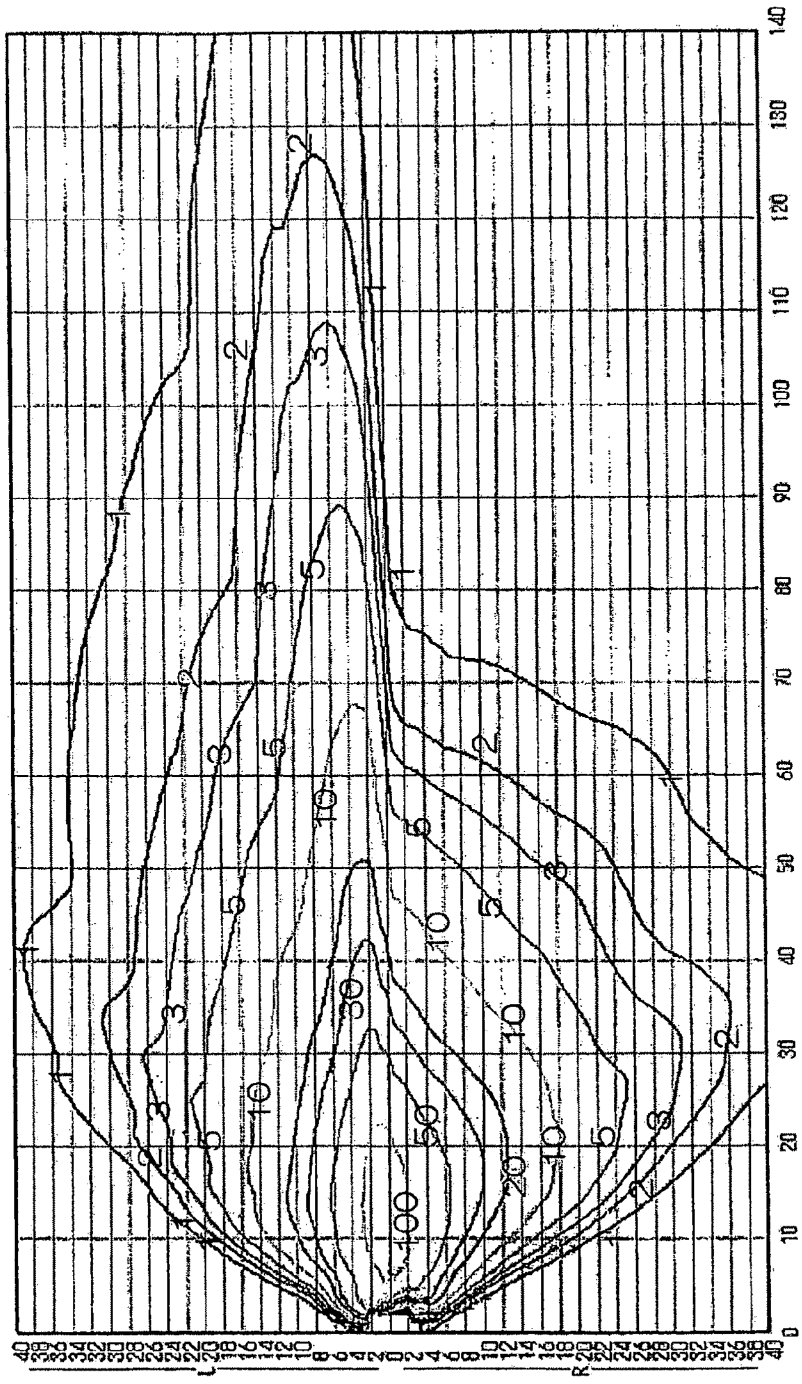
FIG. 48 is a diagram showing a light distribution pattern on a road (isophote distribution) in front of a vehicle by the headlamp 100 of the present exemplary embodiment.
Figure 49:
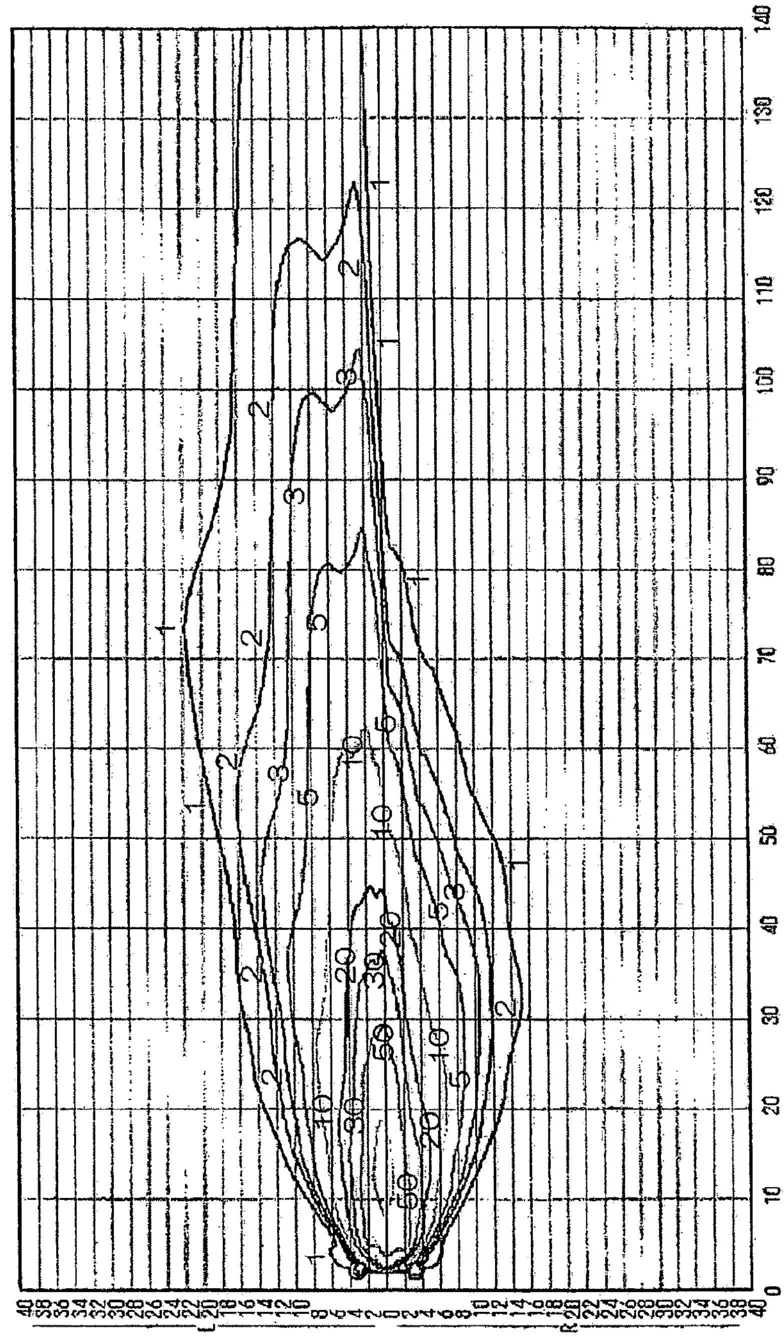
FIG. 49 is a diagram showing a light distribution pattern on a road (isophote distribution) in front of a vehicle by the headlamp of Conventional Example 1.
Figure 50:
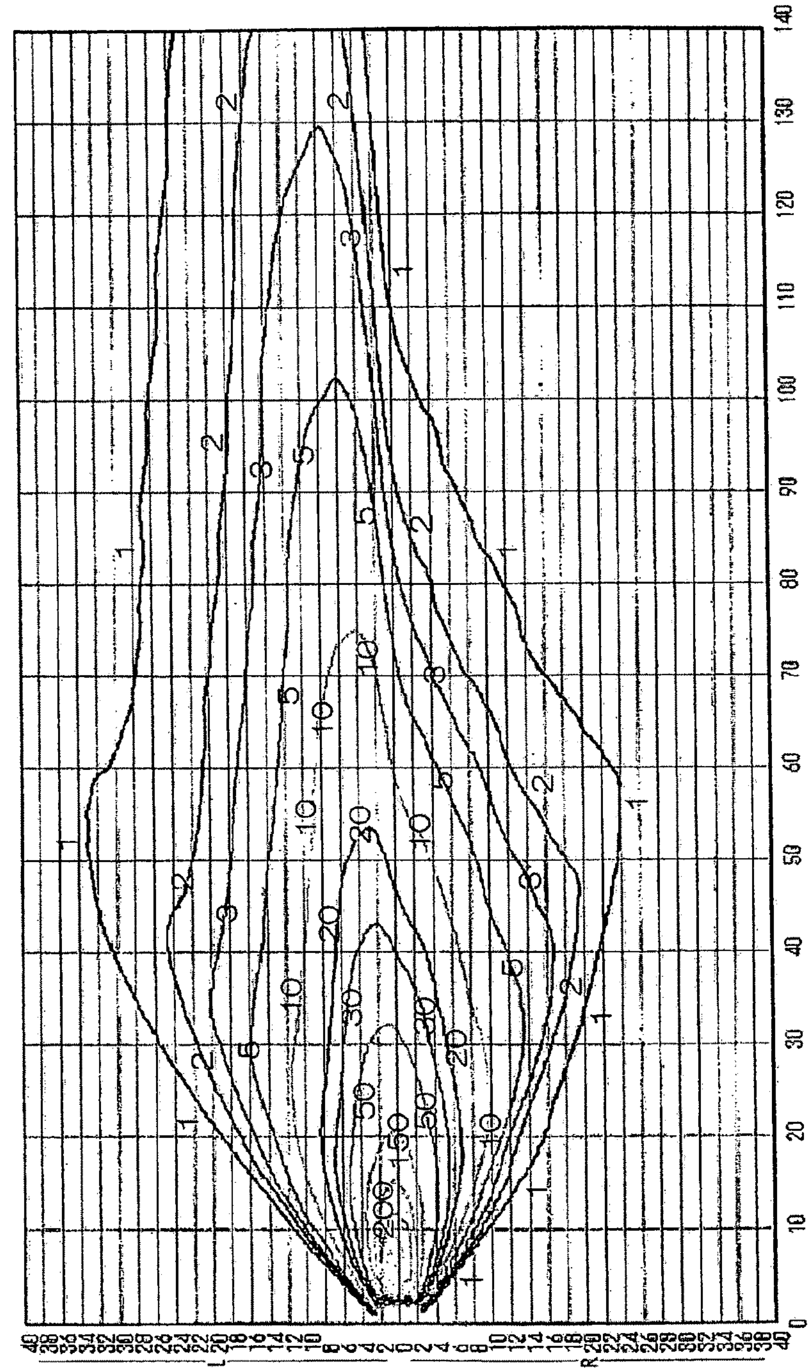
FIG. 50 is a diagram showing a light distribution pattern on a road (isophote distribution) in front of a vehicle by a headlamp of Conventional Example 2.

FIG. 46 is a diagram showing the light distribution pattern (luminous intensity distribution) formed on a vertical virtual screen in front of a vehicle by the headlamp 100 of the present exemplary embodiment. FIG. 47 is a diagram showing a light distribution pattern (luminous intensity distribution) formed on a vertical virtual screen in front of a vehicle by a headlamp of Conventional Example 1. FIG. 48 is a diagram showing a light distribution pattern on a road (isophote distribution) in front of a vehicle by the headlamp 100 of the present exemplary embodiment. FIG. 49 is a diagram showing a light distribution pattern on a road (isophote distribution) in front of a vehicle by the headlamp of Conventional Example 1. FIG. 50 is a diagram showing a light distribution pattern on a road (isophote distribution) in front of a vehicle by a headlamp of Conventional Example 2.

Figure 41:
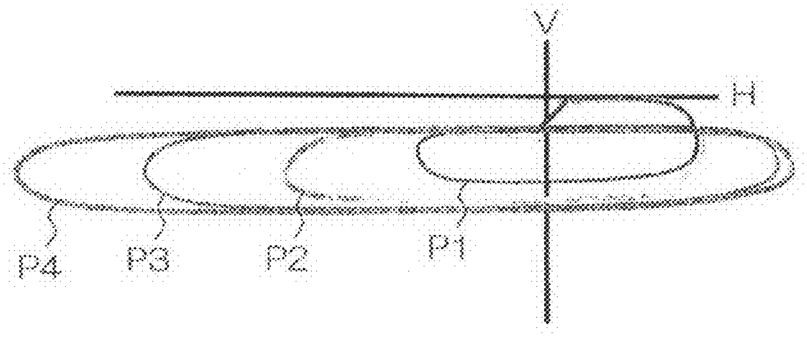
FIG. 41 is a diagram showing an exemplary light distribution pattern formed on a vertical virtual screen in front of a vehicle by the headlamp 100 arranged at the left side in FIG. 39.
Figure 42:
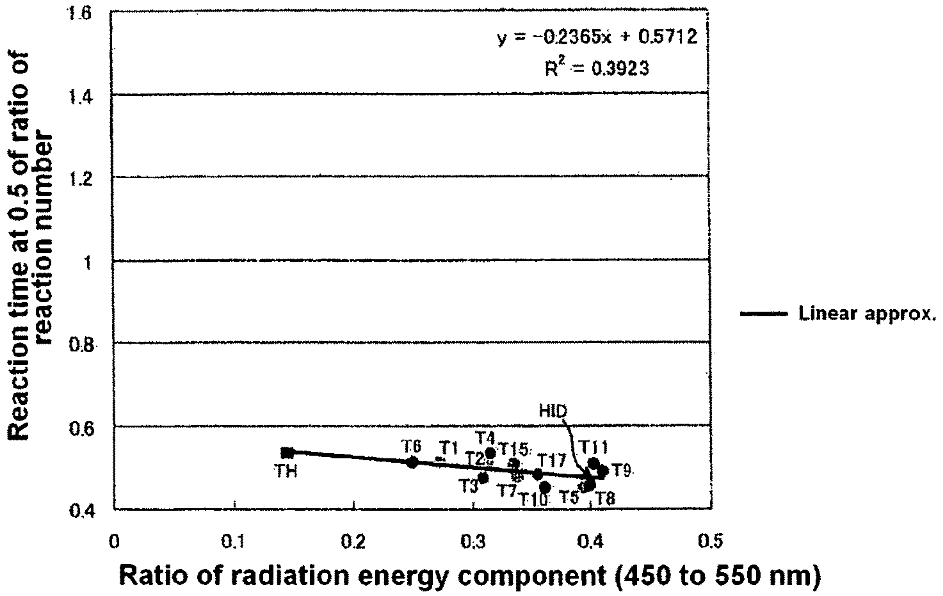
FIG. 42 is a graph for explaining the fact that the light source with higher radiation energy components tends to maintain the reaction time even when the luminance thereof is lowered.
Figure 43:
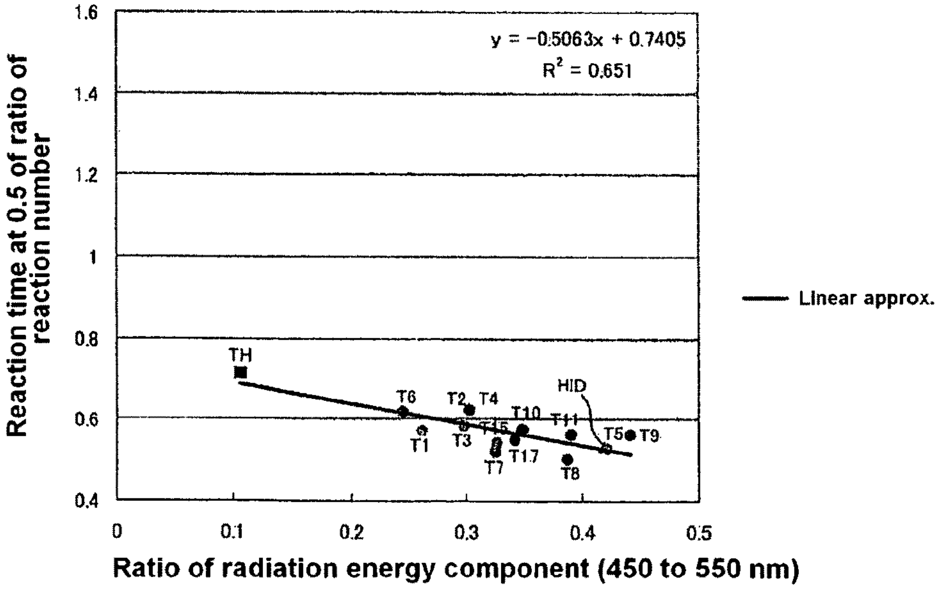
FIG. 43 is a graph for explaining the fact that the light source with higher radiation energy components tends to maintain the reaction time even when the luminance thereof is lowered.
Figure 44:
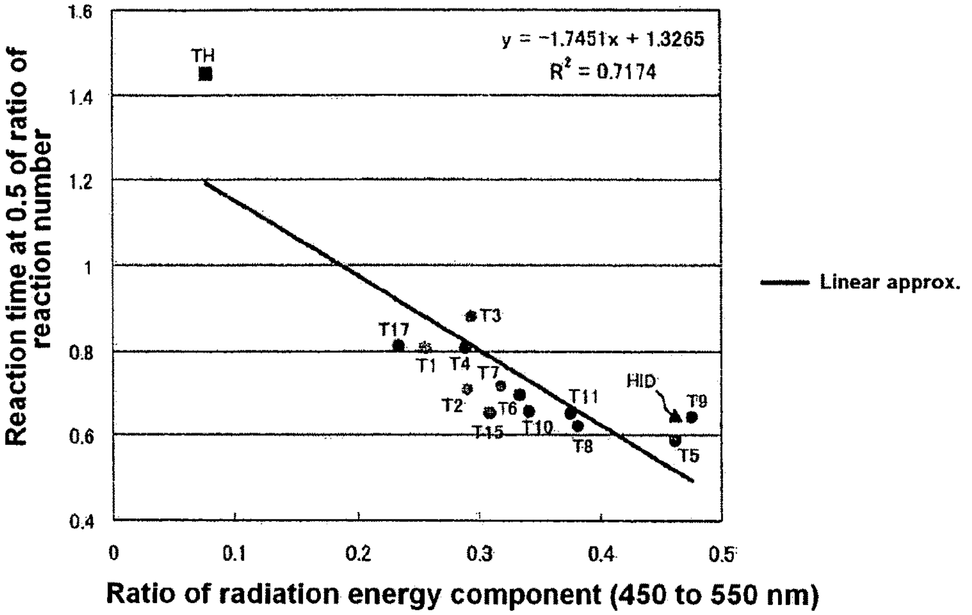
FIG. 44 is a graph for explaining the fact that the light source with higher radiation energy components tends to maintain the reaction time even when the luminance thereof is lowered.
Figure 45:
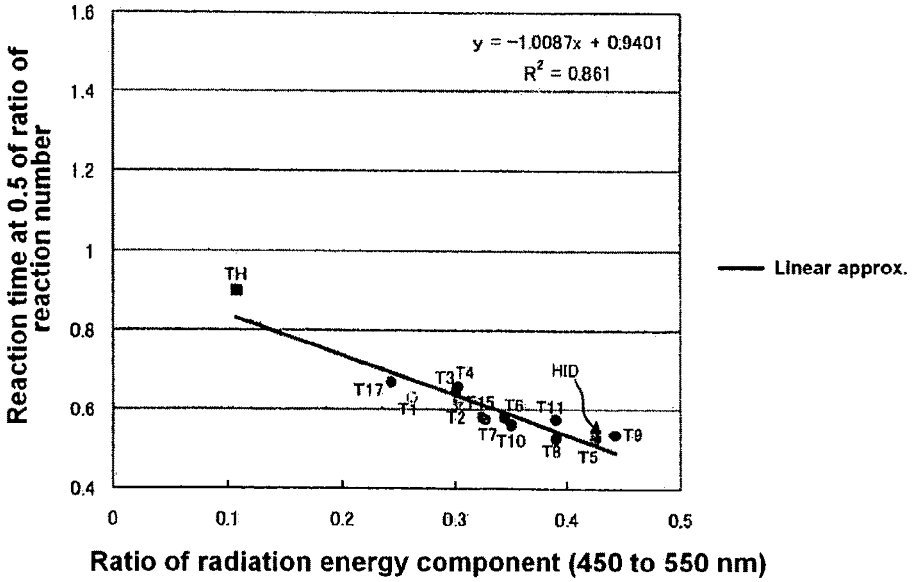
FIG. 45 is a graph for explaining the fact that the light source with higher radiation energy components tends to maintain the reaction time even when the luminance thereof is lowered.

The headlamp 100 of the present exemplary embodiment can form a super-wide light distribution pattern horizontally wider than those of the headlamps of Conventional Examples 1 and 2 by the action of the lens bodies 12A to 12D (see FIGS. 41 and 46). In the illustrated example, since the headlamp 100 is disposed on the left side, the light distribution pattern extends leftward. This is true when it is designed to be disposed on the right side.

Furthermore, the headlamp 100 of the present exemplary embodiment utilizes the LED light source 11 that satisfies the conditions for improving the visibility (noticeability) with a peripheral vision as clearly described above. Taking the super-wide light distribution pattern formed by light beams from the LED light source 11 into account, not only the front visibility can be improved, but also the sideward (leftward) visibility (noticeability) with a peripheral vision can be improved more than the headlamps of Conventional Examples 1 and 2.

In addition, since the super-wide light distribution pattern thus formed has a gradation of luminance lowering toward the side (see FIGS. 41 and 46), the visibility at the left side position (or right side position) with a peripheral vision can be improved while any glare light to pedestrians can be suppressed or prevented. It should be noted that the light source with a high ratio of radiation energy components can deteriorate the reaction time to some extent, but the deterioration degree is not so high even with the lowered luminance (see FIGS. 42 to 45).

[Evaluation of Easy-to-Drive]

In order to evaluate the easy-to-drive level of a vehicle with a headlamp installed therein according to the present exemplary embodiment, Conventional Example 1 or Conventional Example 2, the following experiment was conducted.

Experiment Environment: Headlamp 100 of the present exemplary embodiment and headlamps of Conventional Examples 1 and 2 were installed in respective vehicle bodies for evaluation.

Experiment procedure: The vehicles with the headlamp 100 of the present exemplary embodiment and headlamps of Conventional Examples 1 and 2 installed therein were used for actual driving test. The easy-to-drive level was evaluated on the basis of the subjective grading scale (1: difficult to drive, 2: difficult to drive to some extent, 3: normal, 4: easy to drive to some extent, 5: easy to drive). The number of test subjects was 18 persons.

Figure 51:
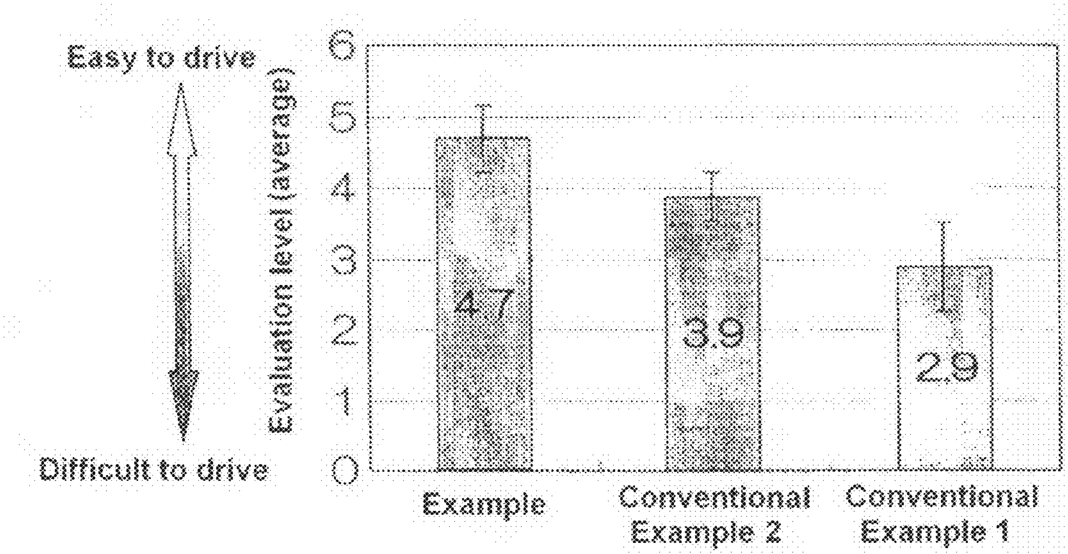
FIG. 51 is a bar graph showing the results of a driving experiment to determine how the vehicle light affects on the driving sense (easy-to-drive)

FIG. 51 is a bar graph showing the results of a driving experiment to determine how the vehicle light affects on the driving sense, meaning the evaluation of easy-to-drive. As shown in FIG. 51, the evaluation results revealed that the headlamp 100 of the present exemplary embodiment was the highest evaluation level. It is assumed that this might be because the headlamp 100 of the present exemplary embodiment can form the super-wide light distribution pattern extending to the left side (or right side).

In particular, the evaluation level of the headlamp 100 of the present exemplary embodiment is higher than that of the headlamp of Conventional Example 2 by 0.8 even with the almost same luminous flux. This is mainly because the light beams from LEDs can allow a view to observe objects naturally more closer to the standard light source than HID light sources in addition to the use of the super-wide light distribution pattern extending leftward (or rightward). Namely, the LED light source can faithfully reproduce the observed color (see FIG. 37).

The evaluation level of the headlamp of Conventional Example 1 is lower than that of the headlamp of Conventional Example 2 by 1 point. This is because the headlamp of Conventional Example 1 is lower in luminous flux than that of Conventional Example 2 (the luminous flux of 540 lm of Conventional Example 1 is lower than the luminous flux of 1100 lm of Conventional Example 2), so that the spread of light distribution is smaller than the other.

[Evaluation of Easy-to-See]

In order to evaluate the easy-to-see level of color during traveling of a vehicle with a headlamp installed therein according to the present exemplary embodiment, Conventional Example 1 or Conventional Example 2, the following experiment was conducted.

Figure 52:
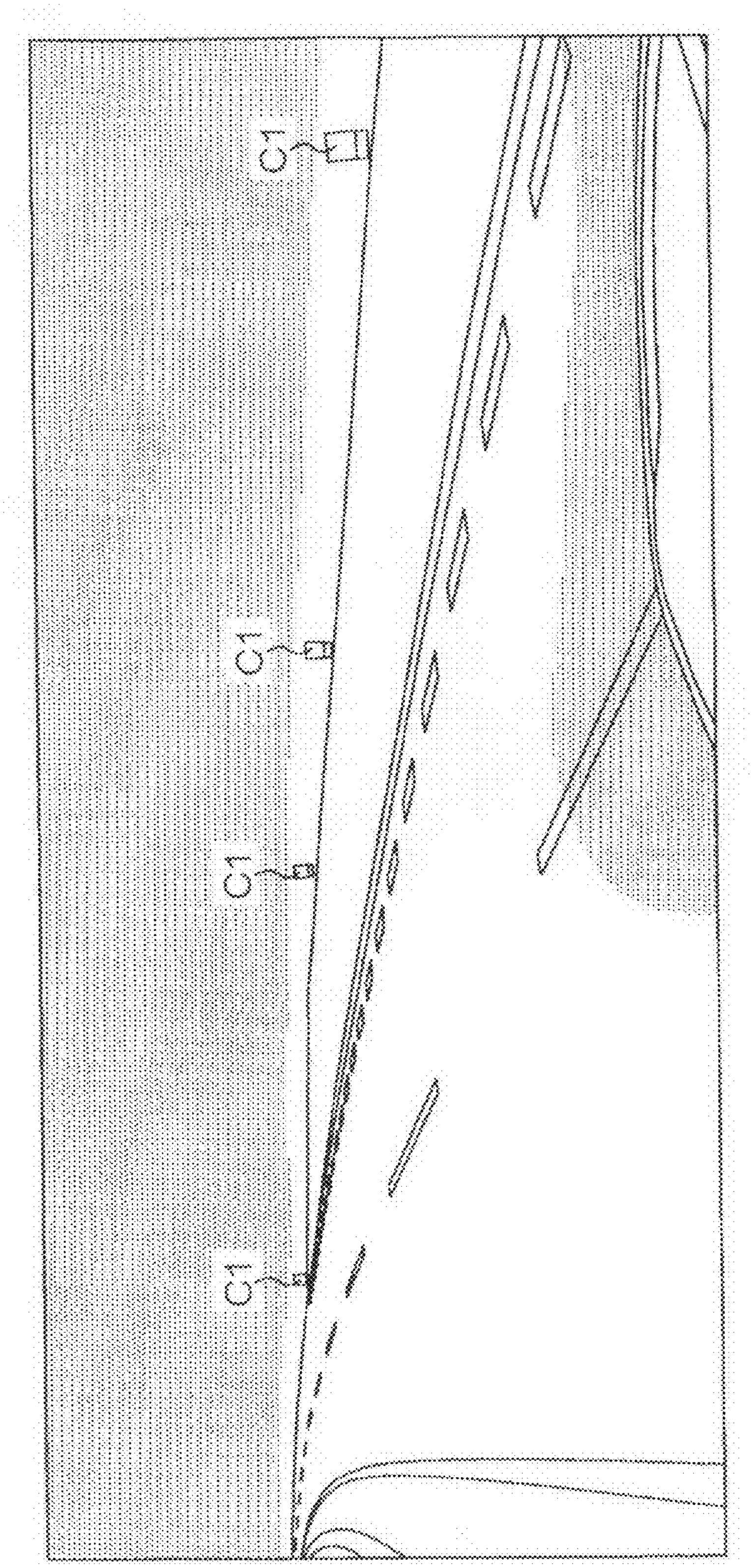
FIG. 52 is a diagram for explaining the positions where color tags C1 are disposed.

Experiment Environment: Headlamp 100 of the present exemplary embodiment and headlamps of Conventional Examples 1 and 2 were installed in respective vehicle bodies for evaluation. The color tags C1 of Red, Green, Blue, and Yellow were disposed on a road side (see FIG. 52).

Experiment procedure: The vehicles with the headlamp 100 of the present exemplary embodiment and headlamps of Conventional Examples 1 and 2 installed therein were used for actual driving test. The easy-to-see level was evaluated on the basis of the subjective grading scale (1: difficult to see, 2: difficult to see to some extent (dull), 3: normal, 4: easy to see to some extent (bright), 5: easy to see (brighter)). The number of test subjects was 18 persons.

Figure 53:
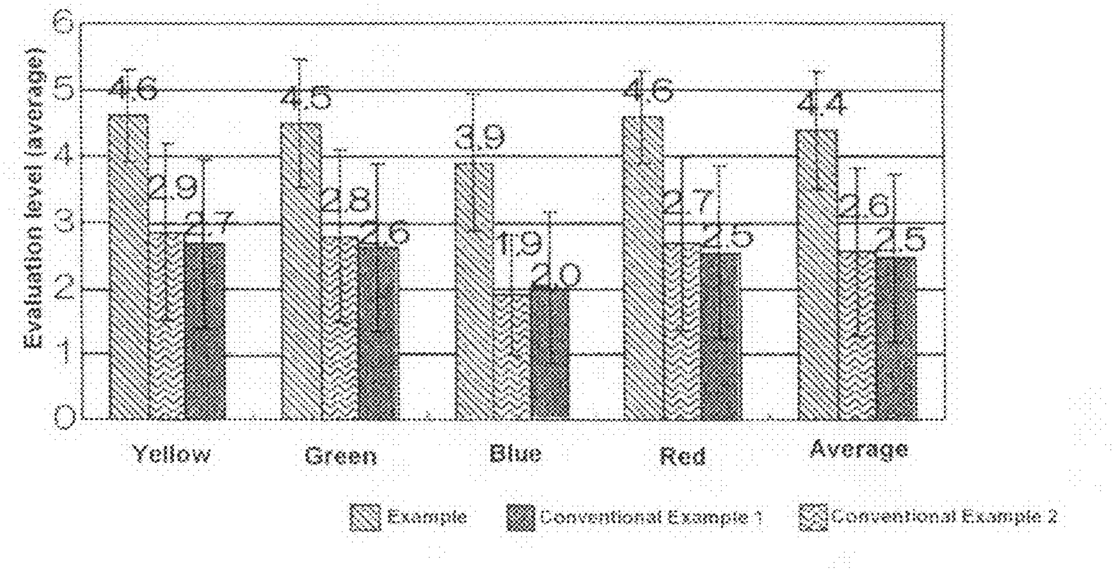
FIG. 53 is a bar graph showing the evaluation results of the visibility of color during travelling (easy-to-see)

FIG. 53 is a bar graph showing the evaluation results of the visibility of color during travelling (easy-to-see). As shown in FIG. 53, the evaluation results revealed that the headlamp 100 of the present exemplary embodiment was the highest evaluation level for every color, including Red, Green, Blue, and Yellow. It is assumed that this might be because the headlamp 100 of the present exemplary embodiment utilizes the LED light source 11 with a color temperature of 6000 K, so that the color discrimination and the brightness of color observation could be improved.

With reference to FIG. 53, the headlamp 100 of the exemplary embodiment showed the remarkably higher evaluation level than those of Conventional Examples 1 and 2, meaning that the headlamp 100 of the exemplary embodiment can surely improve the visibility for traffic signs. Specifically, with regard to the color red (for indicating "prohibited" or "regulated") the headlamp 100 of the present exemplary embodiment was rated higher than the headlamp of Conventional Example 2 by 1.9 (70%) and the headlamp of Conventional Example 1 by 2.1 (84%). With regard to the color yellow (for indicating "caution") the headlamp 100 of the present exemplary embodiment was rated higher than the headlamp of Conventional Example 2 by 1.7 (59%) and the headlamp of Conventional Example 1 by 1.9 (77%). In view of this, the headlamp 100 of the present exemplary embodiment can improve not only the visibility (noticeability) with a peripheral vision but also the visibility in terms of color perception.

[Evaluation when Turning to Right]

In order to evaluate the easy-to-see level of color during turning to right of a vehicle with a headlamp installed therein according to the present exemplary embodiment, Conventional Example 1 or Conventional Example 2, the following experiment was conducted.

Figures 54A, 54B:
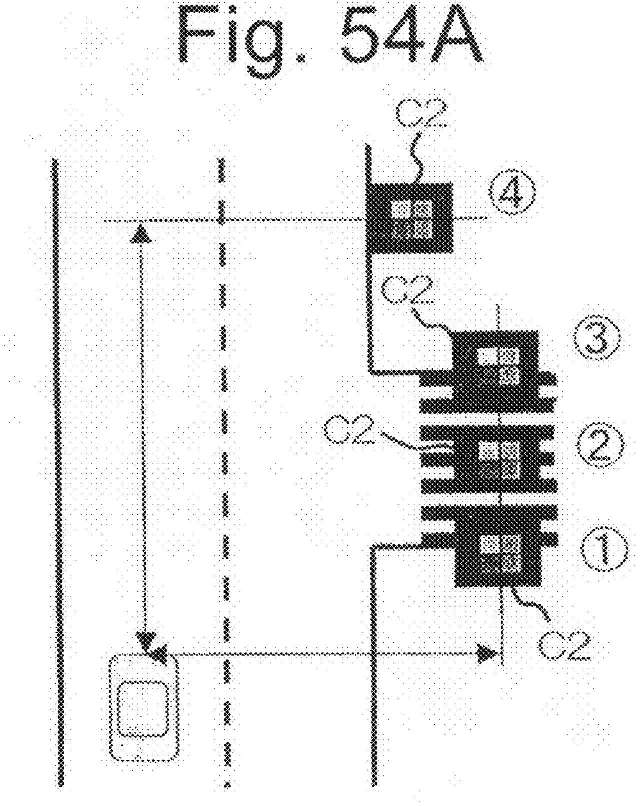
FIGS. 54A and 54B are a diagram and a table for explaining the positions where color tags C2 are disposed.

Experiment Environment: Headlamp 100 of the present exemplary embodiment and headlamps of Conventional Examples 1 and 2 were installed in respective vehicle bodies for evaluation. Each of the vehicles was stopped before the intersection as shown in FIG. 54A. The color tags C2 of Red, Green, Blue, and Yellow were disposed around the intersection (see FIGS. 54A and 54B).

Experiment procedure: The easy-to-see level in turning to right was evaluated on the basis of the subjective grading scale (1: difficult to see, 2: difficult to see to some extent (dull), 3: normal, 4: easy to see to some extent (bright), 5: easy to see (brighter)). The number of test subjects was 18 persons.

Figure 55:
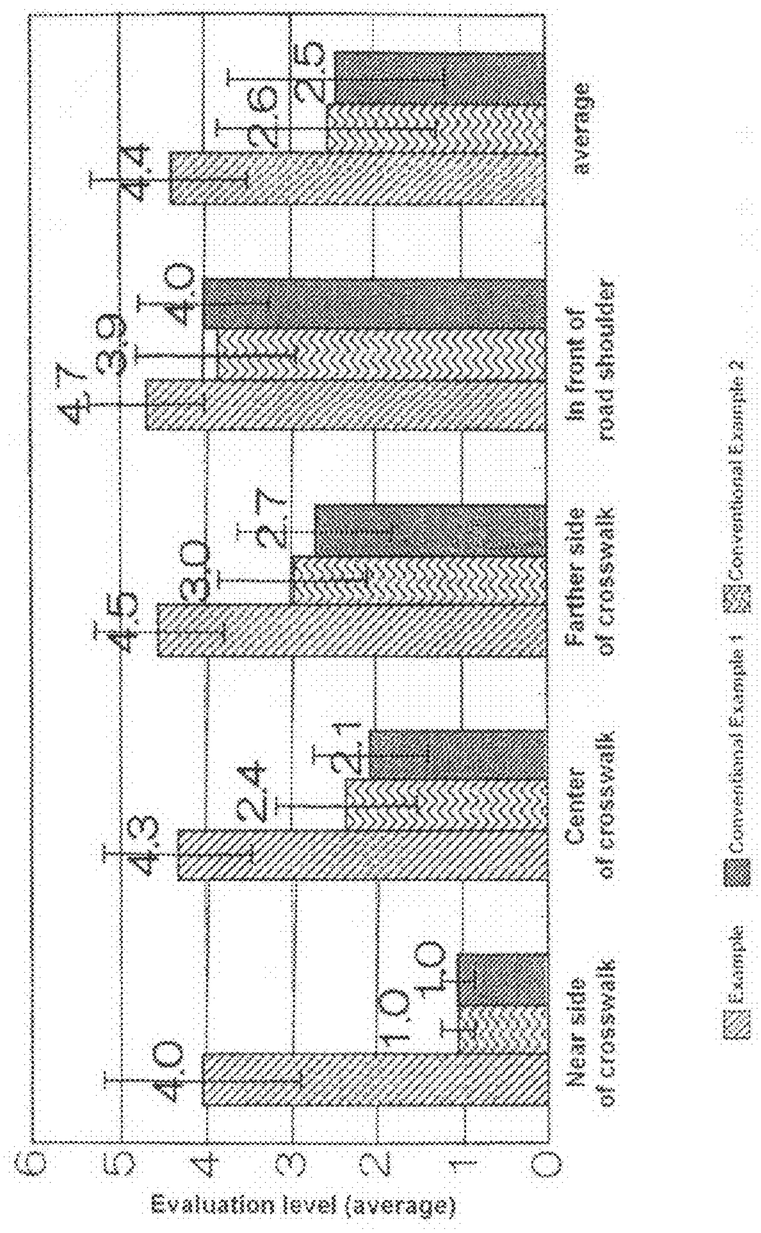
FIG. 55 is a bar graph showing the evaluation results of the visibility of color during turning to the right at a cross-point.
Figure 56:
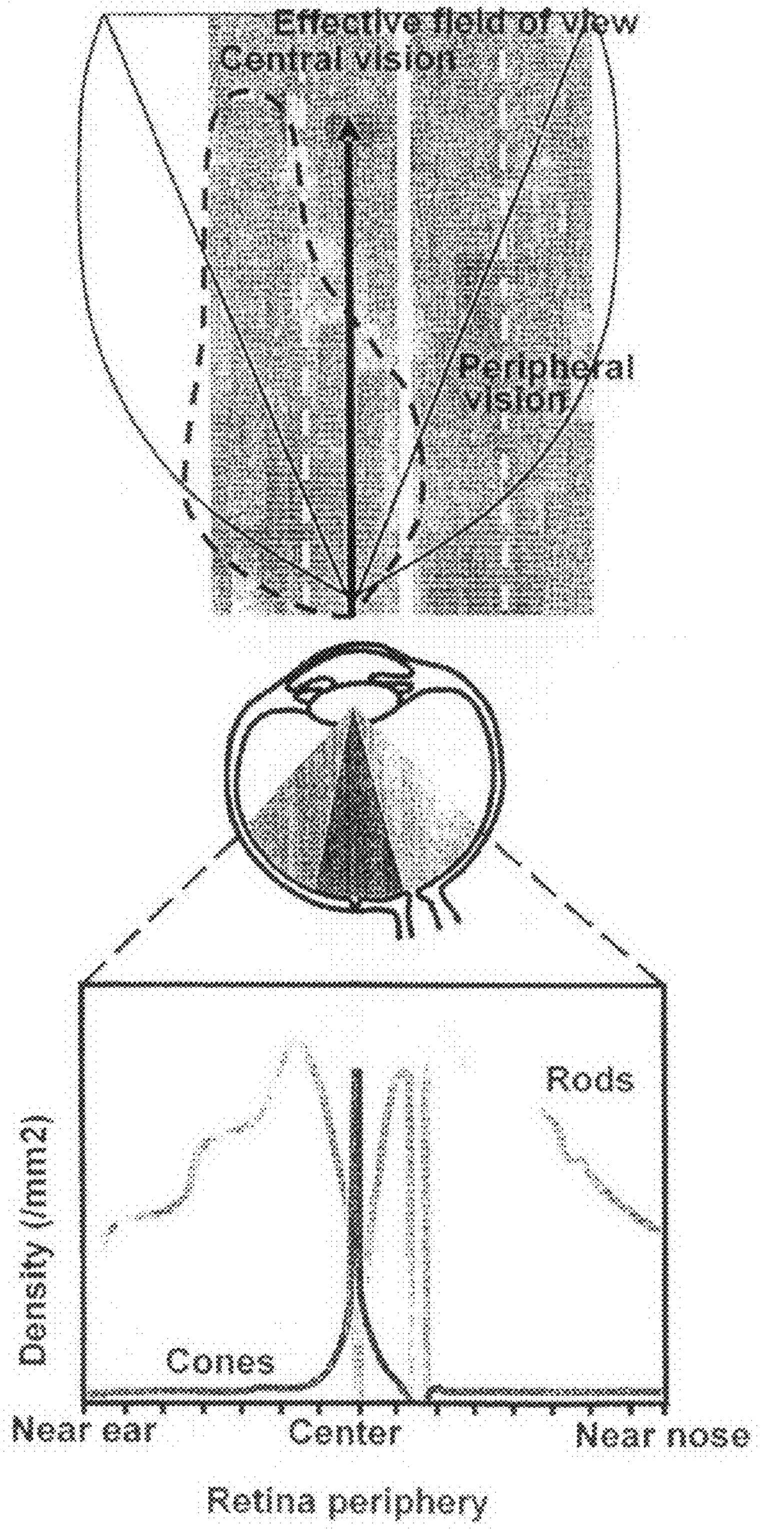
Figures 57, 58:
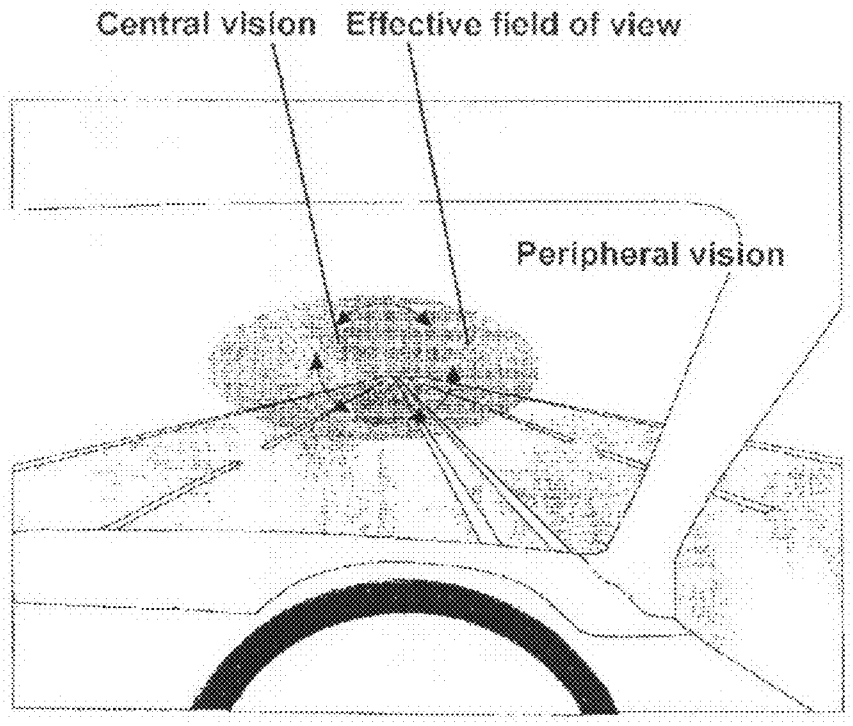
Figure 59:
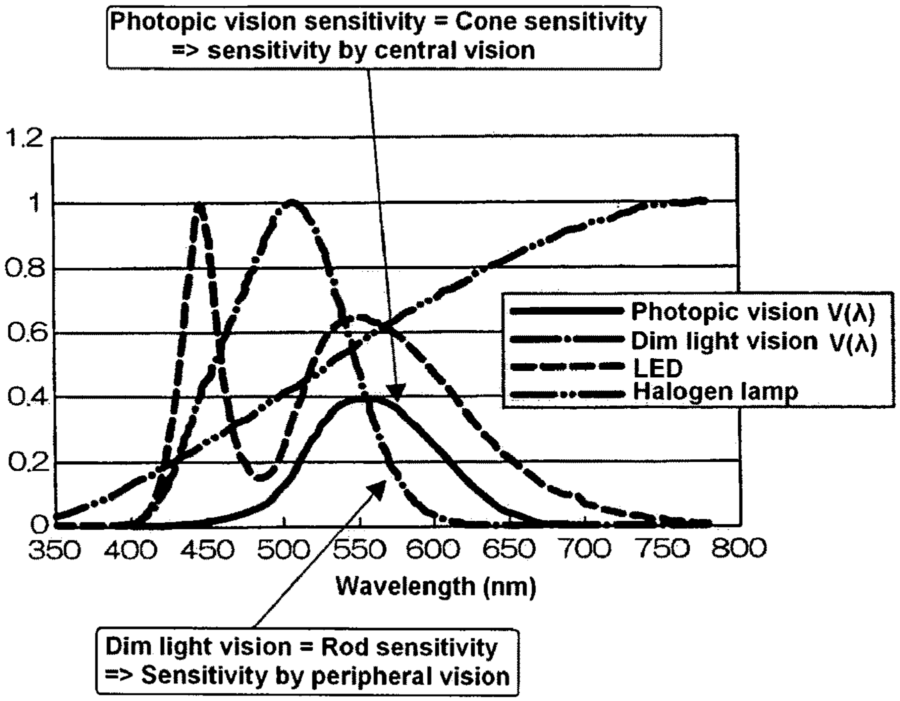
Figure 60:
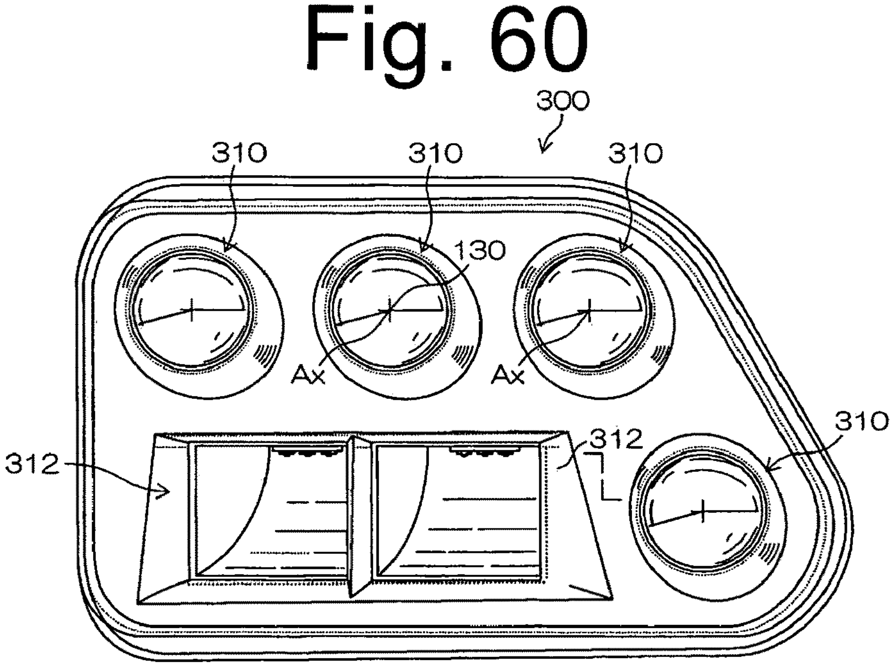
FIG. 60 is a front view showing a conventional vehicle light wherein a plurality of optical units are arranged at upper and lower positions.
Figure 61:
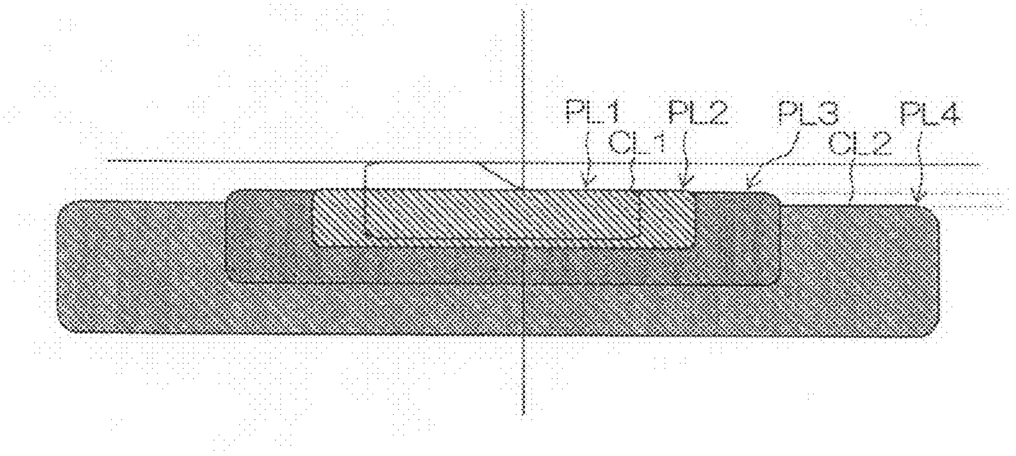
FIG. 61 is a diagram showing an example of a low beam light distribution pattern formed by the conventional vehicle light of FIG. 60.
Figure 62:
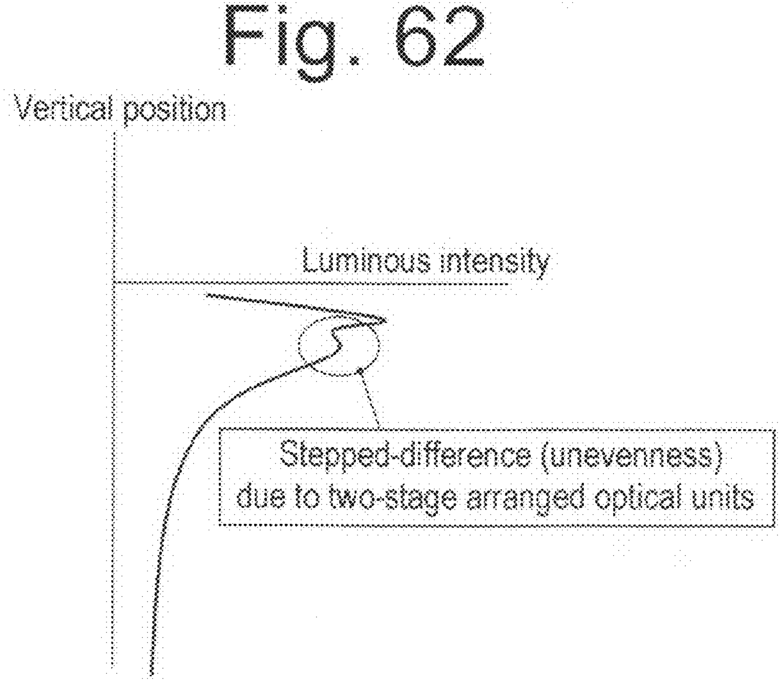
FIG. 62 is a diagram for explaining that a stepped area in the luminance intensity (uneven luminance) is formed by the conventional vehicle light of FIG. 60.
Figure 63:
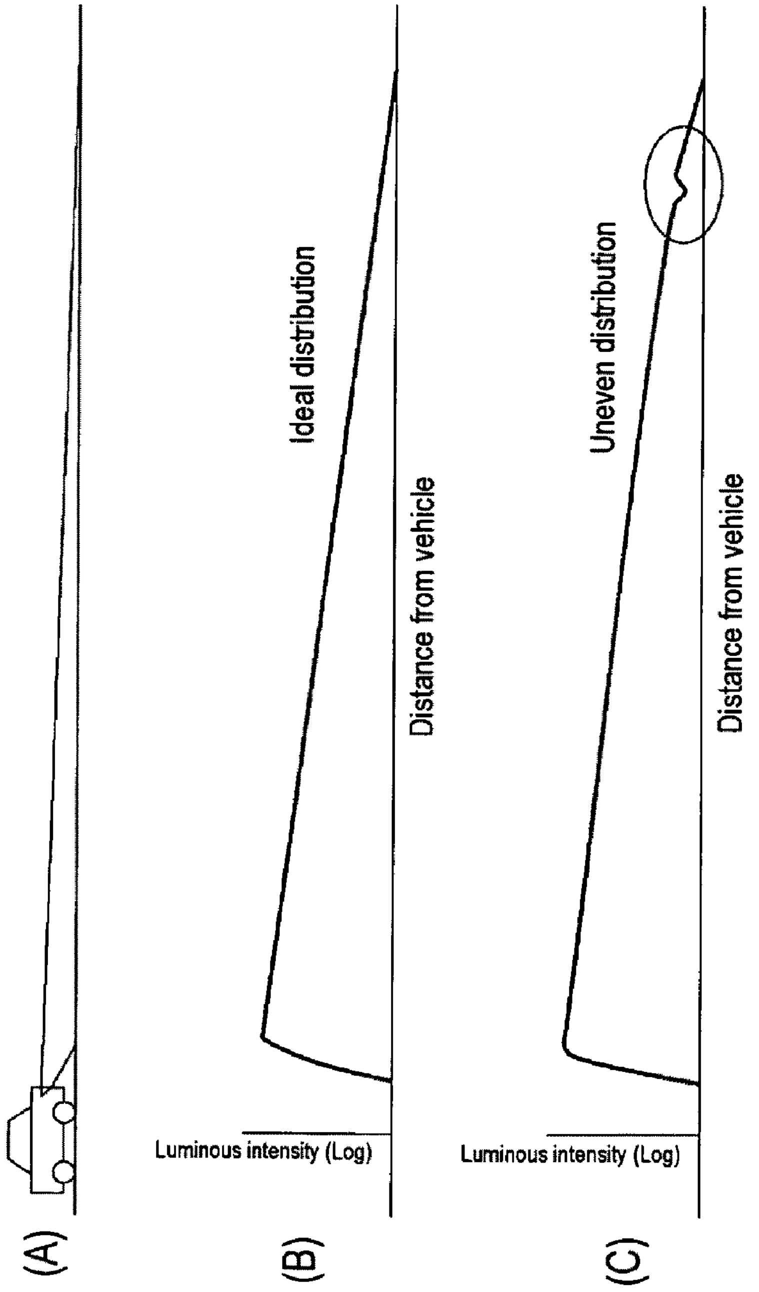
FIG. 63 is another diagram for explaining that a stepped area in the luminance intensity (uneven luminance) is formed by the conventional vehicle light of FIG. 60.

FIG. 55 is a bar graph showing the evaluation results of the visibility of color during turning to right (easy-to-see). As shown in FIG. 55, the evaluation results revealed that the headlamp 100 of the present exemplary embodiment was the highest evaluation level at every position, including the positions at the near side, center, and farther side of the crosswalk, and in front of the road shoulder.

The evaluation level for the headlamp 100 of the exemplary embodiment was higher than those of Conventional Examples 1 and 2 by 3.0 at the near side of the crosswalk. This is because the headlamp 100 of the exemplary embodiment installed on the right side of the vehicle body can form a super-wide light distribution pattern toward the right side more than the headlamps of Conventional Examples 1 and 2 as well as it utilizes the LED light source 11 that satisfies the conditions for improving the visibility (noticeability) with a peripheral vision as clarified above. Namely, this improvement can be said to be achieved by forming the super-wide light distribution pattern by this LED light source 11. This improved headlamp 100 can be remarkably advantageous for reducing traffic accidents when a vehicle turns to right. The evaluation level for the headlamp 100 of the exemplary embodiment was higher than those of Conventional Examples 1 and 2 by 1.5 or more at the center and farther side of the crosswalk, and accordingly, it is assumed that traffic accidents can be advantageously prevented.

The vehicle headlamp 100 of the present exemplary embodiment described above can take advantage of the LED light source 11 that satisfies the conditions for improving the visibility (noticeability) with a peripheral vision as clarified above. Namely, the LED light source 11 can be an LED light source with a color temperature range of 4500 K to 7000 K (preferably, of 5000 K to 6000 K) and that can emit light beams including four color light beams represented by four coordinate values of predicted four colors including red, green, blue and yellow in the a* b* coordinate system corresponding to the CIE 1976 L*a*b* color space, the four coordinate values in the a* b* coordinate system being encompassed by respective circle areas having a radius of 5 and each of center coordinate values of (41.7, 20.9) for red, (−39.5, 14.3) for green, (8.8, −29.9) for blue and (−10.4, 74.2) for yellow. This headlamp 100 can improve the visibility (noticeability) with respect to the surroundings such as pedestrians, roadside obstructs, and the like with the peripheral vision in an actual traffic environment (in particular, in the case where the vehicle is turning to the right).

Next, several modified examples will be described.

Summary of Arrangement of Headlamp Units

Modified Examples 1 to 3

Figure 64:
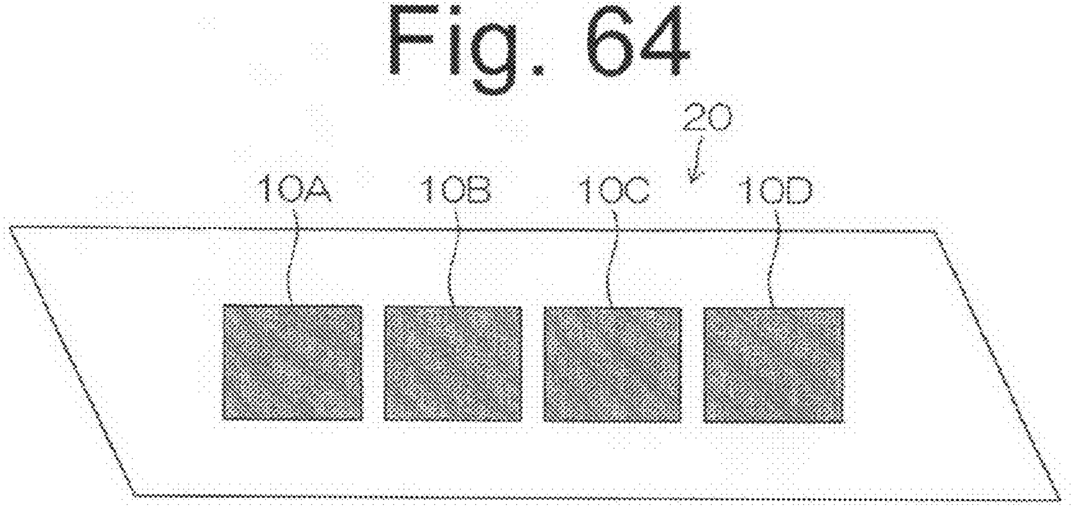
FIG. 64 is a diagram showing an example (modified example 1) of a vehicle light wherein a plurality of headlamp units 10A to 10D are configured such that the light emission areas thereof are arranged adjacent to each other in the width direction of a vehicle body so that the light emission areas are not adjacent to each other in the vertical direction when viewed from its front side.
Figure 65:
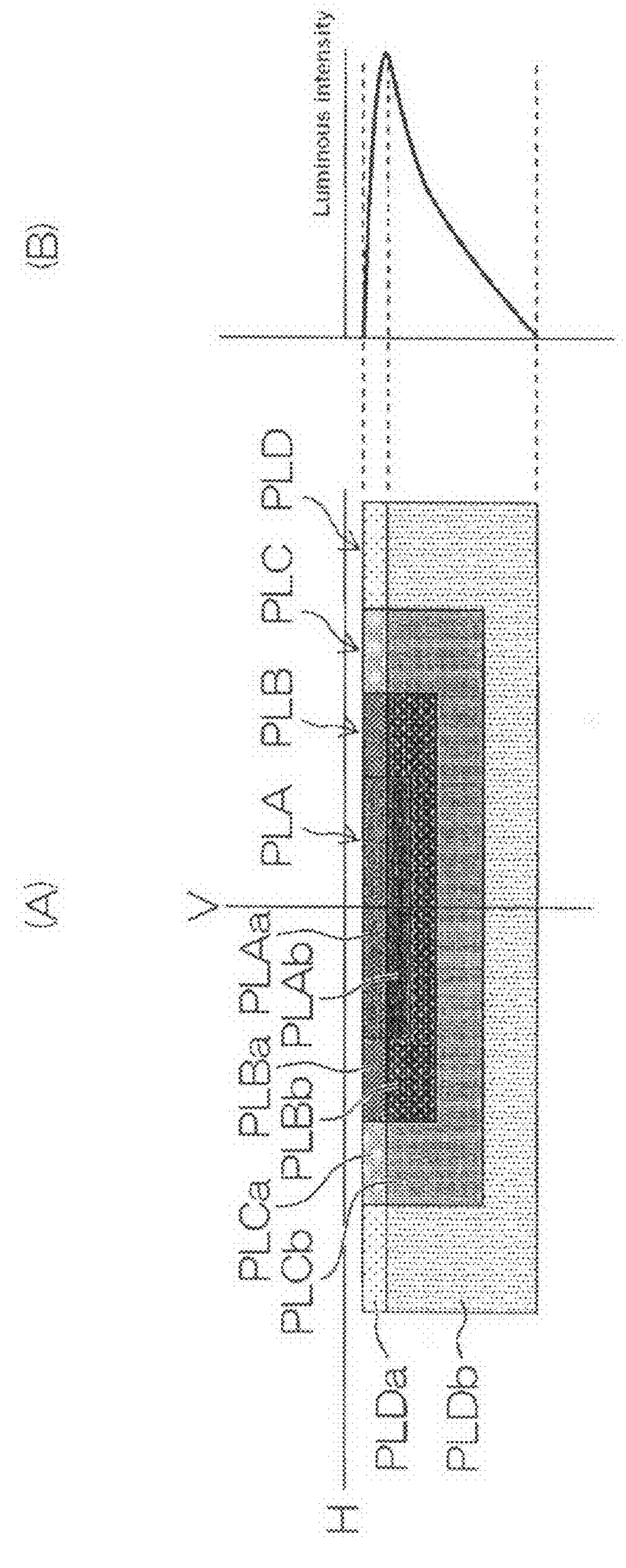
FIG. 65 is a diagram for explaining that the stepped area in the luminance intensity (uneven luminance) that has been formed by the conventional vehicle light can be solved by the arrangement of the plurality of headlamp units 10A to 10D of FIG. 65.

The present modified example 1 can be configured to include four headlamp units 10A to 10D similar to the headlamp 100 of FIG. 40 while the light emission areas of the four headlamp units 10A to 10D are not adjacent to each other in the vertical direction, but arranged adjacent to each other in the horizontal direction when viewed from its front side, as shown in FIG. 64, for example. In this configuration, the plurality of headlamp units 10A to 10D (from their respective light emission areas) can emit light beams and form respective partial light distribution patterns PLA to PLD so that the synthesized light distribution patterns PLA to PLD can form a low beam light distribution pattern as a whole, as shown in FIG. 65A. Further modified examples 2 and 3 to be described later are configured in the same or similar manner as the modified example 1 (see FIGS. 67, 69, and 71). This arrangement can form the vertically continuous light emission area without a discontinuous area (see, for example, FIGS. 64, 67, 69, and 71). Accordingly, the uneven luminance due to the installation height difference between the upper and lower optical units can be prevented (see, for example, FIGS. 65, 68, and 70).

Arrangement of Headlamp Units

Modified example 1

A description will now be given of the modified example 1 with reference to the drawings.

FIG. 64 is a front view showing the arrangement of the headlamp units according to the modified example 1. Hereinafter, the headlamp unit may be referred to as an "optical unit" in some cases.

The headlamp 20 of the present modified example 1 can include the headlamp units 10A to 10D (or optical units 10A to 10D) as shown in FIG. 40 such that the light emission areas of the units 10A to 10D are arranged in a horizontal direction or a vehicle width direction with the respective disposed heights being the same level.

The rectangular shaded ranges in FIG. 64 represent the respective light emission areas from which light beams are emitted by the optical units 10A to 10D.

FIG. 65 includes a light distribution pattern formed by the light beams from the headlamp 20 of the modified example 1. The light distribution pattern can be observed on a virtual screen extending in front of the headlamp 20 in a vertical direction with a predetermined distance (for example, 25 m) away from the headlamp 20. The optical units 10A to 10D can emit light beams to certain directions by respective projecting angles lower than a legally regulated angle. Accordingly, the light distribution pattern formed by the light beams from the optical units 10A to 10D can be a low beam light distribution pattern that satisfies a certain regulation under a certain law (national traffic regulation or the like). For example, the optical units 10A to 10D can emit light beams by an angle of 0.57 degrees or lower with respect to the horizontal direction, meaning that the light beams forming the upper edge of the light distribution pattern are directed downward by at least 0.57 degrees.

Figure 72:
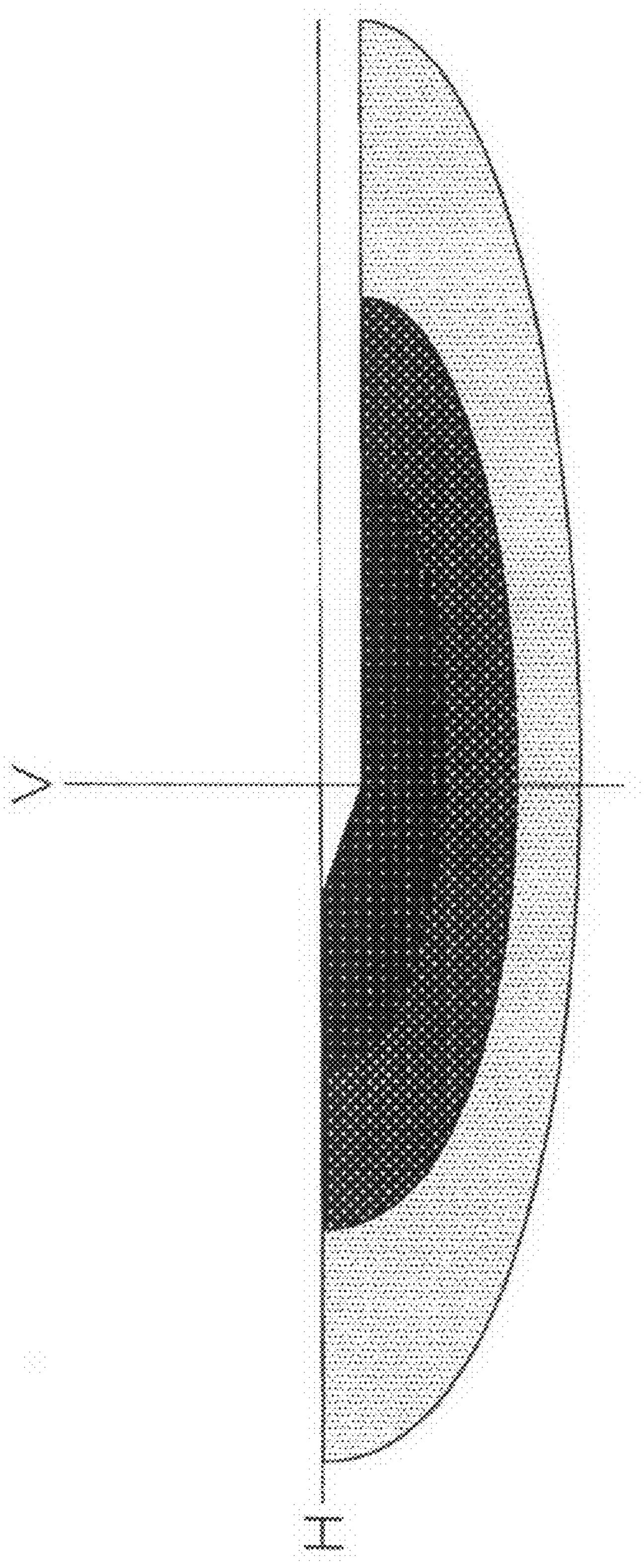
FIG. 72 is a diagram showing a common low beam light distribution pattern.

It should be noted that, although the light distribution pattern shown in (A) of FIG. 65 has the upper edge or bright/dark boundary line being in parallel with the horizontal line, the light distribution patterns with different boundary lines can be formed in accordance with the presently disclosed subject matter. For example, the presently disclosed subject matter can be applied to a general low beam light distribution pattern as shown in FIG. 72 of Japanese Patent Application Laid-Open No. 2008-78086 with the use of a shielding film.

Herein, the partial light distribution patterns PLA to PLD corresponding to the respective optical units 10A to 10D can be arranged at lower positions than the horizontal line H that shows the standard height of the headlamp 20, and the synthesized light distribution pattern by these partial light distribution patterns PLA to PLD can be obtained as the low beam light distribution pattern of the headlamp 20 as a whole.

Figure 66:
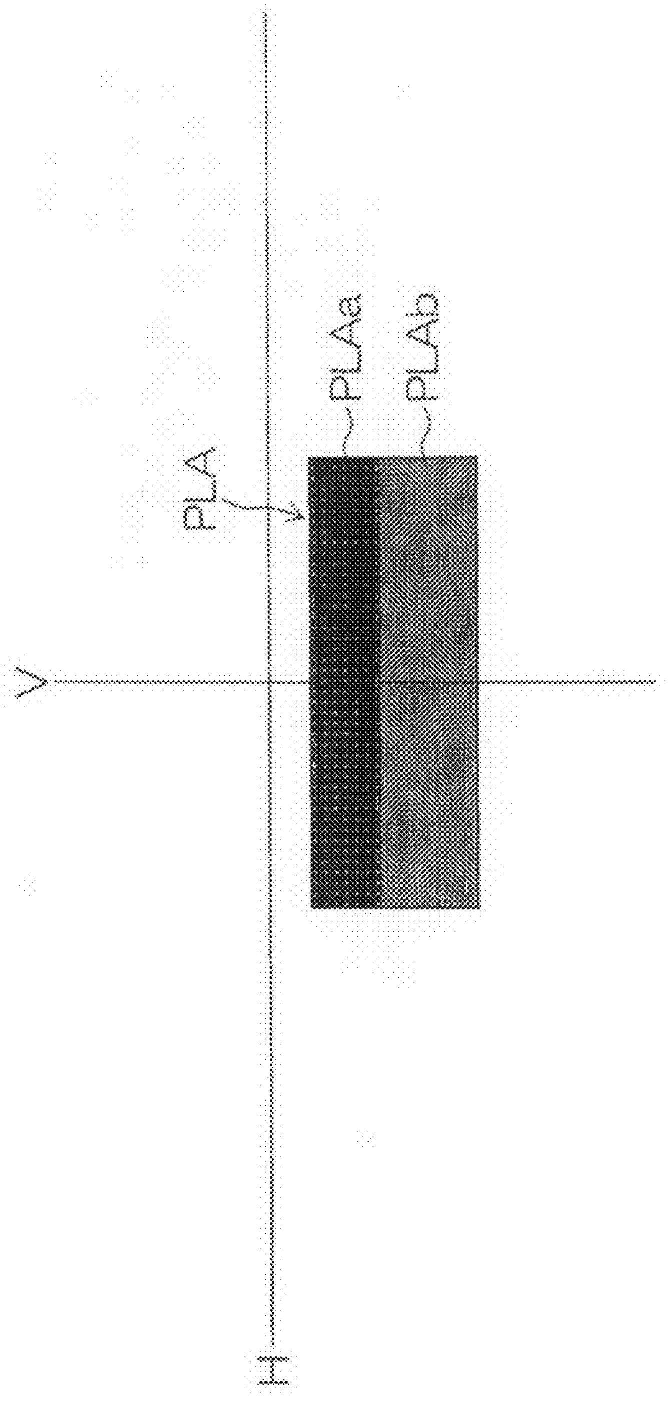
FIG. 66 is a diagram showing a partial light distribution pattern PLA formed by the optical unit 10A.

FIG. 66 is a diagram showing the partial light distribution pattern PLA formed by the optical unit 10A as one example of the partial light distribution patterns PLA to PLD formed by the optical units 10A to 10D. As shown in the drawing, the partial light distribution pattern PLA can be composed of a boundary area PLAa at its upper side for forming the bright/dark boundary line which is the boundary between an area that is illuminated with light beams and an area that is not illuminated with light beams, and a light distribution area PLAb that is illuminated with light beams other than the light beams for the boundary area PLAa.

The boundary area PLAa can corresponds to an area that is illuminated with light beams while the bright/dark boundary line is not clear (meaning blurring). The light beams with which the boundary area PLAa is illuminated can contain parallel light beams that are part of the light beams projected by the optical unit 10A at the most upward angle or around. The height in the vertical direction of the boundary area PLAa can be the same as that of the light emission area of the optical unit 10A. In this boundary area PLAa, the luminance intensity is gradually increased from the upper edge of the area PLAa to the lower edge thereof.

On the other hand, the light distribution area PLAb can be freely designed (shape, size, luminance intensity, and the like) by designing the optical unit 10A according to the required specification.

The other partial light distribution patterns PLB, PLC, and PLD formed by the remaining optical units 10B, 10C, and 10D can be formed in the similar manner to the above configuration of the pattern PLA. Specifically, as in (A) of FIG. 65, the partial light distribution patterns PLB, PLC, and PLD can include respective boundary areas PLBa, PLCa, and PLDa having the same vertical height as those of the light emission areas of the optical units 10B, 10C, and 10D, respectively, and light distribution areas PLBb, PLCb, and PLDb freely designed in accordance with the required specification.

When the optical units 10A to 10D are arranged as shown in FIG. 64, the heights of the light emission areas of the respective optical units 10A to 10D are aligned with each other. Furthermore, the projecting angles of light beams at the upper edges projected from the optical units 10A to 10D (namely, the light means forming the upper edges of the respective partial light distribution patterns PLA, PLB, PLC, and PLD) are the same. Accordingly, the boundary areas PLAa, PLBa, PLCa, and PLDa can be overlapped with each other at the same vertical position.

The light distribution pattern of the vehicle headlamp 20 as a while obtained by these patterns PLA to PLD can show a luminous intensity distribution in a vertical cross-section of the drawing (B) of FIG. 65, formed on the V line indicating the left-to-right center of the vehicle headlamp 20. According to this configuration, there is no low luminance intensity (minimum intensity) area locally generated, and an ideal light distribution pattern can be formed without illuminance unevenness (uneven light distribution). Specifically, the boundary areas PLAa, PLBa, PLCa, and PLDa of the partial light distribution patterns PLA, PLB, PLC, and PLD formed by the respective optical units 10A, 10B, 10C, and 10D, respectively, can be overlapped with each other. Here, the boundary areas PLAa, PLBa, PLCa, and PLDa may be the blurring areas of the bright/dark boundary line. Accordingly, there is no low luminance intensity area locally generated, and the blurring areas of the bright/dark boundary line can be minimized in the light distribution pattern of the vehicle headlamp 20 as a whole.

The light distribution patterns (areas) assigned to the respective optical units 10A to 10D are not limited to the above configuration. Furthermore, the partial light distribution patterns PLA, PLB, PLC, and PLD formed by the respective optical units 10A to 10D are not limited to the above configuration. The light distribution patterns (areas) of the respective optical units 10A to 10D may not be formed by projecting light in the straight forward direction, but by a certain angle with respect to the horizontal direction.

In the above modified example 1, the vehicle headlamp 20 can be configured to include four optical headlamp units 10A to 10D each of which can have a light emission area with the same shape and size. However, the presently disclosed subject matter is not limited to the case where four optical units are used, the case where the light emission areas have the same shape and size, and the like cases, but various optical units can be employed as long as the following conditions are met (conditions of the modified example 1). Specifically, the vehicle headlamp 20 can include a plurality (an arbitrary number) of optical units whose light emission areas are arranged such that within the largest vertical range of the light emission area of the optical unit the vertical ranges of the remaining light emission areas are arranged. Examples of such cases include: the cases where the upper edges, lower edges, or the center locations of the light emission areas of the respective optical units are positioned at the same height.

Arrangement of Headlamp Units

Modified Example 2

Next a description will be made to a modified example 2.

Figure 67:
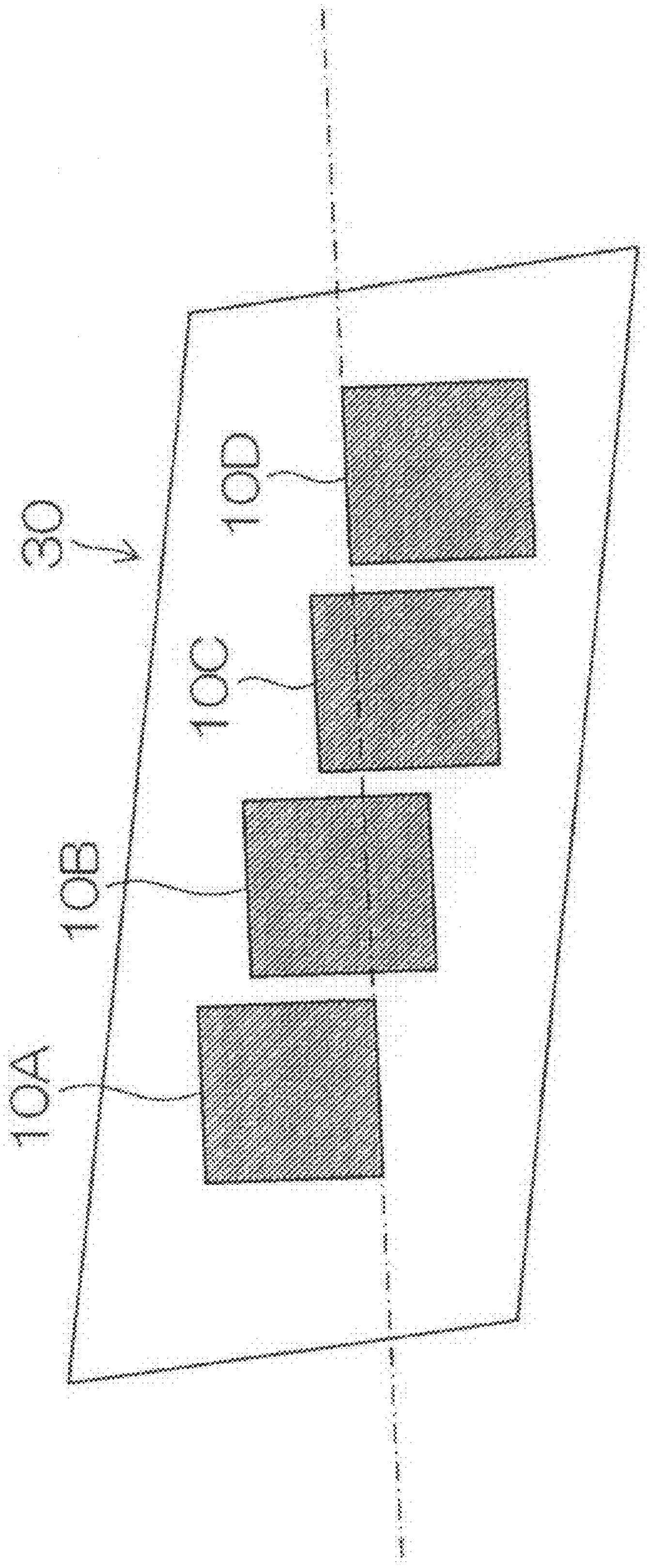
FIG. 67 is a diagram showing an example (modified example 2) of a vehicle light wherein a plurality of headlamp units 10A to 10D are configured such that the light emission areas thereof are arranged adjacent to each other in the width direction of a vehicle body so that the light emission areas are not adjacent to each other in the vertical direction when viewed from its front side.

FIG. 67 is a front view showing the arrangement of the headlamp units (or optical units) of the headlamp according to the modified example 2.

The vehicle headlamp 30 of the present modified example 2 shown in FIG. 67 can include the same or similar optical units 10A to 10D as those of the vehicle headlamp 30 shown in FIG. 40, while the optical units 10A to 10D can be arranged in a different height position. In the illustrated example, the left end optical unit 10A can be disposed at the highest position, and the remaining optical units 10B to 10D can be disposed at the position lower than the adjacent left unit 10A to 10C, respectively.

Furthermore, as illustrated in FIG. 67, the lower edge of the light emission area of the highest optical unit 10A can be matched to the upper edge of the light emission area of the lowest optical unit 10D. Accordingly, the light emission areas of the optical units 10B and 10C can be arranged within a vertical range from the upper edge of the light emission area of the highest optical unit 10A to the lower edge of the light emission area of the lowest optical unit 10D.

Figure 68:
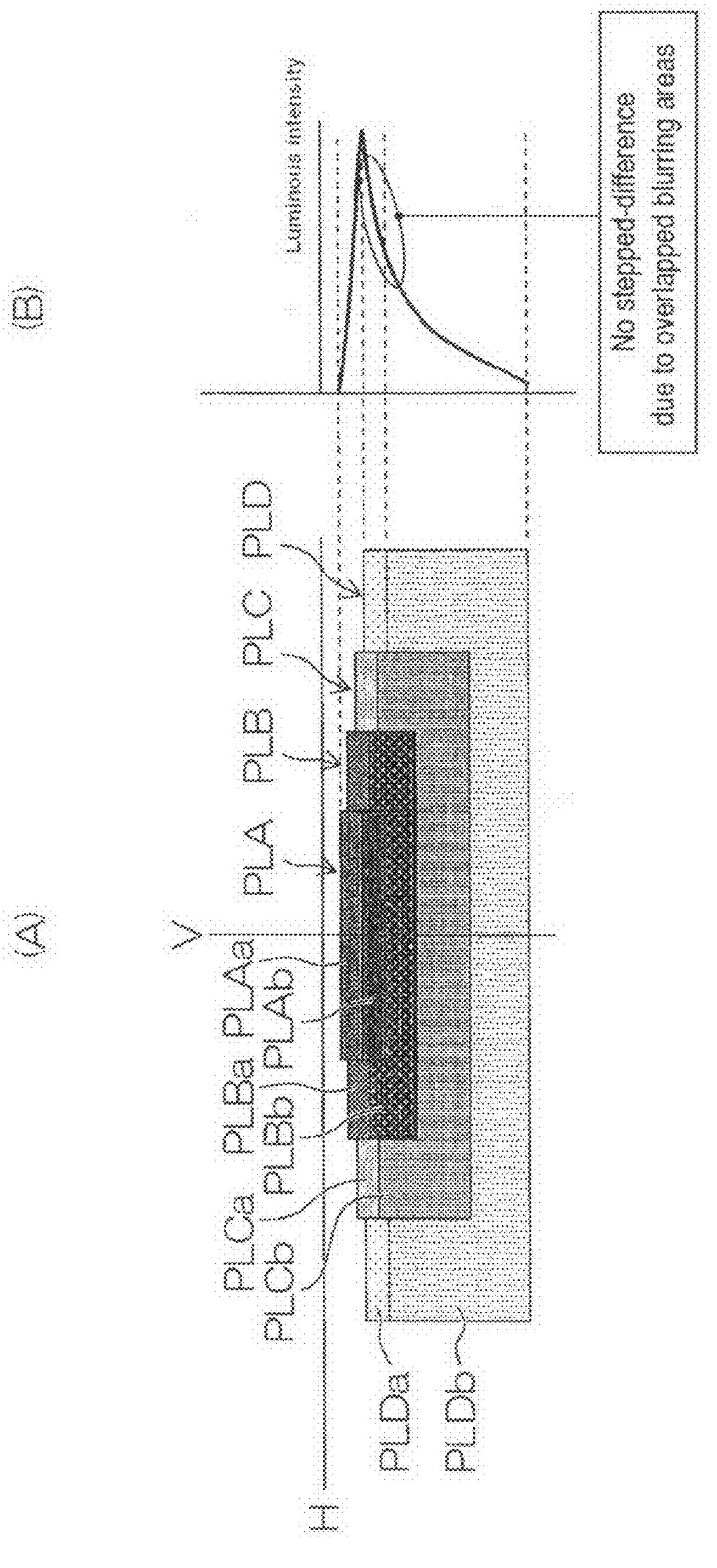
FIG. 68 is a diagram for explaining that the stepped area in the luminance intensity (uneven luminance) that has been formed by the conventional vehicle light can be solved by the arrangement of the plurality of headlamp units 10A to 10D of FIG. 67.

(A) of FIG. 68 is a diagram showing a light distribution pattern formed by the light beams emitted by the headlamp 30 on a virtual vertical screen disposed virtually a predetermined distance away, for example, 25 m away, from the vehicle headlamp. The respective optical units 10A to 10D of the headlamp 30 can project light beams at a projection angle or less as determined by a certain regulation as a low bean light distribution. For example, the light beams can be projected downward by 0.57 degrees or less with respect to the horizontal direction. Specifically, almost all the light beams forming the upper edge area of the light distribution pattern out of the light beams projected by the respective optical units 10A to 10D can be controlled so as to be projected downward by 0.57 degrees with respect to the horizontal direction.

In the shown modified example, the partial light distribution patterns PLA, PLB, PLC, and PLD corresponding to the respective optical units 10A, 10B, 10C, and 10D can be formed at positions lower than the horizontal line H, which indicates the vertical height of the vehicle headlamp 30, as in the previous modified example illustrated in the drawing (A) of FIG. 65. In this case, corresponding to the difference in height of the light emission areas of the optical units 10A, 10B, 10C, and 10D, the partial light distribution patterns PLA, PLB, PLC, and PLD can be formed in a different height position by the amount.

Furthermore, the lower edge of the boundary area PLAa of the partial light distribution pattern PLA formed by the highest optical unit 10A can be matched to the upper edge of the boundary area PLDa of the partial light distribution pattern PLD formed by the lowest optical unit 10D. Accordingly, the boundary areas PLBa and PLCa of the partial light distribution patterns PLB and PLC formed by the optical units 10B and 10C, respectively, are arranged within a range between the boundary areas PLAa and PLDa.

The light distribution pattern of the headlamp 30 obtained as a whole can show a luminous intensity distribution in a vertical cross-section of (B) of FIG. 68, formed on the V line indicating the left-to-right center of the vehicle headlamp 20. According to this configuration, there is no low luminance intensity area locally generated, and an ideal light distribution pattern can be formed without illuminance unevenness (uneven light distribution).

The light distribution patterns (areas) assigned to the respective optical units 10A to 10D are not limited to the above configuration. Furthermore, the partial light distribution patterns PLA, PLB, PLC, and PLD formed by the respective optical units 10A to 10D are not limited to the above configuration. The light distribution patterns (areas) of the respective optical units 10A to 10D may not be formed by projecting light beams in the straight forward direction, but by a certain angle with respect to the horizontal direction.

In the above modified example 2, the vehicle headlamp 30 can be configured to include four optical units 10A to 10D and the optical units 10A to 10D each can have a light emission area with the same shape and size. However, the presently disclosed subject matter is not limited to the case where four optical units are used, the case where the light emission areas have the same shape and size, and the like cases, but various optical units can be employed as long as the following conditions are met (conditions of the modified example 2). Specifically, the vehicle headlamp 30 can include a plurality (an arbitrary number) of optical units in which the light emission area with its upper edge disposed at the highest position and the light emission area with its lower edge disposed at the lowest position out of the light emission areas of the optical units in the vertical direction can be arranged so that the ranges of these light emission areas as defined in a vertical direction of the light emission areas can form a single range continuous in the vertical direction, and the light emission areas of the remaining optical units can be arranged so that the vertical ranges of the light emission areas thereof are disposed within the continuous range. The conditions of the modified example 2 are those excluding the range where the conditions of the modified example 1 are met. Note that, when the highest light emission area has the lower edge below, or the same as, the upper edge of the lowest light emission area in terms of vertical position, it is said that the vertically continuous range can be formed by these light emission areas When a plurality of optical units are configured such that the light emission areas are arranged to meet the conditions of the modified example 2, the blurring range of the bright/dark boundary line in the entire light distribution pattern of the headlamp 30 is larger than the modified example 1. Accordingly, this configuration can prevent the luminance unevenness due to the overlapping of the blurring ranges of the partial light distribution patterns of the respective optical units.

Arrangement of Headlamp Units

Modified Example 3

Next, a modified example 3 will be described.

Figure 69:
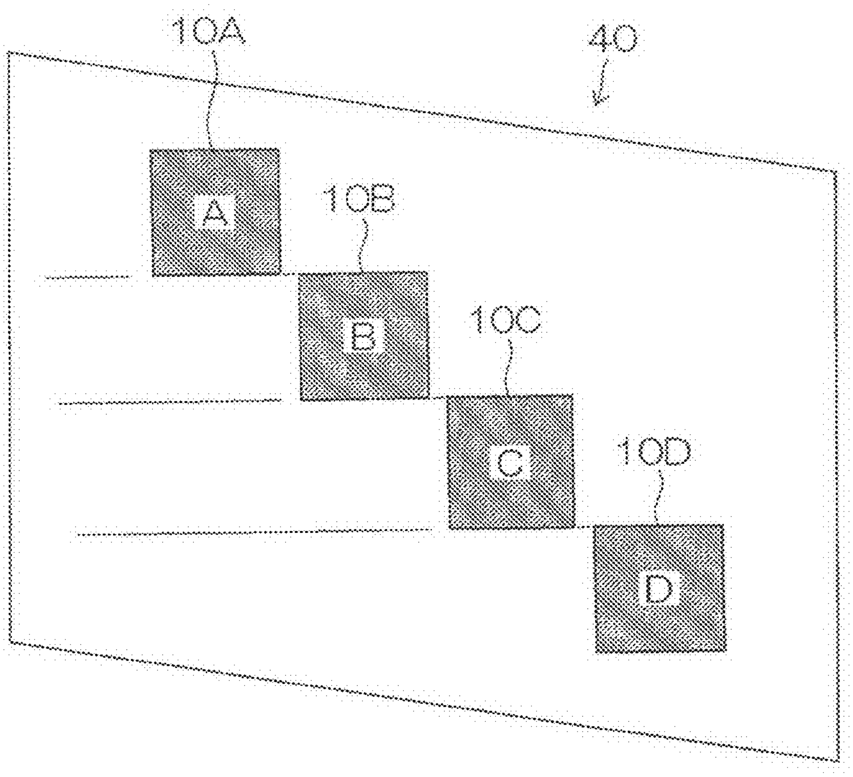
FIG. 69 is a diagram showing an example (modified example 3) of a vehicle light wherein a plurality of headlamp units 10A to 10D are configured such that the light emission areas thereof are arranged adjacent to each other in the width direction of a vehicle body so that the light emission areas are not adjacent to each other in the vertical direction when viewed from its front side.

FIG. 69 is a front view showing the arrangement of the headlamp units or optical units of the vehicle headlamp 40 according to the modified example 3.

The headlamp 40 of the modified example 3 shown in FIG. 69 can include the same optical units 10A to 10D as those shown in FIG. 40, while the optical units 10A to 10D can be arranged in a different height position. In the illustrated example, the leftmost optical unit 10A can be disposed at the highest position, and the remaining optical units 10B to 10D can be disposed at the position lower than the adjacent left optical unit 10A to 10C, respectively.

In the present modified example 3, different from the arrangement of the optical units 10A to 10D of the headlamp 30 of FIG. 67, the light emission area of the highest optical unit 10A is not continuous in terms of vertical position with the light emission area of the lowest optical unit 10D.

However, the light emission areas of the optical units 10A to 10D can be arranged so as to be continuous in terms of vertical position, wherein the vertical position of the lower edge of the light emission area of the optical unit 10A is matched to that of the upper edge of the light emission area of the optical unit 10B, the vertical position of the lower edge of the light emission area of the optical unit 10B is matched to that of the upper edge of the light emission area of the optical unit 10C, and the vertical position of the lower edge of the light emission area of the optical unit 10C is matched to that of the upper edge of the light emission area of the optical unit 10D.

Figure 70:
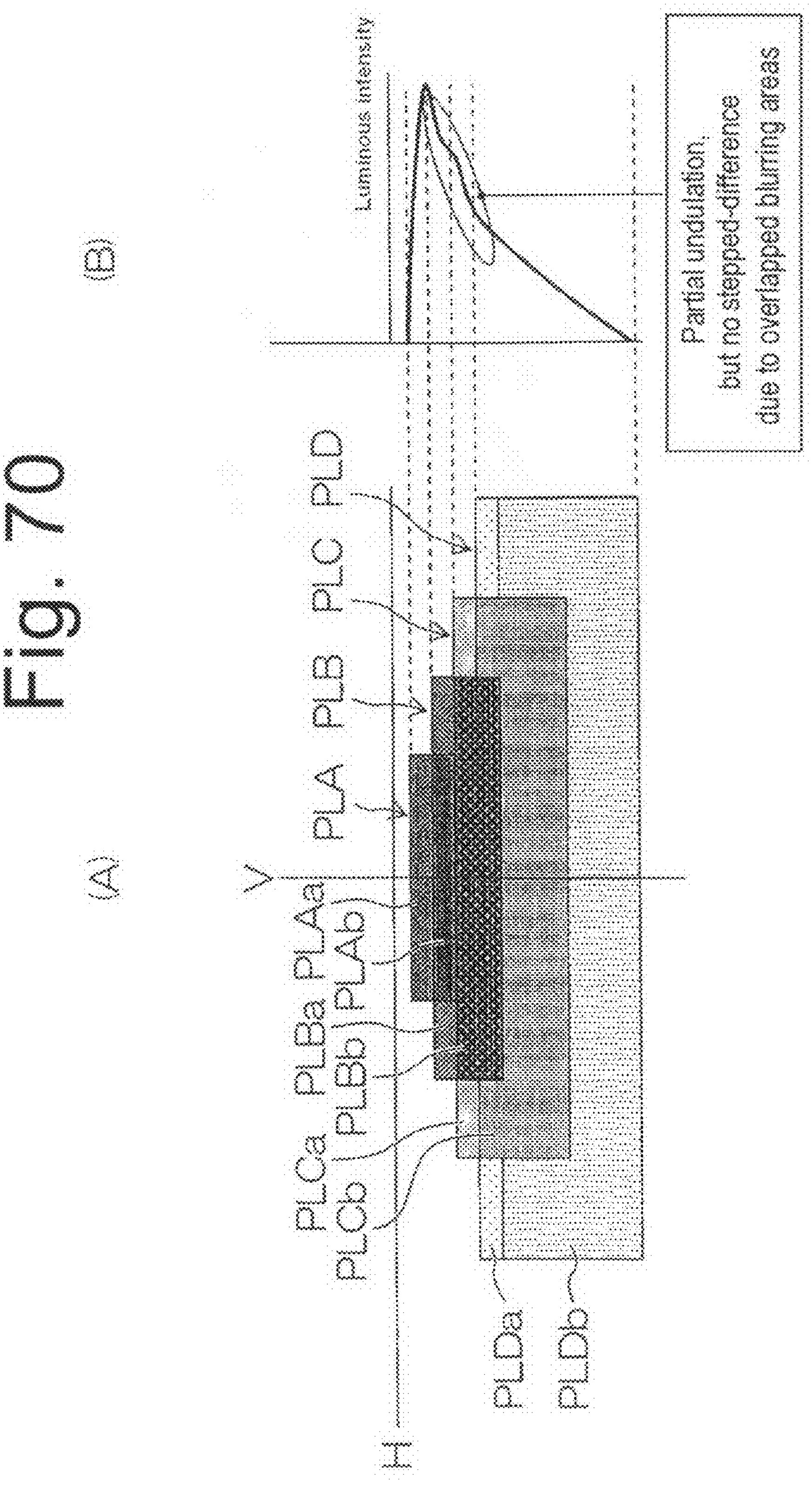
FIG. 70 is a diagram for explaining that the stepped area in the luminance intensity (uneven luminance) that has been formed by the conventional vehicle light can be solved by the arrangement of the plurality of headlamp units 10A to 10D of FIG. 69.

(A) of FIG. 70 is a diagram showing a light distribution pattern formed by the light beams projected by the headlamp 40 of FIG. 69 on a virtual vertical screen disposed by a predetermined distance away, for example, 25 m away, from the headlamp 40. The respective optical units 10A to 10D of the headlamp 40 can project light beams by a certain projection angle or less as determined by a certain regulation as a low bean light distribution. For example, the light beams can be projected downward by 0.57 degrees or less with respect to the horizontal direction. Specifically, almost all the light beams forming the upper end area of the light distribution pattern out of the light beams projected by the respective optical units 10A to 10D can be controlled so as to be projected downward by 0.57 degrees with respect to the horizontal direction.

In this case, the partial light distribution patterns PLA, PLB, PLC, and PLD corresponding to the respective optical units 10A, 10B, 10C, and 10D can be formed at positions lower than the horizontal line H, which indicates the vertical height of the headlamp 40, as in the previous example 1 illustrated in the drawing (A) of FIG. 65. At the same time, corresponding to the difference in height of the light emission areas of the optical units 10A, 10B, 10C, and 10D, the partial light distribution patterns PLA, PLB, PLC, and PLD can be formed in different height positions by the amount corresponding to the height difference of the light emission areas of the optical units 10A, 10B, 10C, and 10D.

Furthermore, the vertical position of the lower edge of the boundary area PLAa of the partial light distribution pattern PLA is matched to that of the upper edge of the boundary area PLBa of the partial light distribution pattern PLB, the vertical position of the lower edge of the boundary area PLBa of the partial light distribution pattern PLB is matched to that of the upper edge of the boundary area PLCa of the partial light distribution pattern PLC, and the vertical position of the lower edge of the boundary area PLCa of the partial light distribution pattern PLC is matched to that of the upper edge of the boundary area PLDa of the partial light distribution pattern PLD.

The light distribution pattern of the headlamp 40 obtained as a while can show a luminous intensity distribution in a vertical cross-section of the drawing (B) of FIG. 70, formed on the V line indicating the left-to-right center of the headlamp 40. According to this configuration, although the luminance intensity may include partial undulation, there is no low luminance intensity area locally generated, and an ideal light distribution pattern can be formed without illuminance unevenness (uneven light distribution).

The light distribution patterns (areas) assigned to the respective optical units 10A to 10D are not limited to the above configuration. Furthermore, the partial light distribution patterns PLA, PLB, PLC, and PLD formed by the respective optical units 10A to 10D are not limited to the above configuration. The light distribution patterns (areas) of the respective optical units 10A to 10D may not be formed by projecting light in the straight forward direction, but by a certain angle with respect to the horizontal direction.

Figure 71:
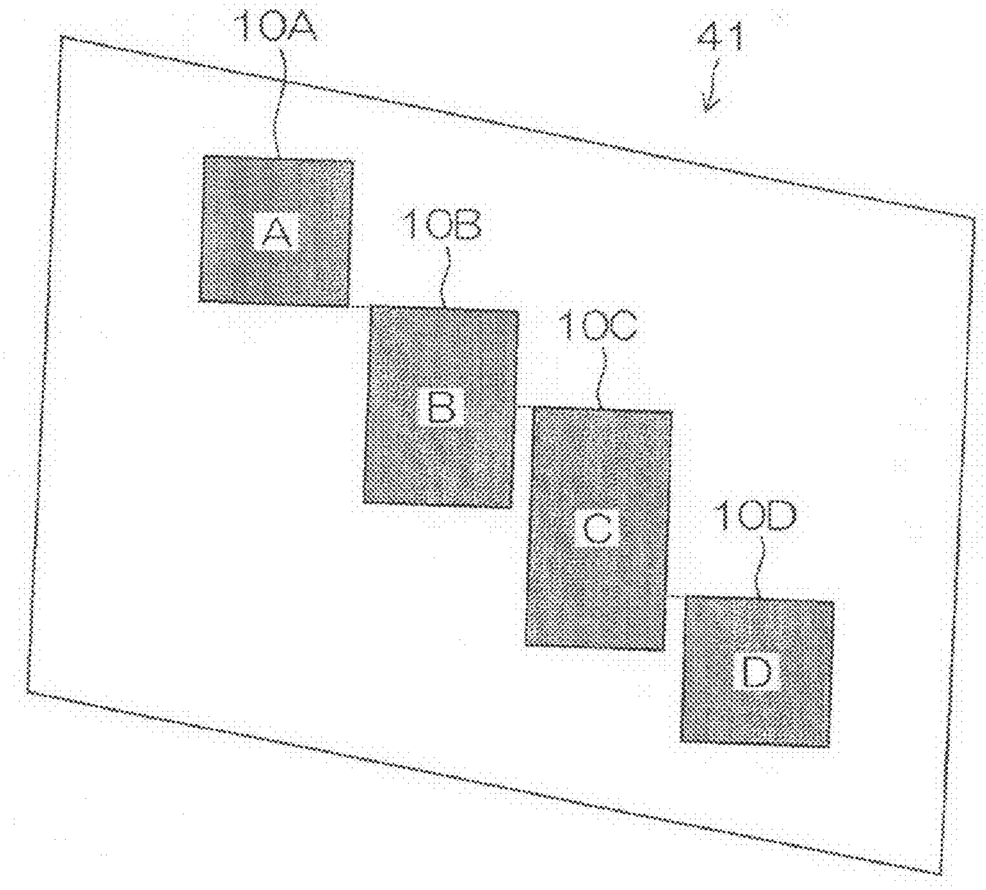
FIG. 71 is a diagram showing an example of a vehicle light wherein a plurality of headlamp units 10A to 10D are configured such that the light emission areas thereof are arranged adjacent to each other in the width direction of a vehicle body so that the light emission areas are not adjacent to each other in the vertical direction when viewed from its front side.

In the above modified example 3, the headlamp 40 can be configured to include four optical units 10A to 10D each of which can have a light emission area with the same shape and size. However, the presently disclosed subject matter is not limited to the case where four optical units are used, the case where the light emission areas have the same shape and size, and the like cases, but various optical units can be employed as long as the following conditions are met (conditions of the modified example 3). Specifically, the vehicle headlamp 40 can include a plurality (an arbitrary number) of optical units whose light emission areas are arranged such that vertical ranges of the light emission areas can form a single continuous vertical range. The conditions of the modified example 3 are those excluding the range where the conditions of the modified example 2 are met. For example, FIG. 71 is a front view illustrating a further modified example of the present exemplary embodiment, wherein a headlamp 41 can include four optical units 10A to 10D with different vertical sizes of the respective light emission areas. In this modified example, these light emission areas can be arranged so that vertical ranges of the light emission areas can form a single continuous vertical range, and accordingly, it can prevent the luminance unevenness from being generated.

When a plurality of optical units are configured such that the light emission areas are arranged to meet the conditions of the modified example 3, the blurring range of the bright/dark boundary line in the entire light distribution pattern of the headlamp 40 (or the vehicle headlamp 41) is larger than the modified examples 1 and 2. However, this configuration can also prevent the luminance unevenness because the blurring ranges of the partial light distribution patterns of the respective optical units are not separated away from each other in the vertical direction.

The above configurations of the vehicle headlamps according to the respective modified examples 1 to 3 can be applied to a light for use in motorcycles, automobiles, electric trains, and other vehicles, and the light is not limited to a headlamp, but can be a fog lamp, a signal lamp, or other types of vehicle lights.

Figure 73:
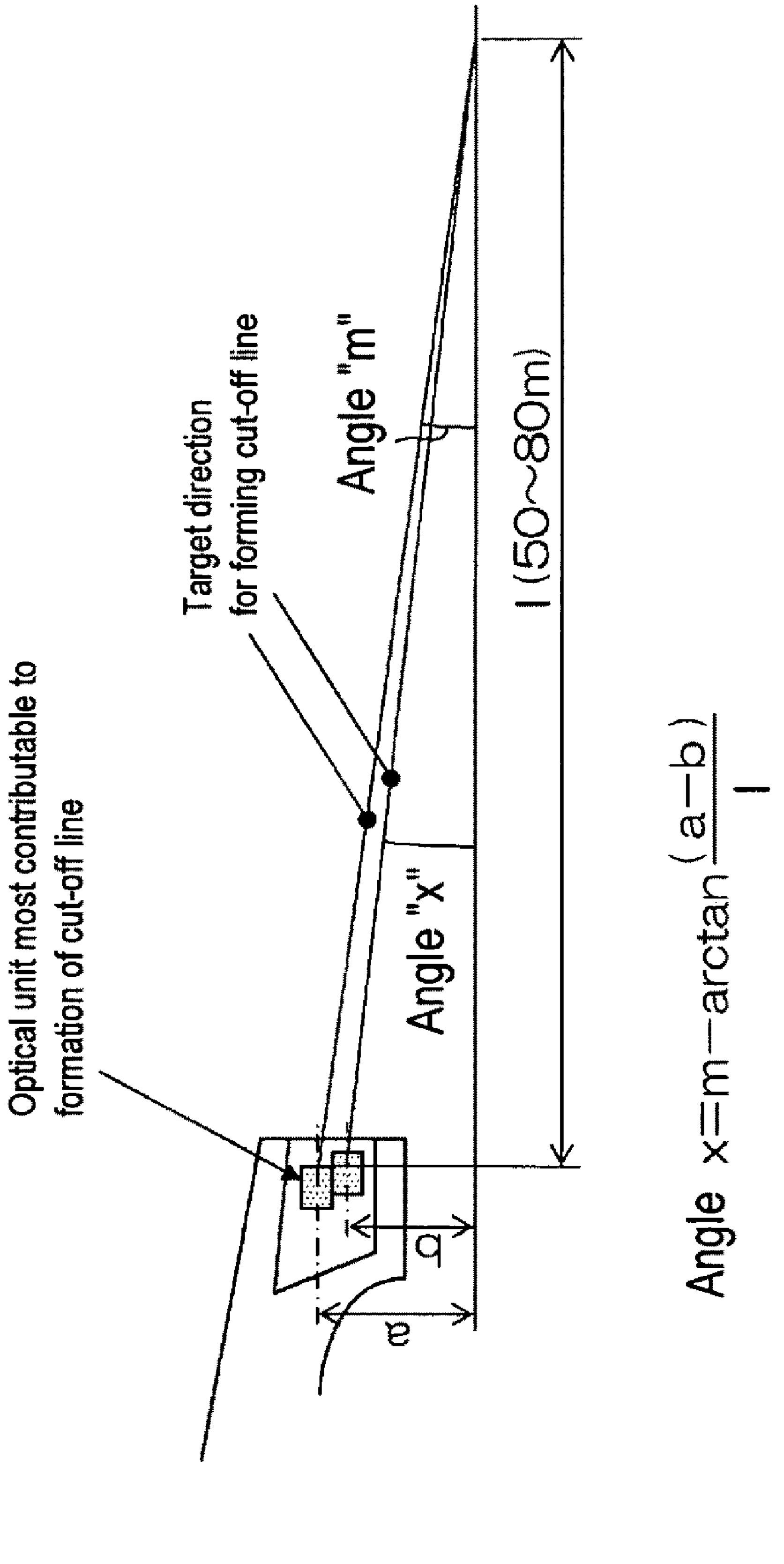
FIG. 73 is a diagram for explaining how the light beams for forming the upper edge of the light distribution pattern are projected by projecting angles x.
Figure 74:
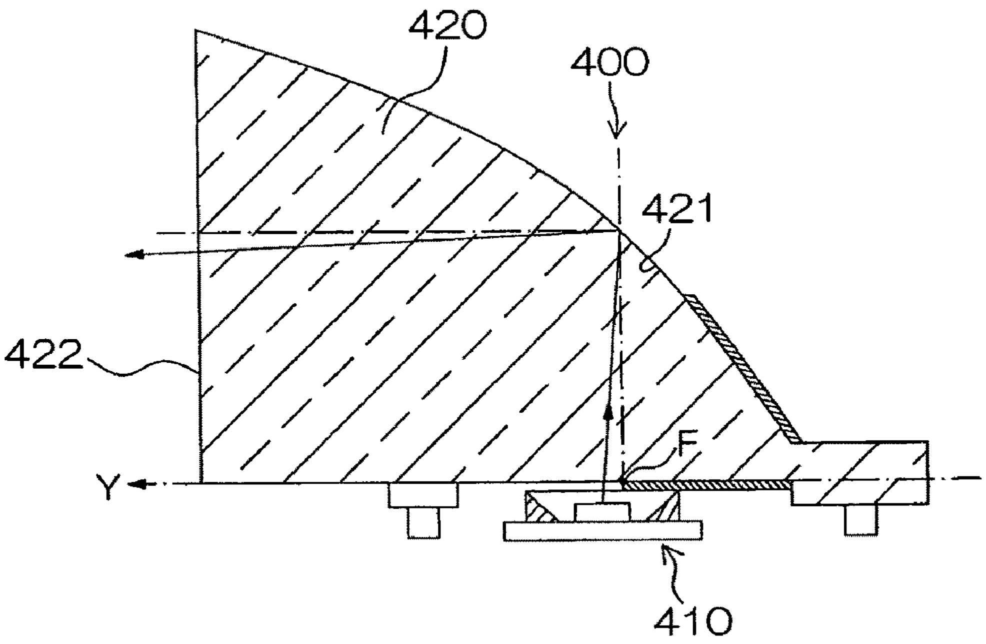
FIG. 74 is a schematic sectional view showing an example of the configuration of a vehicle light utilizing a conventional optical unit including an LED light source and a light guide.

In the present modified examples 1 to 3, almost all the light beams forming the upper end area of the partial light distribution pattern (light distribution pattern formed by each optical unit) out of the light beams projected by the respective optical units can be controlled so as to be projected by the same angle. However, the presently disclosed subject matter is not limited to these particular examples. The projecting angle of light beams forming the upper end area of the partial light distribution pattern formed by each optical unit can be set based on the height of the light emission area of the optical unit from the road surface such that the road surface distanced a predetermined distance away (for example, 50 to 80 meters away) from the vehicle headlamp in the front direction with the light beams forming the upper end area. Specifically, as shown in FIG. 73, the projection angle x of light beams forming the upper end area of a partial light distribution pattern formed by an optical unit the light emission area of which is disposed at a height of b (unit: meter) can be represented by the following equation (1), $$x=m-\arctan\{(a-b)/l\} \quad (1),$$

wherein a (unit: meter) represents the height of the light emission area of an optical unit which contributes to form the upper end area of the partial light distribution pattern with the highest level, l (unit: meter) represents the distance between the light emission area and the road surface that is illuminated with the light beams forming the upper end area of the partial light distribution pattern formed by the subject optical unit, and m represents the projection angle of that light. Furthermore, the blurring areas of the bright/dark boundary lines of the partial light distribution patterns formed by the respective optical units may be overlapped with each other at the road surface distanced "l" meters away from the vehicle light.

The modified examples 1 to 3 can be configured to include four headlamp units 10A to 10D similar to the headlamp 100 of FIG. 40 while the light emission areas of the four headlamp units 10A to 10D are not adjacent to each other in the vertical direction, but arranged adjacent to each other in the horizontal direction when viewed from its front side, as shown in FIGS. 64, 66, 68, and 70. In the configuration, the plurality of headlamp units 10A to 10D can emit light beams (from their respective light emission areas) and form respective partial light distribution patterns PLA to PLD so that only the synthesized light distribution patterns PLA to PLD can form a low beam light distribution pattern as a whole. This arrangement can form the vertically continuous light emission area without a discontinuous area (see FIGS. 64, 67, 69, and 71). Accordingly, the uneven luminance due to the installation height difference between the upper and lower optical units can be prevented (see FIGS. 65, 68, and 70).

It should be noted that the headlamp to which the modified examples 1 to 3 can be applied is not limited to those including four headlamp units 10A to 10D as shown in FIG. 40. For example, the modified examples 1 to 3 can be applied to the headlamp including other headlamp units 50A to 50D described later with reference to FIG. 75 and the like.

It should be noted that the illustrated examples are configured to include four headlamp units as in the modified examples 1 to 3, but the presently disclosed subject matter is not limited to these examples. For example, the headlamp in accordance with the presently disclosed subject matter may include two, three, or five or more headlamp units.

Summary of the Headlamp Units

Modified Examples 4 to 6

Figure 76:
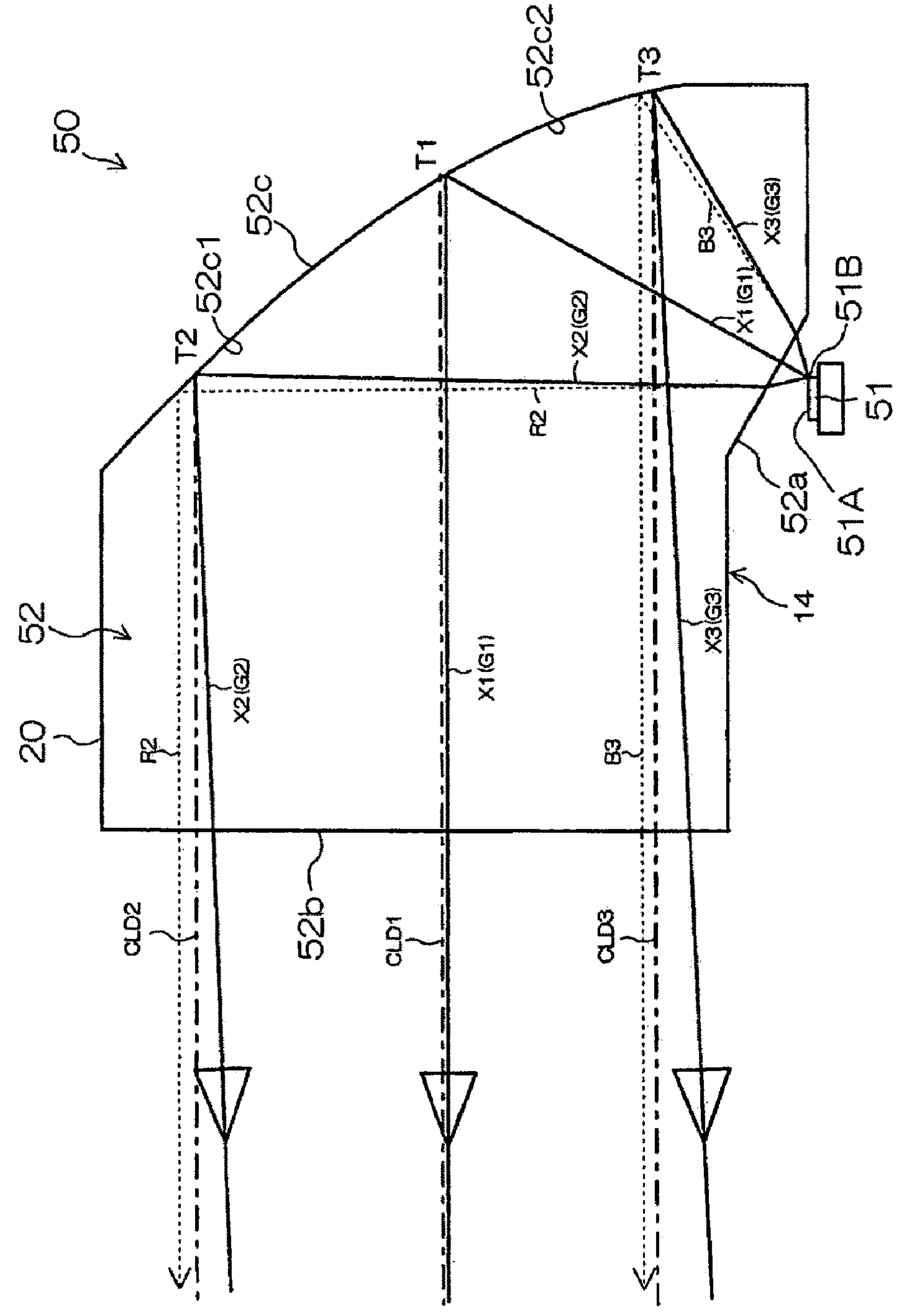
FIG. 76 is a vertical cross sectional view illustrating the configuration of a lens body for use in the vehicle light of FIG. 75.

The present modified example 4 can be configured to include headlamp units 50A to 50D for preventing or suppressing the occurrence of rainbow coloring near the bright/dark boundary line caused by the color aberration, for example, as shown in FIG. 76. Further modified examples 5 and 6 to be described later are configured in the same or similar manner as the modified example 4.

The headlamp units 50A to 50D can be configured to project the light beams for forming partial light distribution patterns, thereby constituting a low beam light distribution pattern within the predetermined white color range.

The headlamp units 50A to 50D can have a common configuration including an LED light source 51, and a lens body 52 disposed in front of the LED light source 51.

The LED light source 51 can be an LED light source that satisfies the conditions for improving the visibility (noticeability) with a peripheral vision as clarified above. Namely, the LED light source 51 can be an LED light source with a color temperature range of 4500 K to 7000 K (preferably, of 5000 K to 6000 K) and that can emit light beams including four color light beams represented by four coordinate values of predicted four colors including red, green, blue and yellow in the a* b* coordinate system corresponding to the CIE 1976 L*a*b* color space, the four coordinate values in the a* b* coordinate system being encompassed by respective circle areas having a radius of 5 and each of center coordinate values of (41.7, 20.9) for red, (−39.5, 14.3) for green, (8.8, −29.9) for blue and (−10.4, 74.2) for yellow.

As the LED light source 51, a light source including a combination of a blue LED and a wavelength conversion material (for example, a yellow phosphor) can be utilized. Example thereof include LEDs T6, T7, and T9 with the correlated color temperatures as shown in FIG. 11. In this case, for example, the yellow phosphor can be adjusted in terms of concentration, composition, and the like, to thereby satisfy the conditions for improving the visibility (noticeability). The LED light source 51 is not limited to the above, but an LED light source including a UV LED and a white phosphor (emitting three colored light) in combination, an LED light source including R, G, and B LEDs, and the like.

As shown in FIG. 76, the lens body 52 can be a solid lens body including a light incident surface 52*a*, a light exiting surface 52*b*, and a light reflecting surface 52*c*. Light beams emitted from the LED light source 51 can enter the lens body 52 through the light incident surface 52*a*, and can be reflected by the reflecting surface 52*c* to be directed toward the light exiting surface 52*b*. Then, the projected light beams can form a partial light distribution pattern such as PA (see FIG. 77) having a bright/dark boundary line CL.

The light reflecting surface 52*c* can include a first reflecting area, a second reflecting area 52*c*1, and a third reflecting area 52*c*2. The first reflecting area can reflect light beams X1 (G1) at a standard wavelength that has been emitted from one side 51B of the LED light source 51 corresponding to light beams for forming the bright/dark boundary line CL and has entered the lens body 52 through the light incident surface 52*a* perpendicular with respect to the light incident surface 52*a* without being subjected refraction so as to form the bright/dark boundary line. The first reflecting area corresponds to the area T1 in FIG. 76. The second reflecting area 52*c*1 can reflect light beams that has been emitted from the one side 51B of the LED light source 51 corresponding to the light beams for forming the bright/dark boundary line CL, has entered the lens body 52 through the light incident surface 52*a* by a certain incident angle other than 90 degrees with respect to the light incident surface 52*a* with the light beams R2 being subjected to refraction according to the light incident angle 52*a*, and have wavelengths longer than the standard wavelength so as to distribute the light beams on or below the bright/dark boundary line CL. The second reflecting area 52*c*1 corresponds to the area between the point where the light beams R2 is incident on and the point T1. The third reflecting area 52*c*2 can reflect light beams that has been emitted from the one side 51B of the LED light source 51 corresponding to light beams for forming the bright/dark boundary line CL, has entered the lens body 52 through the light incident surface 52*a* by another certain incident angle other than 90 degrees with respect to the light incident surface 52*a* with the light beams B3 being subjected to refraction according to the another light incident angle, and have wavelengths shorter than the standard wavelength so as to distribute the light beams on or below the bright/dark boundary line CL. The third reflecting area 52*c*2 corresponds to the area between the point where the light beams R3 is incident on and the point T1.

According to this configuration, the light beams emitted from the LED light source 51 can enter the lens inside while being refracted in accordance with the incident angle with respect to the light incident surface 52*a* and accordingly can be a cause for occurrence of rainbow coloring near the bright/dark boundary line CL. In this case, the light beams can be light beams R2 and B3 that have shorter wavelength and longer wavelength than the standard wavelength, respectively. However, the light beams can be arranged below the bright/dark boundary line CL by the action of the second reflecting area 52*c*1 and the third reflecting area 52*c*2, whereby the above configuration can eliminate or suppress the rainbow coloring occurring near the bright/dark boundary line due to chromatic aberration.

The second reflecting area 52*c*1 can reflect the light beams R2 that have wavelengths longer than the standard wavelength and direct them to the light exiting surface 52*b* so as to distribute the light beams on the bright/dark boundary line or within the partial light distribution pattern PA, and the third reflecting area 52*c*2 can reflect the light beams B3 that have wavelengths shorter than the standard wavelength and direct them to the light exiting surface 52*b* so as to distribute the light beams on the bright/dark boundary line or within the partial light distribution pattern PA.

In this configuration, the light beams R2 that have been subjected to refraction according to incident angles to cause rainbow coloring (color blurring) near the bright/dark boundary line CL (the light beams R2 and B3 with wavelengths longer and shorter than the standard wavelength, respectively) can be distributed on the bright/dark boundary line CL or within the partial light distribution pattern PA by the action of the second and third reflecting areas 52*c*1 and 52*c*2. Accordingly, the above configuration can eliminate or suppress the chromatic unevenness occurring within the partial light distribution pattern PA.

In the above vehicle light, the light reflecting surface 52*c* can be formed so that light beams emitted from edges 51B of the LED light source 51 are projected from the light exiting surface and distributed on the bright/dark boundary line CL and within the partial light distribution pattern PA. This configuration can overlay the light beams emitted from the edges 51B of the LED light source 51 on the light beams emitted from other light emission area of the LED light source 51 than the edges 51B.

Accordingly, the light beams emitted from the edges 51B of the LED light source 51 can be mixed with the light beams emitted from the other light emission areas of the LED light source 51 than the edges 51B, thereby preventing or suppressing the chromatic unevenness of the light distribution pattern due to the chromatic unevenness due to the edges of the LED light source.

Headlamp Unit

Modified Example 4

Hereinafter, a description will be given of the modified example 4.

Figure 75:
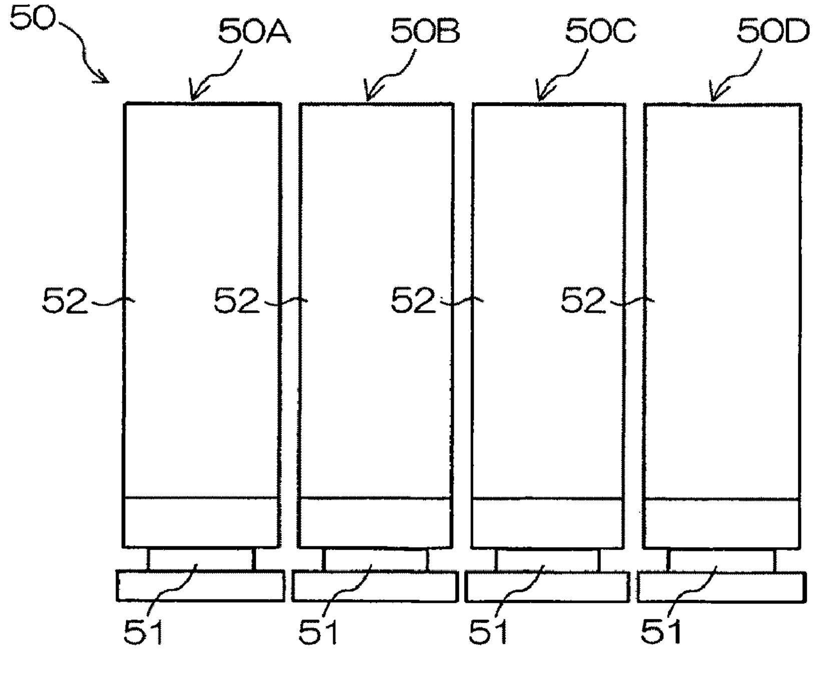
FIG. 75 is a front view illustrating a schematic configuration of a vehicle light made in accordance with the principles of the presently disclosed subject matter.

FIG. 75 is a front view of a headlamp 50 made in accordance with the principles of the presently disclosed subject matter. The headlamp 50 can be employed, for example, as a headlight for a low beam for use in an automobile, a motorcycle, and the like and can include a plurality of (four in the illustrated example) light source units (optical unit or headlamp unit) 50A, 50B, 50C, and 50D. Each light source unit can include an LED light source 51 and a lens body 52 serving as a light guide. The light source units 50A, 50B, 50C, and 50D can have the same basic configuration, but emit light beams with different light distribution sub-patterns. The illumination light beams emitted from the respective light source units 50A, 50B, 50C, and 50D through the light exiting surface of the lens body thereof can be overlaid over each other in part to form a required low beam light distribution pattern for the headlamp 50. The headlamp 50 has four light source units 50A to 50D horizontally arranged in line, but the presently subject matter is not limited to this arrangement. The arrangement and the number of the light source units may be appropriately selected according to the intended purposes and specification of the vehicle light.

FIG. 76 is a vertical cross sectional view illustrating the configuration of one of the light source unit (50A) of the headlamp 50. The light source unit 50A as shown in FIG. 76 can include a lens body 52 which is a light guide and is injection molded by a polycarbonate material being a high heat resistant, transparent resin, an LED light source 51, and other components (not shown).

The lens body 52 can have a bottom including a light incident surface 52*a*, a reflecting surface 52*c* which is arranged near the rear side of a vehicle body (in the rear portion of the headlamp), a light exiting surface 52*b* which is arranged near the front side of the vehicle body, and a top surface which is arranged on top of the lens body 52. The lens body 52 can be defined by these surfaces and not-shown side surfaces.

The light incident surface 52*a* can be a surface that receives light beams emitted from the LED light source 51 so that the light beams can enter the lens body 52 therethrough. In the illustrated example, the light incident surface 52*a* can be formed by a slightly inclined surface with respect to the horizontal plane (not shown) toward the rear side of the vehicle body. The remaining surfaces that constitute the bottom other than the light incident surface 52*a* can be formed by horizontal planes.

The reflecting surface 52*c* can be a surface that can reflect light beams from the LED light source 51 via the light incident surface 52*a* to a predetermined direction, and can be formed as, for example, a part of a revolved paraboloid or the like. The reflecting surface 52*c* can be formed of an inner surface with total reflection property or a reflecting film adhered to the outer surface of the transparent lens body 52 with the reflecting film formed from metal such as aluminum.

The light exiting surface 52*b* can be formed of a vertical plane that is perpendicular to the horizontal plane, and can be a surface through which the light beams reflected by the reflecting surface 52*c* can exit.

The LED light source 51 can be a light source having one or a plurality of LED chips in a single package to emit white light beams. The LED light source 51 can have a planar light emitting surface 50A facing upward in a substantially vertical direction. For example, the LED light source 51 can include an InGaN-based LED chip 200 that emits blue light beams as an LED chip, a circuit board 202 on which the LED chip 200 is mounted (see FIGS. 84A, 84B, and 84C), and a wavelength conversion layer 204 disposed on the LED chip 200. The wavelength conversion layer 204 can be prepared by dispersing, for example, well-known YAG phosphor in a silicone resin and applied it onto the chip. In this configuration, the blue light beams from the LED chip 200 and yellow light beams that are generated by wavelength converting the blue light beams by the YAG phosphor (yellow light beams containing red color component and green color component) can be mixed with each other to generate while light beams for output. The light emitting surface 51A is not limited to a planar shape, but may be convex.

Figure 84A:
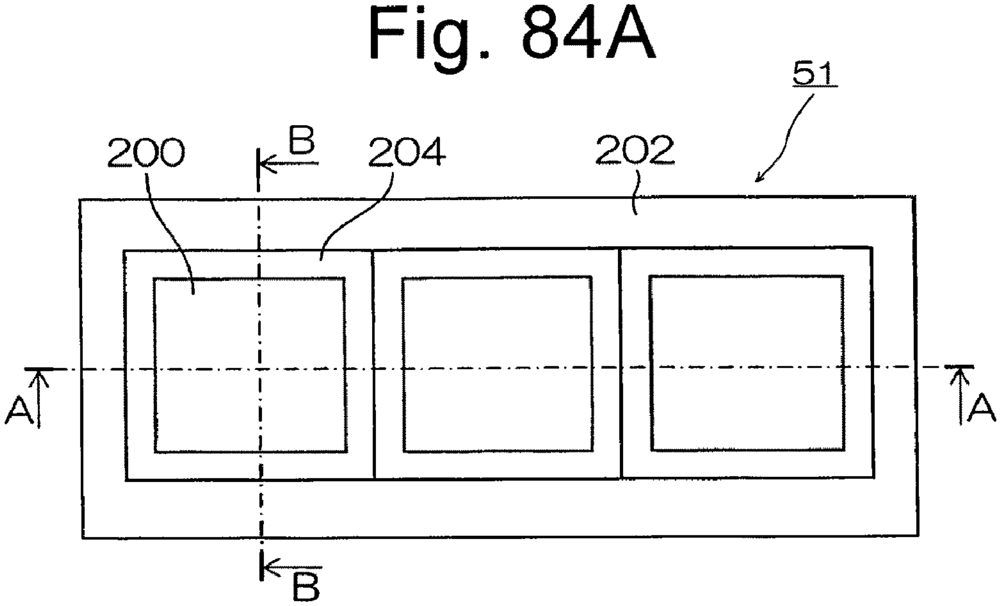
FIGS. 84A, 84B and 84C are a plan view, a cross sectional view taken along line B-B of FIG. 84A, and a cross sectional view taken along line A-A of FIG. 84A of the exemplary configuration of an LED light source, respectively.
Figure 84B:
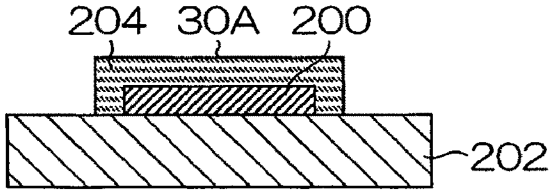
Figure 84C:
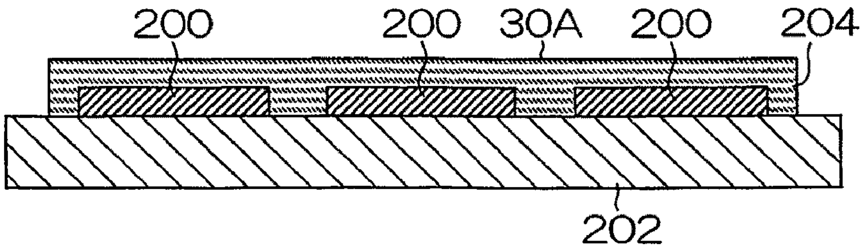

In FIGS. 84A, 84B, and 84C, the LED light source 51 can include three InGaN-based LED chips 200 arranged in line at predetermined intervals. Furthermore, the wavelength conversion layer 204 covers the LED chips 200 at their top surfaces and side surfaces in a rectangular shape while the top surface of the wavelength conversion layer 204 is formed in a flat shape, as shown in FIGS. 84B and 84C. In order to form the top surface of the wavelength conversion layer 204 with a flat shape, a liquid light-transmitting resin material containing the wavelength conversion material dispersed therein can be coated by printing or the like, followed by curing.

Figure 77:
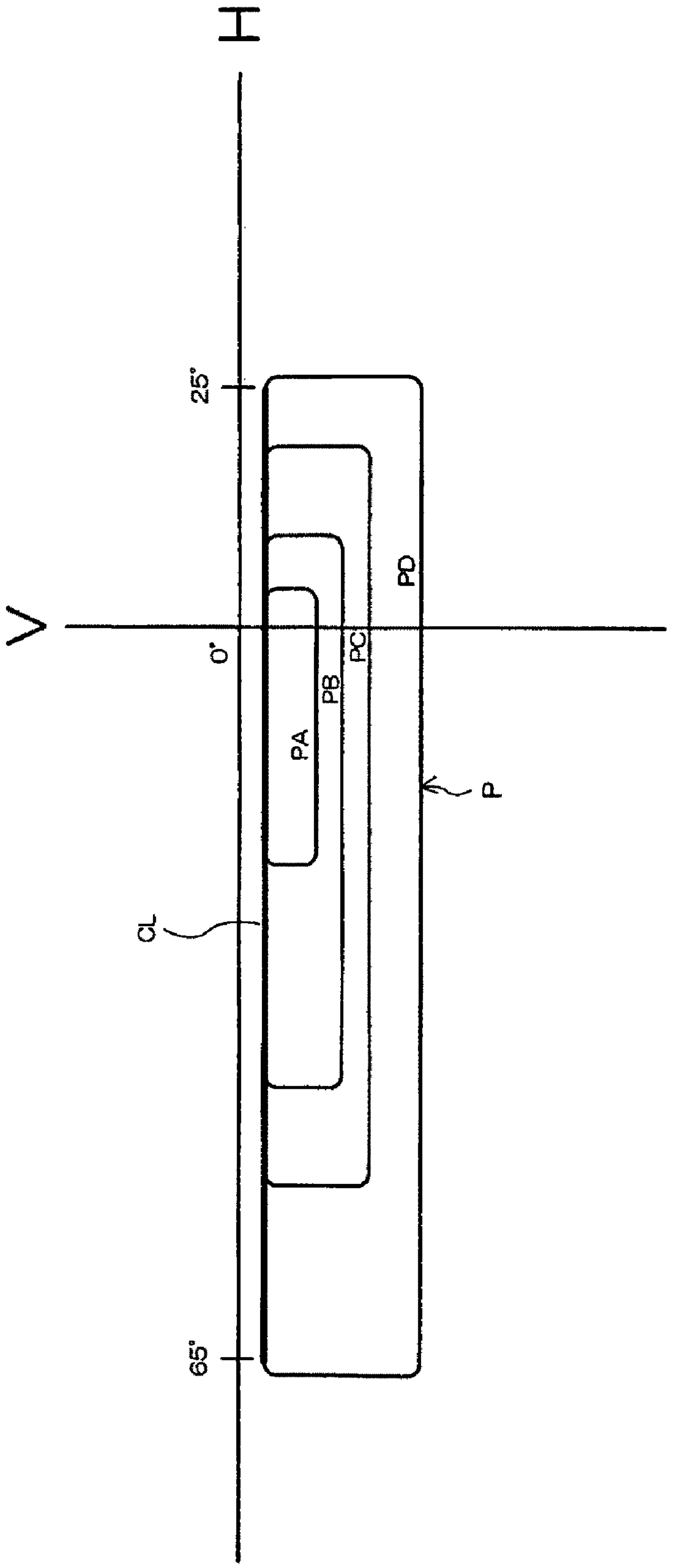
FIG. 77 is a diagram illustrating an example of a light distribution pattern formed by the vehicle light of FIG. 75.

The light source units 50B to 50D can have the same or similar configuration as or to that of the light source unit 50A. The headlamp 50 can be provided with these light source units 50A, 50B, 50C, and 50D, and the light beams emitted from these light source units 50A to 50D can be overlaid on each other, thereby forming a desired low beam light distribution pattern as shown in FIG. 77. The headlamp 50 of the presently disclosed subject matter can be a headlamp for an automobile for a left-side traffic system. When the headlamp 50 is installed in an automobile for a right-side traffic system, the arrangement of the components are horizontally reversed, thereby forming a desired light distribution pattern that is horizontally reversed.

FIG. 77 include an H line along which a horizontal angle with respect to the direction of the center front of the headlamp 50 (the standard direction) is shown. The H line can be the basis for the horizontal level of the headlamp 50. Furthermore, there is a V line along which a vertical angle is shown with respect to the standard direction, and the V line can show the center position in the right-to-left direction.

As shown in FIG. 77, the light distribution pattern P of the headlamp 50 can include a light distribution area within an angular range below the H line and wide in the right-to-left direction. Specifically, the light distribution area ranges to approximately 25 degrees to the right and approximately 65 degrees to the left from the V line, where the illumination light can be projected. The upper edge of the light distribution pattern P can include a bright/dark boundary line CL (or referred to also as a cut-off line) showing the boundary between the bright area where the light beams reach and the dark area where the light beams do not reach. The bright/dark boundary line CL is formed near the H line (for example, below by 0.57 degrees with respect to the H line).

As shown, the light distribution pattern P can be composed of a plurality of partial light distribution patterns (partial light distribution areas) PA to PD corresponding to the respective light source units 50A to 50D overlaid on each other. For example, the light source unit 50A can form the partial light distribution pattern PA for illuminating the narrow area near the center point of H-V lines (deviation degree from H and V lines=zero degrees). The light source units 50B and 50C can form the middle-size partial light distribution patterns PB and PC for illuminating the broader area than the partial light distribution pattern PA while overlapping with the partial light distribution pattern PA, respectively. The light source unit 50D can form the largest partial light distribution pattern PD covering the partial light distribution patterns PA, PB, and PC. It should be noted that the correspondences between the light source units 50A to 50D and the partial light distribution patterns PA to PD are not limited to the above example, as well as any desired light distribution pattern P can be formed in accordance with the intended use and specification of the headlamp 50. The number of the light source units is not limited to four, but may be two, three, or five or more.

The light source units 50A to 50D can be formed on the basis of the same or similar optical design scheme as each other. For example, the optical design scheme of the light source unit 50A can be achieved by the following. First, suppose the LED light source 51 emits white light beams from various portions of the light emitting surface 51A to various directions (where the white light beams can include light beams at visible wavelengths). In this case, the physical relationship of the LED light source 51 and the lens body 52 and the target illumination directions of the white light beams (target exiting directions when the white light beams exit from the lens body 52) can be determined so that the desired partial light distribution pattern PA can be formed as shown in FIG. 77. Then, the shapes of the light incident surface 52*b*, the reflecting surface 52*c*, and the light exiting surface 52*b* of the lens body 52 are set so that various directions of the white light beams emitted from the light emitting surface 51A coincide with the target illumination directions. In the present modified example, the reflecting surface 52*c* made of a partial revolved paraboloid can be set so that the image of the light emitting point 51B at the rearmost end of the light emitting surface 51A with respect to the front-to-rear direction of the vehicle body is enlarged and projected to the bright/dark boundary line CL, thereby forming the cut-off line. This setting is done because the setting of the rearmost end corresponding to the bright/dark boundary line CL can limit the light beams from the foremost end of the light emitting surface 51A so that the light beams from the foremost end of the light emitting surface 51A are directed downward with respect to the bright/dark boundary line CL, thereby preventing the generation of upward glare light above the H line.

The refracting angle at the light incident surface 52*a* and the light exiting surface 552*b* with respect to the incident angle can be determined by a refractive index corresponding to the material employed for forming the lens body 52. This value is used during the optical designing. If the refractive index can vary depending on the wavelengths of light beams, a refractive index at a particular standard wavelength (hereinafter, referred to as a standard refractive index) can be used as an approximation which is assumed as a constant refractive index over the entire wavelengths of white light (visible range). In the present modified example, the optical design scheme can be achieved by adopting the wavelength of green color, which is an approximate center wavelength of white light, as a standard wavelength, and the refractive index at the wavelength of green color as a standard refractive index, and assuming that the standard refractive index is constant over the entire wavelengths of white light. Based on these settings, the light incident surface 52*a*, the reflecting surface 52*c*, and the light exiting surface 52*b* of the lens body 52 can be designed in shape and the like so as to provide the partial light distribution pattern PA as shown in FIG. 77.

Figure 78:
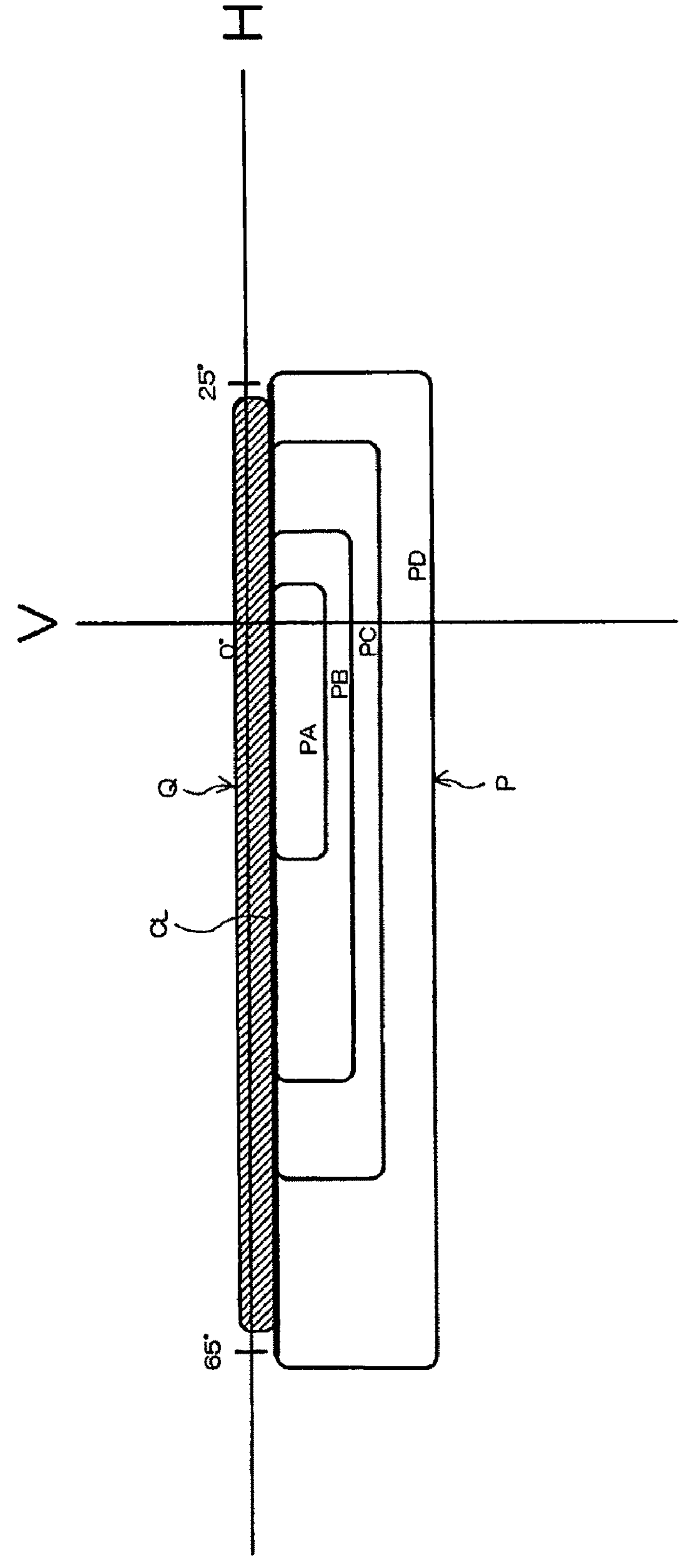
FIG. 78 is a diagram illustrating a color blurring occurring at and near the bright/dark boundary line generated by a conventional vehicle light with an unintentional color separation area formed above the bright/dark boundary line.

When the lens body 52 is formed of a transparent resin material as in the modified example 4, the refractive index thereof may vary at various wavelengths more than that of glass lens formed of an inorganic material. In particular, a polycarbonate material having superior transparency, heat resistance and weather resistance has a refractive index which can significantly vary at various wavelengths and generate large chromatic dispersion. In this case, if the optical design scheme is determined to provide the desired partial light distribution pattern PA shown in FIG. 77 with the assumed standard refractive index, an unintended illumination area with color separation (being a color blurring area) may be adversely formed above the bright/dark boundary line CL of the partial light distribution pattern PA. This phenomenon can also occur in the case of optical designing of the other light source unites 50B to 50D. In this case, the unintended, color-separated illumination area Q may be formed as a whole above the bright/dark boundary line CL of the light distribution pattern P of the headlamp 50, as shown in FIG. 78. It should be noted that the chromatic dispersion means the dispersion of light of which phenomenon can occur for a material having various refractive indices depending on wavelengths of incident light beams.

In general, the lens body 52 can enlarge and project the image of the light emitting surface 51A of the LED light source 51 to provide the partial light distribution pattern PA on a virtual plane as shown in FIG. 77. Suppose a case where the optical designing is performed by adopting a constant standard refractive index over the entire wavelengths of white light beams without considering the chromatic dispersion by the lens body 52 so as to provide the partial light distribution pattern PA of FIG. 77. In this case, the physical relationship between the light emitting surface 51A of the LED light source 51 and the lens body 52 can be determined so that the light emitting point 51B at the rearmost end of the light emitting surface 51A is positioned at the focus of the entire lens body 52. It should be noted that "the focus of the entire lens body 52" shall mean the focal position controlled while taking into consideration the effect of refraction by the light incident surface 52*a* with respect to the focal position of the revolved paraboloid reflecting surface 52*c*. In this case, white light beams emitted from the light emitting point 51B in various directions should exit to the target bright/dark boundary line CL by a certain vertical angle while being collimated. Then, the optical designing is performed such that white light beams emitted from other light emitting points than the point 51B (points closer to the front side than the point 51B) of the light emitting surface 51A should exit to the angular range below the certain vertical angle from the target bright/dark boundary line CL.

In the above-mentioned optical design scheme, suppose the case where the actual chromatic dispersion occurring in the lens body 52 is taken into consideration. The white light beams emitted from the light emitting point 51B may contain light beams that pass through the light incident surface 52*a* and the light exiting surface 52*b* along an optical path without refraction at both the surfaces 52*a* and 52*b* (non-refractive optical path). These light beams can be projected to the target bright/dark boundary line CL by a certain vertical angle. The white light beams may contain light beams that pass through the light incident surface 52*a* and the light exiting surface 52*b* along an optical path with refraction at either the surface 52*a* or 52*b* (refractive optical path). In this case, the light beams other than the green light beams with the standard refractive index, namely, red and blue light beams with longer or shorter wavelength than the standard wavelength may be separated from the green light beams because of different refractive indices from the standard refractive index (in the case of green light beams). The separated light beams may be directed in different directions from that of the green light beams at the surface where the refraction of the lens body 52 occurs. As a result, part of the red or blue light beams may be projected to the upper area than the target bright/dark boundary line CL by an upward angle, thereby generating a color blurring area above the target bright/dark boundary line CL. Accordingly, the unintended illumination area Q can be formed above the target bright/dark boundary line CL as shown in FIG. 78. This illumination area Q may hinder the formation of the uniform chromaticity of the light distribution pattern (namely, can generate chromatic unevenness) as well as may generate upward light beams above the H line.

In view of the conventional optical design scheme where the optical designing is performed by adopting a constant standard refractive index with respect to the entire wavelengths of white light beams without considering the chromatic dispersion by the lens body 52, the presently disclosed subject matter in the present modified example 4 can provide an adjustment (correction) by taking the chromatic dispersion of lens body 52 with regard to white light beams emitted from the light emitting point 51B of the light emitting surface 51A (or the variation in refractive index wavelength by wavelength) into consideration. Specifically, the physical relationship between the LED light source 51 and the lens body 52 that constitute the basic structure of the light source unit 50A and the structure of the lens body 52 (the shape and the like of the light incident surface 52*a*, the reflecting surface 52*c*, and the light exiting surface 52*b*) can be adjusted (corrected) so that the color blurring (namely, the unintended illumination area Q) is prevented from being generated above the bright/dark boundary line CL.

For example, the polycarbonate material has an optical property that the longer the wavelength is within the wavelength range of approx. 380 nm to approx. 780 nm being the wavelengths of white light beams (visible range), the smaller refractive index is observed. For example, the polycarbonate material shows the refractive indices of 1.6115, 1.5855, and 1.576 at the wavelengths of 435.8 nm (blue), 546.1 nm (green), and 706.5 nm (red), respectively. In this case, if the standard shape for the light incident surface 52*a*, the reflecting surface 52*c*, and the light exiting surface 52*b* of the lens body 52 is designed, the standard wavelength at 546.1 nm for green light beams is employed as well as the standard refractive index of 1.5855 is set. Furthermore, to cope with the chromaticity dispersion by the lens body 52, the red light beams at 706.5 nm and the blue light beams at 435.8 nm can be considered as the longest wavelength and the shortest wavelength, respectively. Based on these light beams at the respective wavelengths, the light incident surface 52*a*, the reflecting surface 52*c*, and the light exiting surface 52*b* of the lens body 52 can be adjusted from the standard shape. It should be noted that these specific wavelengths may be changed according to the intended use, specification, material properties, and the like.

It should be noted that in the present modified example 4 the adjustment (correction) is made only on the reflecting surface 52*c*, but the light incident surface 52*a* and the light exiting surface 52*b* remain to have the standard shape (flat plane) (that has been designed with the standard refractive index) assuming that the standard refractive index is applied to obtain the partial light distribution pattern PA of FIG. 77. In this case, accordingly, the reflecting surface 52*c* can be adjusted (corrected) by adjusting the basic revolved paraboloid.

Further, the light exiting surface 52*b* of the lens body 52 in the present modified example 4 can be formed of a substantially vertical flat plane as described above, and the chromatic dispersion may not occur or may scarcely occur due to the horizontally collimated exiting light beams that have been reflected by the reflecting surface 52*c* through the light exiting surface 52*b* toward the target bright/dark boundary line CL. Accordingly, in order to facilitate the understanding, it is assumed that the chromatic dispersion and color separation cannot occur by the light exiting surface 52*b* and the directions of light beams exiting through the light exiting surface 52*b* coincide with the directions of light beams reflected by the reflecting surface 52*c*.

Hereinafter, a description will be given of how the adjustment (correction) of the shape of the lens body 52 is done. The lens body 52 of FIG. 76 can be configured by adjusting (correcting) the shape of the reflecting surface 52*c* of the lens body 52 while taking the chromatic dispersion due to the varied reflective indices depending on respective wavelengths into consideration, so that the color blurring (unintended illumination area Q) is prevented from being generated above the bright/dark boundary line CL. In FIG. 776, optical paths as determined by using the basic refractive index (the optical paths when the constant basic refractive index at entire wavelengths of white light beams is used) are shown by solid lines. Specifically, the white light beams emitted from the light emitting point 51B of the LED light source 51 include white light beams X1 that are perpendicularly incident on the light incident surface 52*a* (incident angle=0 degrees) and white light beams X2 and X3 that are incident on the light incident surface 52*a* obliquely on the front side and rear side with respect to the white light beams X1, and the white light beams X1, X2, and X3 travel along the respective optical paths of solid line. As shown in FIG. 76, the white light beams X1, X2, and X3 emitted from the light emitting point 51B of the LED light source 51 can enter the lens body 52 through the light incident surface 52*a*, be reflected by the reflecting surface 52*c*, and then exit from the lens body 52 through the light exiting surface 52*b*. FIG. 76 also shows other optical paths CLD1, CLD2, and CLD3 as determined by using the constant standard refractive index over the entire wavelengths of white light beams without considering the chromatic dispersion. The other optical paths CLD1, CLD2, and CLD3 are shown by dot and dash lines. CLD1 is the same optical path as X1 and along CLD2 and CLD3 the collimated light beams parallel to the CLD1 are projected to the outside through the light exiting surface 52*b*. The optical paths CLD1, CLD2, and CLD3 can be obtained by the reflecting surface 52*c* formed of a revolved paraboloid having a focus at or near the light emitting point 51B (strictly speaking, the focus can be positioned at a position slightly leftward and downward in the drawing with respect to the light emitting point 51B when taking the refraction by the light incident surface 52*a* into consideration). This shape is referred to as a basic shape. The optical paths CLD1, CLD2, and CLD3 indicated by the dot and dash lines are those through which white light beams X1, X2, and X3 are projected through the light exiting surface 52*b* toward the target bright/dark boundary line CL in a certain angular direction. As noted above, the light beams to the bright/dark boundary line CL are not refracted at the light exiting surface 52*b*, and accordingly, the optical paths CLD1, CLD2, and CLD3 are indicated by the dot and dash straight lines from the reflecting surface 52*c* through the light exiting surface 52*b* to the outside of the lens body 52.

In the lens body 52 of the present modified example 4, the shape of the reflecting surface 52*c* has been designed by taking the chromatic dispersion into consideration. In this case, as the white light beams X1 can be incident on the light incident surface 52*a* perpendicularly without refraction by the light incident surface 52*a* and the light exiting surface 52*b* of the lens body 52. Accordingly, the target direction is set to the same angular direction toward the target bright/dark boundary line CL. The shape of the reflecting surface 52*c* can be designed to be matched to the basic shape (position and gradient) so that the white light beams X1 incident on the reflecting surface 52*c* at the position T1 can be reflected by a certain angle toward the bright/dark boundary line CL along the optical path CLD1. It should be noted that the light incident surface 52*a* can be adjusted in terms of inclination angle so that the position T1 (where the white light beams X1 that are not subjected to refraction at the light incident surface 52*a* can be reflected by the reflecting surface 52*c*) can be disposed at substantially vertical center of the reflecting surface 52*c*. By doing so, the incident angles (refraction angle) of the light beams (which are all reflected by the reflecting surface 52*c*) at the light incident surface 52*a* can be set as small as possible, thereby suppressing the occurrence of the chromatic dispersion. Furthermore, the non-refractive optical path (the light beams can be incident on the light incident surface 52*a* without refraction) can include the position T1 which is the same or similar to the basic shape.

On the other hand, the white light beams X2 and X3 which are subjected to refraction at the light incident surface 52*a* can be incident on the light incident surface 52*a* forward or rearward with respect to the white light beams X1. The white light beams X2 and X3 can be controlled to be directed in a lower angular direction than that toward the target bright/dark boundary line CL depending on the magnitude of the chromatic dispersion (color separation) by that refraction. Then, the reflecting surface 52*c* at the upper and lower positions T2 and T3 than the position T1 can be designed such that the white light beams X2 and X3 entering the lens body 52 can be reflected by the reflecting surface 52*c* at the respective positions T2 and T2 to be projected in a lower angular direction than the angular direction of the bright/dark boundary line CL (being the optical paths CLD2 and CLD3).

As one example of the method for designing the reflecting surface 52*c* of the present modified example 4 by correcting the reflecting surface 52*c* with the standard shape, there is an exemplary method in which the position T1 that is not corrected and has the same basic shape is allowed to serve as a reference point, and the points on the reflecting surface above the reference point are sequentially corrected as a corrected point. In this case, one point of plural points can be corrected such that the reflecting surface 52*c* has an inclination by which the surface can reflect white light beams to the target illumination direction as corrected. Then, the determined inclination is applied to the area of the reflecting surface 52*c* upper than that point, thereby correcting the upper area with a corrected inclination without the necessity of entire correction. Then, another further upper point can be corrected in the same way as above to correct that point as well as the upper area with a corrected inclination. This process is repeated until the end portion of the reflecting surface 52*c*. The lower area than the position T1 can be corrected by repeating the above process, although the presently disclosed subject matter for designing the reflecting surface 52*c* in the present modified example 4 is not limited to this.

Specifically, a description will be given of how the white light beams X1, X2, and X3 emitted from the light emitting point 51B of the LED light source 51 can be projected through the lens body 52 if the shape of the reflecting surface 52*c* is designed by taking the chromatic dispersion into consideration as in the present modified example 4.

The white light beams X1 can be perpendicularly incident on the light incident surface 552*a* where they are not subjected to refraction. Accordingly, while no chromatic dispersion (color separation) occurs, the white light beams X1 travel inside the lens body 52 to impinge on the reflecting surface 52*c* at the position T1. The white light beams X1 incident on the reflecting surface 52*c* can be reflected in a direction along the optical path CLD1 to be projected through the light exiting surface 52*b* in the angular direction of the target bright/dark boundary line CL. Namely, the optical paths of the white light beams X1, X2, and X3 are the examples when the refractive index is assumed to be a constant standard refractive index at the entire wavelengths of the white light beams. As mentioned above, the refractive index for green light beams is used as the standard refractive index. Accordingly, the green light beams G1 contained in the white light beams X1 can pass the same optical path as the white light beams X1 with or without the refraction and can be projected in the target angular direction of the bright-dark boundary line CL. Furthermore, the red and blue light beams other than green light beams contained in the white light beams X1 can pass the same optical path as the white light beams X1 because there are no refraction at the light incident surface 52*a* (and light exiting surface 52*b*) and no color separation. Then, the red and blue light beams can be projected in the target angular direction of the bright-dark boundary line CL. By this configuration, the white light beams X1 that are emitted from the light emitting point 51B and perpendicularly incident on the light incident surface 52*a* can be projected in the angular direction of the target bright/dark boundary line CL while the light beams can remain white, thereby forming the bright/dark boundary line CL.

The white light beams X2 that are obliquely incident on the light incident surface 52*a* near the front side may be subjected to refraction, thereby generating chromaticity dispersion and then color separation within the lens body 52. In this case, the green light beams G2 contained in the white light beams X2 can impinge on the position T2 of the reflecting surface 52*c* while passing the same optical path as the white light beam X2 that has been determined with the constant standard refractive index. Then, the green light beams G2 can be reflected by the reflecting surface 52*c* in a lower angular direction than the optical path CLD2 to be projected in a lower angular direction than the target angular direction of the bright-dark boundary line CL.

On the other hand, the red light beams R2 contained in the white light beams X2 are represented by a dotted line disposed in the upper area in FIG. 76, and the refractive index at the red color wavelengths is smaller than the standard refractive index (being the refractive index at the green color wavelengths). Accordingly, the red light beams R2 can be refracted by a smaller refraction angle than that for the green light beams G2 at the light incident surface 52*a*, travel through an optical path closer to the front side than the optical path of the white light beams X2 (optical path of the green light beams G2), and then impinge on the upper position near the position T2 of the reflecting surface 52*c*. In this case, the red light beams R2 can be incident on the reflecting surface 52*c* by a larger incident angle than the white light beams X2 (green light beams G2). Thereby, the red light beams R2 may be reflected in an upper angular direction than the white light beams X2 (green light beams G2). In this case, according to the presently disclosed subject matter, the reflecting surface 52*c* at and near the upper position T2 can be designed such that the red light beam R2 cannot be projected in an upper angular direction than the target angular direction of the bright/dark boundary line CL while taking how the red light beams R2 are reflected by a limited upper angular direction with respect to the white light beams X2 (green light beams G2) into consideration. Accordingly, the red light beams R2 can be reflected by the reflecting surface 52*c* in an angular direction almost along the optical path CLD2 (directed to the bright/dark boundary line) or a lower angular direction than the optical path CLD2. By doing so, the red light beams R2 can be projected through the light exiting surface 52*b* in an angular direction not above the target bright/dark boundary line CL.

Although the drawings do not illustrate optical paths for the blue light beams contained in the white light beams X2, the same phenomenon occurs. Namely, the blue light beams can be refracted by a different refractive angle and separated at the light incident surface 52*a* and travel through a different optical path from the white light beams X2 (green light beams G2). In this case, however, the blue light beams can be projected through the light exiting surface 52*b* in a lower angular direction than the white light beams X2 (green light beams G2) in the opposite direction from the red light beam R2. By setting the reflecting surface 52*c* so that the red light beams R2 can be projected in the certain angular direction equal to or lower than the target bright-dark boundary line CL, the blue light beams can be consequently projected in an angular direction sufficiently lower than the target bright-dark boundary line CL.

The white light beams X3 that are obliquely incident on the light incident surface 52*a* near the rear side may be subjected to refraction, thereby generating chromaticity dispersion and then color separation within the lens body 52. In this case, the green light beams G3 contained in the white light beams X3 can impinge on the position T3 of the reflecting surface 52*c* while passing the same optical path as the white light beam X3 that has been determined with the constant standard refractive index. Then, the green light beams G3 can be reflected by the reflecting surface 52*c* in a lower angular direction than the optical path CLD3 so as to be projected in a lower angular direction than the target angular direction of the bright-dark boundary line CL.

On the other hand, the blue light beams B3 contained in the white light beams X3 are represented by a dotted line in FIG. 76, and the refractive index at the blue color wavelengths is larger than the standard refractive index (being the refractive index at the green color wavelengths). Accordingly, the blue light beams B3 can be refracted by a larger refraction angle than that for the green light beams G3 at the light incident surface 52*a*, travel through an optical path closer to the front side than the optical path of the white light beams X3 (optical path of the green light beams G3), and then impinge near the position T3 of the reflecting surface 52*c* (on the upper position adjacent to the position T3). In this case, the blue light beams B3 can be incident on the reflecting surface 52*c* by a larger incident angle than the white light beams X3 (green light beams G3). Thereby, the blue light beams B3 may be reflected in an upper angular direction than the white light beams X3 (green light beams G3). In this case, according to the present modified example, the reflecting surface 52*c* at and near the lower position T3 can be designed such that the blue light beam B3 cannot be projected in an upper angular direction than the target angular direction of the bright/dark boundary line CL while taking how the blue light beams B3 are reflected by a limited upper angular direction with respect to the white light beams X3 (green light beams G3). Accordingly, the blue light beams B3 can be reflected by the reflecting surface 52*c* in an angular direction almost along the optical path CLD3 (directed to the bright/dark boundary line) or a lower angular direction than the optical path CLD3. By doing so, the blue light beams B3 can be projected through the light exiting surface 52*b* in an angular direction not above the target bright-dark boundary line CL.

Although the drawings do not illustrate optical paths for the red light beams contained in the white light beams X3, where the same phenomenon occurs. Namely, the red light beams can be refracted by a different refractive angle and separated at the light incident surface 52*a* and travel through a different optical path from the white light beams X3 (green light beams G3). In this case, however, the red light beams can be projected through the light exiting surface 52*b* in a lower angular direction than the white light beams X3 (green light beams G3) in the opposite direction from the blue light beam B3. By setting the reflecting surface 52*c* so that the blue light beams B3 can be projected in the angular direction equal to or lower than the target bright/dark boundary line CL, the red light beams can be consequently projected in an angular direction sufficiently lower than the target bright/dark boundary line CL.

As described above, the light source unit 50A according to the present modified example 4 can include the LED light source 51 that emit white light beams. Among the white light beams from the light emitting point 51B of the LED light source 51, light beams just like the white light beams X1 that can pass through the non-refractive optical path where the chromatic dispersion (color separation) cannot occur without refraction can be projected in the angular direction to the bright/dark boundary line CL, thereby being capable of forming the clear bright/dark boundary line CL. By forming the bright/dark boundary line CL with the white light beams X1, the chromaticity of the bright-dark boundary line CL can be held within the range of white.

On the other hand, as described above, the white light beams include the white light beams X2 and X3 that pass through the refractive optical path where the chromatic dispersion may occur due to the refraction. In this case, the target illumination directions that have been determined with the constant standard refractive index at the entire wavelengths of the white light beams can be set to the lower angular direction than the bright-dark boundary line CL. Accordingly, the red and blue light beams to be projected in the upper angular direction than the green light beams due to the chromaticity dispersion can be projected in the direction toward the bright/dark boundary line CL or in an angular direction lower than the direction to the bright/dark boundary line CL. Namely, the light beams at the wavelengths where the color separation occurs can be projected to the partial light distribution pattern PA on the lower side of the bright/dark boundary line CL and be mixed with other illumination light from light emitting points other than the light emitting point 51B in the light distribution pattern. Accordingly, any problem due to the chromatic dispersion, such as the unintended illumination area Q formed above the bright/dark boundary line CL, can be prevented, thereby suppressing chromatic unevenness of illumination light.

In the above description, the light beams emitted from the light emitting point 51B of the LED light source 51 have been discussed mainly. However, needless to say, the white light beams emitted from other points near the light emitting point 51B (closer to the front side) can generate red and blue light beams upward than green light beams contained therein due to the chromatic dispersion. As discussed above, however, the shape of the reflecting surface 51*c* can be corrected in accordance with the above described manner, thereby being capable of projecting these light beams to the lower area than the bright/dark boundary line CL. Accordingly, the problem where the unintended illumination area Q is generated due to the chromatic unevenness can be resolved. Furthermore, the light beams that are emitted from the adjacent light emitting points near the light emitting point 51B and subjected to color separation may not be concentrated at a certain point with the same color light beams while being spread to a certain degree to be mixed with other light beams from the other light emitting points. This can suppress the chromatic unevenness of illumination light within the partial light distribution pattern PA.

Herein, the chromatic dispersion by the lens body 52 can be generated by the white light beams that are emitted from the light emitting points 51B and the like and be incident on the light incident surface 52*a* by a certain incident angle to pass through the refractive optical path. In this case, the light beams at various wavelengths by color separation due to the chromatic dispersion may be projected in various directions through the light exiting surface 52*b*. In principle, in the present modified example 4, the white light beams passing through optical paths for directing the light to the area other than the edge area of the partial light distribution pattern PA can be mixed with other light beams from other light emitting points, thereby suppressing the generation of the chromatic unevenness of the mixed illumination light even when the color separation occurs.

On the other hand, like white light beams passing through the refractive optical path to the direction of the upper edge area of the partial light distribution pattern PA, or on or near the bright/dark boundary line CL, the white light beams that pass through the refractive optical path to the direction near the right edge, left edge and lower edge of the partial light distribution pattern PA may be color separated during the passing through the refractive optical path. In this case, it may be possible that part of light beams color separated with a particular wavelength range (for example, red light, blue light, or mixed light thereof) can be projected outside the edges, thereby generating color blurring.

In order to cope with this problem, the light beams projected outside the edges can be corrected in a similar manner to the light beams to be projected on the bright/dark boundary line CL so that the light beams color separated at entire wavelengths can be projected within the target partial light distribution pattern PA. This can be done by correcting the reflecting surface 52*c* from its basic shape, thereby directing the color separated light beams onto other light beams within the target partial light distribution pattern PA. Accordingly, the color blurring near the edges can be prevented, thereby suppressing the chromatic unevenness of the illumination light.

It should be noted that the color separated light beams to be projected on the boundary portion of the partial light distribution pattern PA including the bright/dark boundary line CL can be projected not only within the partial light distribution pattern PA, but also to other area within the other partial light distribution patterns, thereby suppressing the chromatic unevenness of the entire illumination light effectively. The color separated light beams can be used to enhance the whiteness of illumination light beams in a certain illumination area, thereby further effectively suppressing the color shading of the illumination light. Needless to say, the color separated light beams at various wavelengths can be directed to areas where the other light source units 50B to 50D project white brighter light beams.

The bright/dark boundary line CL can be formed by the LED light source having wavelength conversion materials, and since the light flux emitted from an LED chip may not be shielded, the light utilization efficiency (energy utilization efficiency) can be enhanced. Accordingly, such a vehicle light utilizing an LED light source 51 for forming the bright/dark boundary line CL for a low beam light distribution pattern near the H line can be obtained. For example, the LED light source 51 of FIG. 84 can include a wavelength conversion layer at the edge of the LED chip, and accordingly, the chromatic unevenness may be easy to occur at the edge of the LED light source 51 than at the center portion thereof. Since the lens body 52 can enlarge and project the image of the LED light source 51, the chromatic unevenness of the LED light source 51 may be projected to the bright/dark boundary line CL, which should be resolved. In the present modified example 4, however, since the lens body 52 is designed to cope with the color dispersion problem with regard to the bright/dark boundary line CL as described above, even when the color shading occurs at the edges of the LED light source 30, such color shading can be suppressed.

Namely, the light beams emitted from the light emitting point 51B as shown in FIG. 75 can be directed from the direction of the bright/dark boundary line CL to the lower side, i.e., the inner area of the partial light distribution pattern PA while being spread (due to the light spread by the color separation and the reflection at various points of the reflecting surface 52*c* to the wider exiting direction). The light beams emitted from the light emitting point 51B and other points of the LED light source 51 can be mixed with each other at various points, thereby suppressing the chromatic unevenness of illumination light due to the chromatic dispersion of the lens body 52 in addition to the chromatic unevenness of illumination light caused by the chromatic unevenness at the edges of the LED light source 51. In such a way, the present modified example 4 can prevent the chromatic unevenness of the illumination light of the headlamp 50, and accordingly, the selection freedom of light sources for used in the headlamp 50 can be widened because the limitation for the LED light source 51 has been relaxed. This means the quality control for the chromatic unevenness occurring due to mass production of light sources can be widened in quality determination. The shape of the reflecting surface 52*c* can be corrected from the basic shape in order to prevent the occurrence of color blurring (chromatic unevenness) due to the chromatic dispersion of the lens body 52 with regard to the boundary areas at left, right and lower edges of the partial light distribution pattern PA, as in the case where the light beams are corrected and projected onto the bright/dark boundary line CL. Accordingly, the chromatic unevenness of illumination light due to the chromatic unevenness at the edges of the LED light source 51 around the boundary areas can be suppressed.

In order to facilitate the explanation, it is described that the white light beams X1 reflected at the position T1 can travel along the non-refractive optical path in the previous modified example. Herein, the term "non-refractive optical path" may mean the optical path through which light beams cannot be subjected to refraction, as the narrowest sense. However, in some cases there is a necessity that the refraction at the light exiting surface 52*b* should be taken into consideration. Accordingly, the term "non-refractive optical path" herein shall mean the optical path that serves as a standard with small refraction in which the chromatic dispersion needs not be taken into consideration, as the broader definition.

Figure 80:
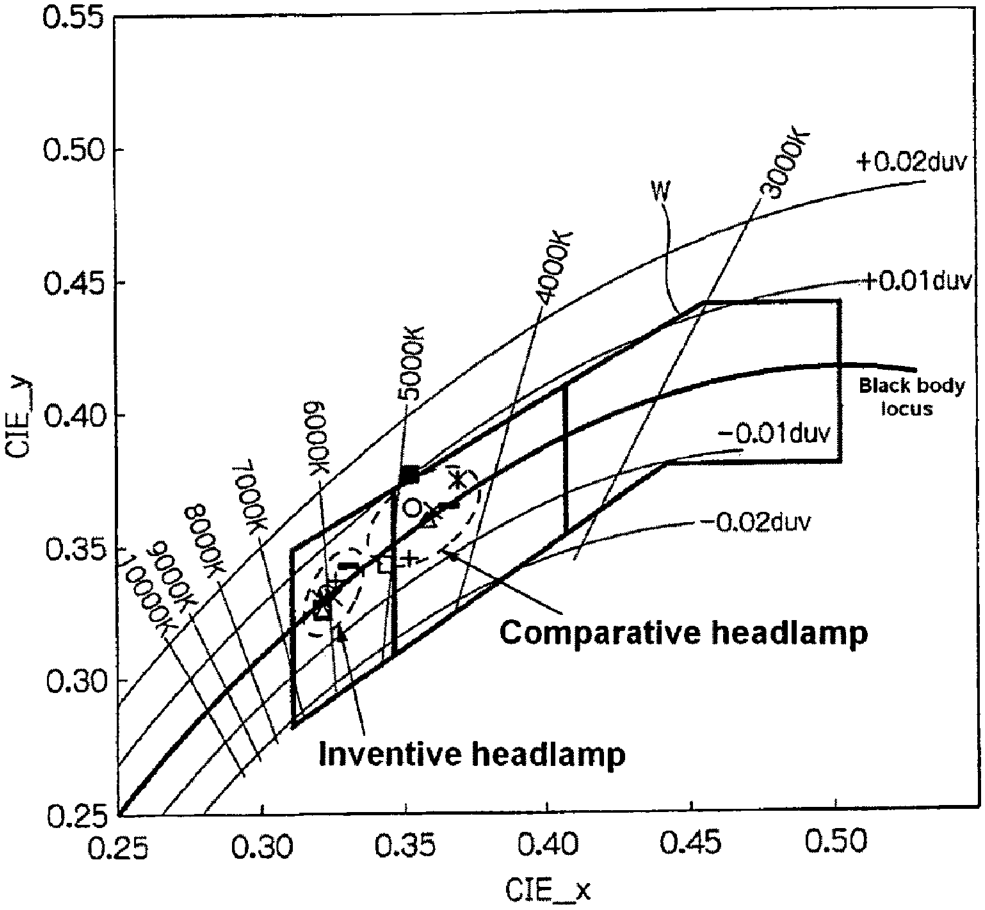
FIG. 80 is a chromaticity diagram in accordance with CIE color system, illustrating the chromaticity distribution based on the measured values listed in the table of FIG. 79.
Figure 81:
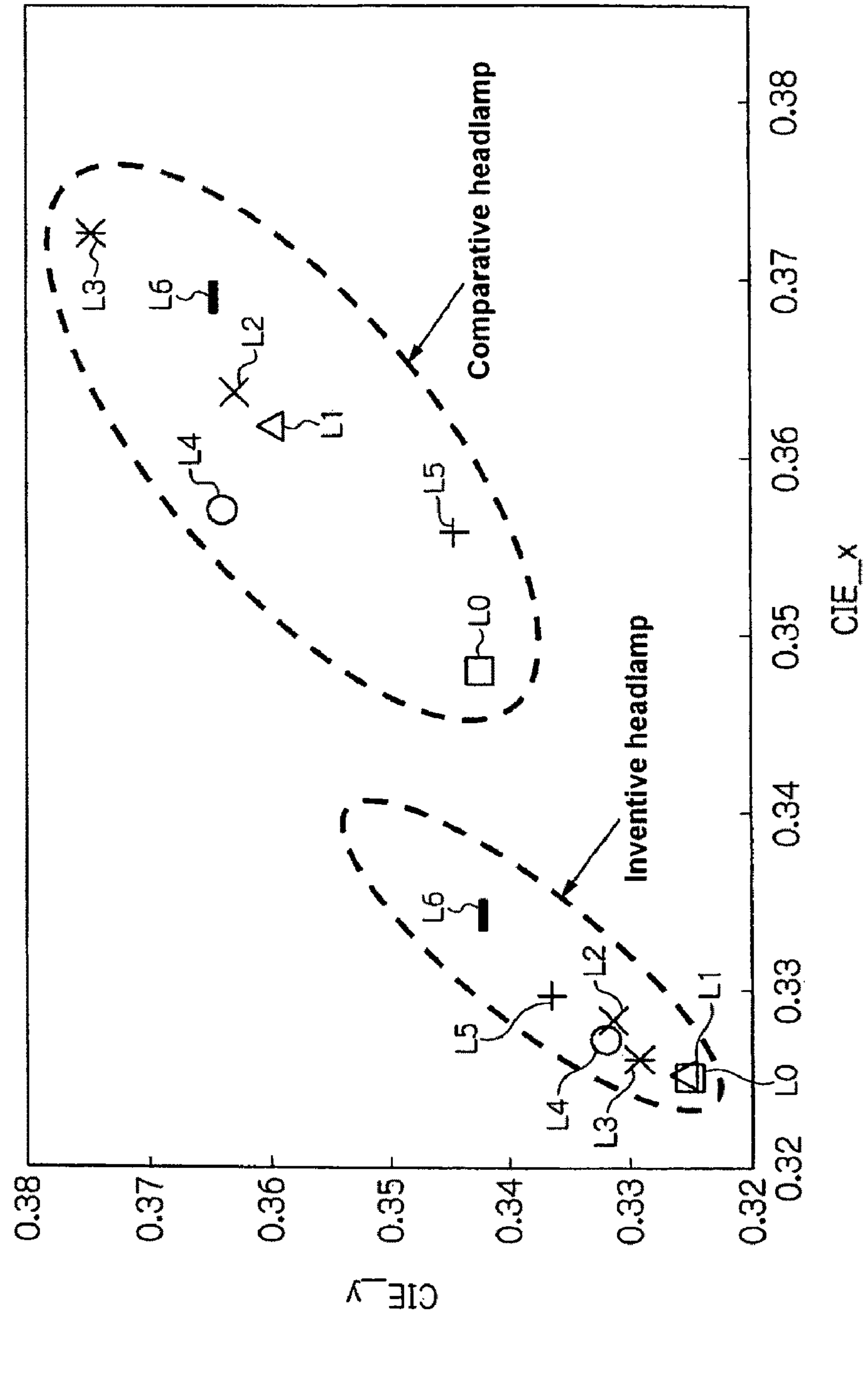
FIG. 81 is an enlarged view of part of the chromaticity diagram of FIG. 80.

FIG. 79 is a table indicating the measured values of chromaticity and intensity of light beams at different positions of the light distribution pattern P of the headlamp 50 of FIG. 76 composed of the light source units 50A to 50D. Specifically, the measurement was carried out at six points of L0 to L6 from 0 degrees to 30 degrees in the left direction from the V line by 5 degrees in the horizontal direction while the vertical angular direction was fixed at 1 degree lower from the H line. FIGS. 80 and 81 show values represented by CIE color system that the measured chromaticity values are converted into. Herein, the x and y representing the chromaticity shall mean the values represented by CIE color system. FIGS. 79 to 81 include data with regard to the headlamp 50 of the present modified example 4 (hereinafter, referred to as the inventive headlamp) as well as a comparative headlamp (low-beam projector type headlamp) utilizing an HID bulb (metal halide discharge light) as a light source.

The LED light source 51 of the present modified example 4 utilized a light source having average values of x=0.3179 and y=0.3255 (corresponding to that having a color temperature of 6248K) though the actual chromaticity characteristics may slightly vary at various light emitting points. On the other hand, the comparative headlamp utilized an HID light source having average values of x=0.3362 and y=0.3509 (corresponding to that having a color temperature of 5346K).

Although the chromaticity of the LED light source 51 of the present modified example 4 was different from that of the HID light source of the comparative headlamp, and accordingly the chromaticity of illumination light was different from each other, they satisfied the requirement of the statutory standard chromaticity range as determined as white illumination light, as shown in FIG. 80.

In FIG. 79, the listed light intensity (unit: cd) was measured at the measured points L0 to L6 within the range of 0 to 30 degrees in the left direction in the light distribution pattern, and the listed values were relative value (%) with respect to the maximum light intensity among these measured points L0 to L6. As shown, the headlamp 50 of the present modified example 4 shows the light intensities (within the above range) up to at the measured point L6 (at 30 degrees leftward) of 20% or more with respect to the maximum light intensity value at the measured point L1 (at 5 degrees leftward) whereas the comparative headlamp shows the light intensities of 3.6% at the measured point L6. This shows the inventive headlamp can illuminate brighter and wider than the comparative headlamp. Not shown in FIG. 79, the headlamp 50 of the present modified example 4 could show the light intensity of approx. 500 cd at the 65 degrees point leftward.

As to the chromaticity, FIGS. 80 and 81 show the comparison between the headlamp 50 of the present modified example 4 and the comparative headlamp at the respective measured points L0 to L6 on the chromaticity diagram. As shown, the variation in chromaticity of illumination light of the headlamp 50 of the present modified example 4 is smaller than that of the comparative headlamp. In terms of the numerical values of the chromaticity x and y, the difference between the maximum value and the minimum value (variation) at from the measured point L0 (H=0 degrees) to the measured point L6 (H=60 degrees) is $\Delta x$=0.009 (approx. 0.01) and $\Delta y$=0.017 (approx. 0.02) for the headlamp 50 of the present modified example 4 whereas $\Delta x$=0.025 and $\Delta y$=0.032 for the comparative headlamp.

As clearly understood from the above differences, the headlamp 50 of the present modified example 4 can form a light distribution pattern with less chromatic unevenness within a sufficiently small variation range from the 0-degree point (in front of the vehicle body) to the 30-degree point (left-side pedestrian way).

It should be noted that the chromaticity variation may depend on the individual specificity, but the chromaticity variation of the headlamp 50 of the present modified example 4 can be controlled between the measured point L4 (20 degrees leftward) and the measured point L0 (0 degrees) within the ranges of $\Delta x \leqq 0.002$ and $\Delta y \leqq 0.02$. Accordingly, the chromaticity variation within this range between 0 degrees and 20 degrees leftward may be sufficient for actual use.

Further, the chromaticity variation of the headlamp 50 of the present modified example 4 can be controlled between the measured point L6 (30 degrees leftward) and the measured point L0 (0 degrees) within the ranges of $\Delta x \leqq 0.001$ and $\Delta y \leqq 0.03$. At the same time, the chromaticity variation of the headlamp 50 of the present modified example 4 can be controlled between the measured point L2 (10 degrees leftward) and the measured point L0 (0 degrees) within the ranges of $\Delta x \leqq 0.01$ and $\Delta y \leqq 0.02$.

FIG. 80 also shows the black body locus, the isotemperature line, and the isanomal. The chromaticity (color correlated temperature) of the headlamp 50 of the present modified example 4 can be controlled to the range of 5000 K or more (and preferably 7000 K or less) within the white chromaticity range W. On the contrary thereto, the chromaticity of the comparative headlamp is approx. 5000 K or less (and 4000 K or more). Accordingly, the headlamp 50 of the present modified example 4 can emit white light closer to the bluish range than the case of the comparative headlamp. This difference may be caused by the difference of the chromaticity of the light source. It is determined that, since the headlamp 50 of the present modified example 4 can emit illumination light with the chromaticity, or correlated color temperature of 5000 K or more, colors of an object can be discriminated easier than the comparative headlamp, meaning that the headlamp 50 of the present modified example 4 can be superior in color rendering properties.

Headlamp Unit

Modified Example 5

A description will now be given of another modified example 5 derived from the light source units 50A to 50D of the headlamp 50 of the modified example 4 of FIG. 75, illustrating the embodiment that can prevent the occurrence of the color blurring (generation of unintended color separated illumination area Q) near the bright/dark boundary line CL.

Figure 85A:
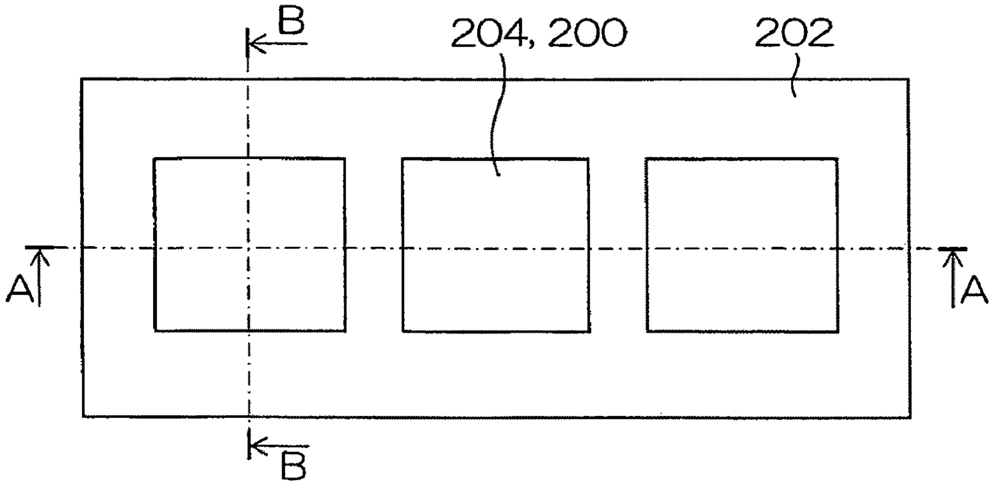
FIGS. 85A, 85B and 85C are a plan view, a cross sectional view taken along line B-B of FIG. 85A, and a cross sectional view taken along line A-A of FIG. 85A of the exemplary configuration of an LED light source, respectively.
Figure 85B:
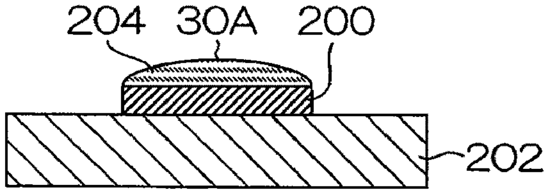
Figure 85C:
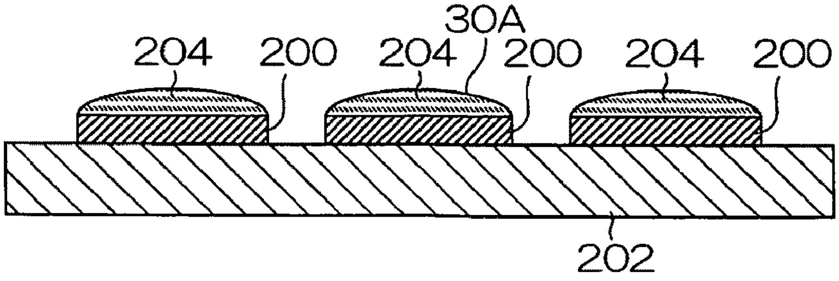

Specifically, the LED light source 51 with a different packaging configuration will be described. FIGS. 85A to 85C illustrate a package using the same LED chip as in those illustrated in FIGS. 84A to 84C. FIG. 85A is a plan view of the LED chip package, FIG. 85B is a cross sectional view taken along line B-B of FIG. 85A, and FIG. 85C is a cross sectional view taken along line A-A of FIG. 85A.

In FIGS. 85A to 85C, three InGaN-based LED chips 200 (the same as those used in FIGS. 84A to 84C) are arranged in line at predetermined intervals, and wavelength conversion layers 204 cover the respective top surfaces of the LED chips 200. The wavelength conversion layer 204 can be provided not at the side areas, but only on the top surface of the LED chip 200 in a convex shape. In order to form the wavelength conversion layer in a convex shape, a liquid light-transmitting resin material containing a wavelength conversion material dispersed therein can be used. The material is dropped on the top surface by dispensing method or the like, followed by the curing with the shape maintained by the surface tension.

In the previous modified example 4, a description was given of the case where the LED light source 51 of FIGS. 84A to 84C was used. When another headlamp utilizing the LED light source of FIGS. 85A to 85C instead of that of FIGS. 84A to 84C was used, almost the same results were obtained as in the case of the LED light source 51 of FIGS. 84A to 84C in terms of the color temperature and chromaticity. As in the previous modified example 4, this headlamp could suppress the chromatic unevenness of the illumination light.

The LED light source of FIGS. 85A to 85C may vary in its properties due to the variation in wavelength conversion layer thickness, concentration, position, and the like during its manufacturing processes, as in the case of FIGS. 84A to 84C. In addition, the LED chips may vary in emission intensity, and accordingly, the LED light source 51 having such an LED chip may vary in emission intensity. Even if the LED light source emits light with chromatic unevenness, the presently disclosed subject matter can reduce the chromatic unevenness of the illumination light by overlaying light beams from various light emitting points in the above-described manner.

Figure 82:
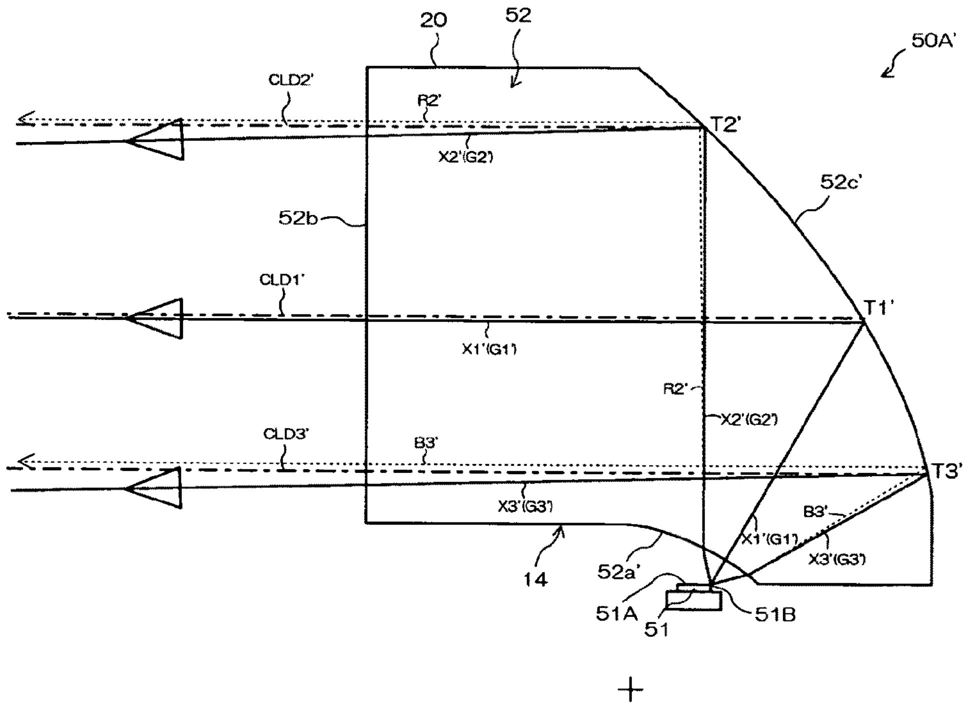
FIG. 82 is a vertical cross sectional view illustrating a lens body (modified example 5) for use in the vehicle light of FIG. 75.

FIG. 82 is a vertical cross sectional view illustrating the configuration of the modified example 5 of a light source unit 50A'. In the drawing, the same or similar components as or to those of the light source unit 50A' of the modified example 4 in FIG. 76 are denoted by the same reference numeral or that with prime ('). The light source unit 50A' of FIG. 82 has a different light incident surface 52*a*' from that of the light source unit 50A of FIG. 76. The light incident surface 52*a*' can be formed not by a flat plane, but by a concave surface. The other components can be composed as in the modified example 4, so that the partial light distribution pattern PA of FIG. 77 can be formed by the reflecting surface 52*c*' of the lens body 10.

For example, the light incident surface 52*a*' can be formed by a circular arc with a center away from the light emitting point 51B of the LED light source 51 (here, the circular arc has a larger radius of curvature than a circular arc that is formed by the light emitting point 51B as a center). The center of the circular arc can be set by connecting the light emitting point 51B and the position T1' of the reflecting surface 52*c*' near its center. Accordingly, the incident angle at the light incident surface 52*a*' can be smaller than the case of the light source unit 50A of the modified example 4, thereby suppressing the chromatic dispersion at the light incident surface 52*a*' due to refraction more than the modified example 4.

The shape of the reflecting surface 52*c*' can be designed by taking the chromatic dispersion occurring in the lens body 52 into consideration. The white light beams X1' among white light beams emitted from the light emitting point 51B in various directions can perpendicularly enter the light incident surface 52*a*' and cannot be subjected to refraction at the light incident surface 52*a*' and the light exiting surface 52*b*. The target projection direction is the angular direction to the bright/dark boundary line CL. Accordingly, the shape (position and inclination) of the reflecting surface 52*c*' at the position T1' can be formed so as to reflect the white light beams X1' (or green light beams G1') to the bright/dark boundary line CL along the optical path CLD1'.

On the other hand, the white light beams X2' and X3' can be subjected to refraction at the light incident surface 52*a*' due to certain incident angles with respect to the light incident surface 52*a*', and accordingly, the angular directions can be set lower than the target bright/dark boundary line CL depending on the magnitude of the chromaticity dispersion (color separation) due to the refraction. In this case, a constant standard refractive index is considered over the entire wavelengths of white light beams, and the shape of the reflecting surface 52*c*' can be designed so that the white light beams X2' and X3' (or green light beams G2' and G3') can be directed (reflected) to respective angular directions lower than the angular directions to the bright-dark boundary line CL (optical paths CLD2' and CLD3').

By this configuration, the chromatic dispersion at the light incident surface 52*a*' can be suppressed more than in the modified example 4. Accordingly, the color blurring above the bright/dark boundary line CL can be suppressed more, or alternatively, the generation of color blurring can be completely prevented. Taking this feature into consideration, the angular direction of the white light beams (green light beams) can be made smaller, resulting in less change in the shape of the reflecting surface 52*c*'. This means the adverse affect for the light distribution provided by other illumination area than the bright/dark boundary line CL can be suppressed.

It should be noted that the light incident surface 52*a*' may be an elliptic arc in cross section as long as it has a concave surface when viewed from the light emitting point 51B to obtain the same advantageous effects. When the light incident surface 52*c*' is formed to have a spherical surface with the light emitting point 51B as the center thereof, the light incident angle can be 0 degrees without refraction, meaning that the color separation cannot be occur with any incident angle. However, in this case, the light utilization efficiency can be maintained only when the reflecting surface is designed to be large enough to cover the light entering the spherical light incident surface. Accordingly, the lens body can be larger than the previous exemplary embodiments. In view of this, the convex curved surface may be the best choice in a well balanced manner between the light utilization efficiency of light beams emitted from the light emission surface 51A and the entire size of the lens body including the size of the reflecting surface 52*c*' so as to reduce the color dispersion. Furthermore, the radius of curvature of the light incident surface 52*a*' near the reflecting surface 52*c*' can be designed to be closer to the radius of curvature of a spherical surface with the light emitting point 51B as the center thereof.

Headlamp Unit

Modified Example 6

Figure 83:
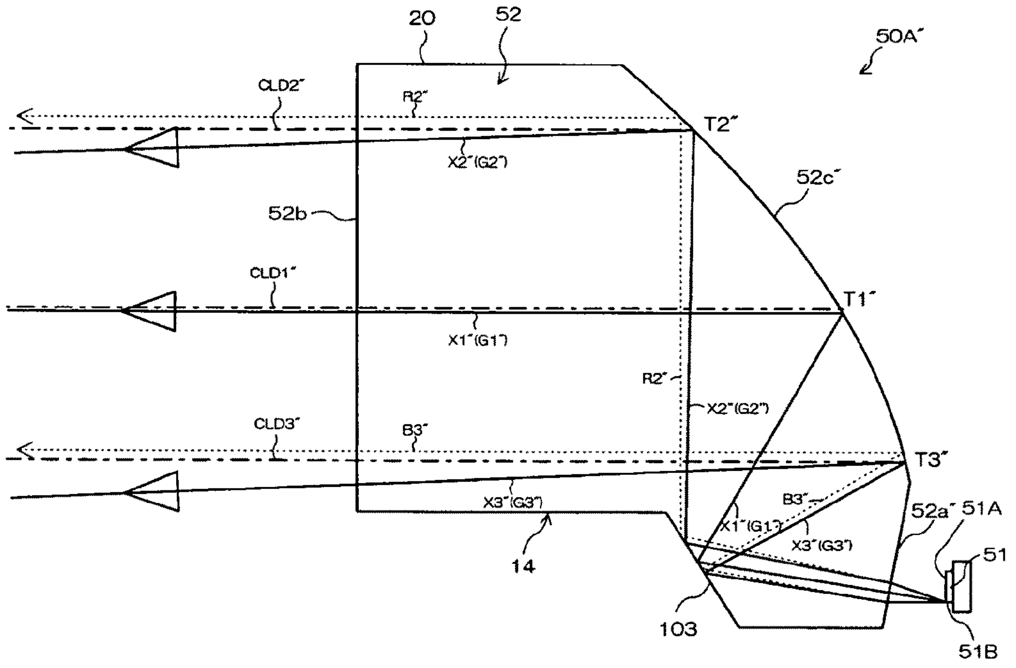
FIG. 83 is a vertical cross sectional view illustrating a lens body (modified example 6) for use in the vehicle light of FIG. 75.

FIG. 83 is a vertical cross sectional view illustrating the configuration of a modified example 6 of a light source unit 50A". In FIG. 83, the same or similar components as or to those of the light source unit 50A of the modified example 4 in FIG. 76 are denoted by the same reference numeral or that with double-prime ("). When compared with the light source unit 50A of FIG. 76, the light source unit 50A" of FIG. 83 can have a different configuration that guides the light beams emitted from the LED light source 51 to the reflecting surface 52*c*". In present modified example 6, the light incident surface 52*a*" can be formed on the rear side of the lens body 52 (near the rear side of the vehicle body) and the LED light source 51 can be disposed on the rear side of the lens body 52 with the light emitting surface 51A facing the front side of the vehicle body.

In this configuration, the light beams that are emitted from the LED light source 51 and enter the lens body 52 through light incident surface 52*a*" can be directed to the reflecting surface 52*c*" not directly, but via another reflecting surface 103. Namely, the light beams entering the lens body 52 can be projected through the light exiting surface 52*b* with two times reflection within the lens body 52. In the illustrated example, the reflecting surface 103 can be formed by depositing aluminum on an outer surface of the lens body 52 where to form the reflecting surface 103.

The light source unit 50A" with this configuration shown in FIG. 83 can prevent the occurrence of color blurring above the bright/dark boundary line CL as in the case of light source unit 50A of the modified example 4.

The shape of the reflecting surface 52*c*" can be designed by taking the chromatic dispersion occurring in the lens body 52 into consideration. The white light beams X1" among white light beams emitted from the light emitting point 51B in various directions can perpendicularly enter the light incident surface 52*a*" and cannot be subjected to refraction at the light incident surface 52*a*" and the light exiting surface 52*b*. The target projection direction is the angular direction to the bright/dark boundary line CL. Accordingly, the shape (position and inclination) of the reflecting surface 52*c*" at the position T1" can be formed so as to reflect the white light beams X1" (or green light beams G1") to the bright/dark boundary line CL along the optical path CLD1".

On the other hand, the white light beams X2" and X3" can be subjected to refraction at the light incident surface 52*a*" due to certain incident angles with respect to the light incident surface 52*a*", and accordingly, the angular directions can be set lower than the target bright/dark boundary line CL depending on the magnitude of the chromaticity dispersion (color separation) due to the refraction. In this case, a constant standard refractive index is considered over the entire wavelengths of white light beams, and the shape of the reflecting surface 52*c*" can be designed so that the white light beams X2" and X3" (or green light beams G2" and G3") can be directed (reflected) to respective angular directions lower than the angular directions to the bright/dark boundary line CL (optical paths CLD2" and CLD3").

The light source unit 50A" of the present modified example 6 can widen the selection degree of freedom for disposing the LED light source 51 with the plural reflecting surfaces (502*c*" and 103) for guiding the light beams within the lens body 52. Namely, the change of the positions of the light incident surface 52*a*" and the reflecting surface 103 can alter the position of the LED light source 51 from that shown in FIG. 83. Also in this case, the projection direction of green light beams (model light beams for white light beams assuming a constant refractive index) travelling through a refractive optical path can be set to lower than the angular direction of the bright/dark boundary line CL by the specific shape of the reflecting surface 52*c*" (namely, the basic shape can be corrected), thereby preventing the color blurring from being generated above the bright/dark boundary line CL.

In the modified example 6, the number of reflection in the lens body 52 is two followed by the exit through the light projecting surface 52*b*, but the presently disclosed subject matter is not limited to two. In other examples, the number of reflection in the lens body 52 may be three or more as long as the reflecting surface 52*c* and the like can be formed to prevent the color blurring from being generated above the bright/dark boundary line CL.

As in the modified example 4, the modified examples 5 and 6 can prevent the generation of chromatic unevenness near the boundary areas at left, right, and lower edges of the partial light distribution pattern.

In the modified examples 4 to 6, the non-refractive optical path through which light beams from the light emission point 51B of the LED light source 51 can travel without refraction in the lens body 52 is provided at approximate vertical center in the reflecting surface 52*c* (52*c*' and 52*c*"), but the presently disclosed subject matter is not limited to this. For example, the non-refractive optical path can be designed to be disposed near the upper most portion or lowermost portion of the reflecting surface 52*c* (52*c*' and 52*c*").

In the modified examples 4 to 6, the shape of the reflecting surface 52*c* (52*c*' and 52*c*") can be corrected from its basic shape, but the presently disclosed subject matter is not limited to this. Any action surface, namely, at least one surface selected from the group consisting of the light incident surface 52*a* (52*a*' and 52*a*"), the reflecting surface 52*c* (52*c*', 52*c*", and 103), and the light exiting surface 52*b* can be corrected from its corresponding basic shape.

In the modified examples 4 to 6, the basic configuration of the lens body 52 can be set to enlarge and project the image of the light emitting surface 51A of the LED light source 51 to the illumination area, but the presently disclosed subject matter is not limited to this. For example, the basic configuration of the lens body 52 in the light source unit 50A of the modified example 4 of FIG. 76 can be designed such that white light beams from the same light emitting point of the LED light source 51 in various directions can be dispersed in a wider illumination area, or that white light beams emitted from separate light emitting points can be mixed with each other to be overlaid on each other. By doing so, even when the color separation occurs in white light beam passing through a refractive optical path, not the color separated light beams in a similar mode, but the light beams color separated in various manners from respective optical paths can be mixed together. Accordingly, the chromatic unevenness of the illumination light beams can be suppressed more effectively (the chromatic unevenness includes that due to the chromatic unevenness of the LED light source 51), resulting in the decrease of the correction amount from the basic shape.

In this case, the basic shape of the lens body 52 may be such that the white light beams emitted from the rearmost end light emitting point 51B of the LED light source 51 can be directed to the bright/dark boundary line CL while the white light beams emitted from the foremost end light emitting point of the LED light source 51 can be directed to the lower edge of the partial light distribution pattern PA. The basic shape of the lens body 52 can be designed such that the white light beams emitted from the foremost end light emitting point of the LED light source 51 may also be directed to the areas other than the lower edge of the partial light distribution pattern PA with the areas needing to be brighter (for example, near the upper edge).

In alternative modified example, the reflecting surface and the like of the lens body 52 can be formed of a plurality of divided reflection areas including those for directing and spreading white light beams in a horizontal direction (vertically narrow areas) and those for directing and spreading white light beams in a vertical direction (horizontally narrow areas) wherein these areas are disposed in a zigzag fashion. In this manner, the white light beams from the near-by light emitting points of the LED light source 51 can be projected to different areas and/or the white light beams from the separated light emitting points can be projected to the same areas for mixing. It should be noted that a plurality of light source units can form a single light distribution pattern by controlling the light distribution within a single light source unit or in conjunction with other light source units.

The light source unit of the modified examples 4 to 6 can have a lens body 52 formed of polycarbonate or other material including glass, acrylic resin, and the like. Even when a material that generate chromatic dispersion is employed, the presently disclosed subject matter can be applied to these cases to prevent the chromatic unevenness.

In the light source unit of the modified examples 4 to 6, the polycarbonate material is used. In this case, the birefringence of the polycarbonate material may generate blurring of the bright/dark boundary. However, the presently disclosed subject matter can not only prevent the chromatic unevenness of illumination light, but also reduce such blurring of the bright/dark boundary due to birefringence of the polycarbonate material. For example, when using a polycarbonate material, a residual stress is large after molding, and the molded article may have a birefringence due to the photoelasticity of the material. The birefringence may affect the light beams emitted from the light emission point 51B of the LED light source 51 and entering the light incident surface 52*a* (52*a*' and 52*a*") obliquely, so that the light beams may be separated in a plurality of directions. When ignoring this birefringence and considering the simple designing with a constant standard refractive index for white light beams (or green light beams), the light beams separated due to the birefringence can generate blurring of the bright/dark boundary.

Even in this case, according to the modified examples 4 to 6 the specific design in which the light beams color separated as described above can be directed in certain angular directions within the light distribution pattern below the bright/dark boundary line. Accordingly, this can surely suppress the blurring due to the birefringence.

In the modified examples 4 to 6, the shape of the light exiting surface 52*b* is a flat plane and light beams reflected from the reflecting surface 52*c* (52*c*' and 52*c*") are not subject to refraction by the light exiting surface 52*b*. However, even if the basic shape of the light exiting surface 52*b* is not a flat plane and light beams are subjected to refraction by the light exiting surface 52*b*, the presently disclosed subject matter can be applied to this case to obtain the specific advantageous effects.

Namely, any one of light incident surface, reflecting surface and light exiting surface can be formed to correct light beams having been color separated through the refractive optical path at any of the light incident surface 52*a* (52*a*' and 52*a*") and the light exiting surface 52*b* so that the corrected light beams can be overlaid on other light beams within the desired light distribution pattern.

The headlamp of any of the modified examples is not only applied to a low beam headlamp, but also a high beam headlamp, a fog lamp, a signal lamp, and other various vehicle lights.

As described above, according to the modified examples 4 to 6, the light beams emitted from the edge 51B of the LED light source 51 can be mixed with other light beams from the points other than the edge 51B of the LED light source 51. Accordingly, even when chromatic unevenness may occur in the partial light distribution pattern PA due to the light beams from the edge 51B of the LED light source 51, such chromatic unevenness can be prevented or suppressed effectively.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A vehicle light configured to project light beams with a predetermined white color, comprising:

a light source with a color temperature range of 4500 K to 7000 K, the light source configured to emit light beams including four color light beams represented by four coordinate values of predicted colors including red, green, blue and yellow in the a* b* coordinate system corresponding to the CIE 1976 L*a*b* color space, the four coordinate values in the a* b* coordinate system being encompassed by respective circle areas having a radius of 5 and each having center coordinate values of (41.7, 20.9) for red, (−39.5, 14.3) for green, (8.8, −29.9) for blue and (−10.4, 74.2) for yellow.

2. The vehicle light according to claim 1, wherein the color temperature range is from 5000 K to 6000 K.

3. The vehicle light according to claim 1, wherein the predetermined white color is defined within a color range surrounded by lines connecting coordinate values of (0.31, 0.28), (0.44, 0.38), (0.50, 0.38), (0.50, 0.44), (0.455, 0.44), and (0.31, 0.35) in the xy color coordinate system.

4. The vehicle light according to claim 2, wherein the predetermined white color is defined within a color range surrounded by lines connecting coordinate values of (0.31, 0.28), (0.44, 0.38), (0.50, 0.38), (0.50, 0.44), (0.455, 0.44), and (0.31, 0.35) in the xy color coordinate system.

5. The vehicle light according to claim 1, wherein the predetermined white color is defined within a color range surrounded by lines connecting coordinate values of (0.323, 0.352), (0.325, 0.316), (0.343, 0.331), and (0.368, 0.379) in the xy color coordinate system.

6. The vehicle light according to claim 2, wherein the predetermined white color is defined within a color range surrounded by lines connecting coordinate values of (0.323, 0.352), (0.325, 0.316), (0.343, 0.331), and (0.368, 0.379) in the xy color coordinate system.

7. The vehicle light according to claim 1, wherein the light source is an LED light source.

8. The vehicle light according to claim 7, wherein the LED light source is a white LED light source having at least one of a blue light emitting device and an ultraviolet light emitting device, and a wavelength conversion material.

9. A vehicle light comprising a plurality of optical units, each of the optical units including an LED light source configured to project light beams with a predetermined white color, each of the optical units configured to form a partial light distribution pattern of a low beam light distribution pattern, wherein each of the optical units includes a first optical unit and a second optical unit, with the first optical unit being configured to converge the light beams substantially at an intersection of a horizontal line and a vertical line in a virtual light distribution plane so as to form a hot zone light distribution pattern including an elbow line, and with the second optical unit being configured to form a diffusion light distribution pattern overlaid on the hot zone light distribution pattern and diffused in a horizontal direction, wherein the LED light source has a color temperature range of 4500 K to 7000 K, and emits light beams including four color light beams represented by four coordinate values of predicted colors including red, green, blue and yellow in the a* b* coordinate system corresponding to the CIE 1976 L*a*b* color space, the four coordinate values in the a* b* coordinate system being encompassed by respective circle areas having a radius of 5 and each having center coordinate values of (41.7, 20.9) for red, (−39.5, 14.3) for green, (8.8, −29.9) for blue and (−10.4, 74.2) for yellow.

10. The vehicle light according to claim 9, wherein the color temperature range is from 5000 K to 6000 K.

11. The vehicle light according to claim 9, wherein each of the plurality of optical units includes a third optical unit and a fourth optical unit, with the third optical unit being configured to form a middle diffusion light distribution pattern that is horizontally diffused to a certain degree smaller than a horizontal diffusion for the diffusion light distribution pattern and overlaps the hot zone and diffusion light distribution patterns and with the fourth optical unit being configured to form a large diffusion light distribution pattern that is horizontally diffused to a certain degree larger than the horizontal diffusion for the diffusion light distribution pattern and overlaps the hot zone, diffusion, and middle diffusion light distribution patterns.

12. The vehicle light according to claim 10, wherein each of the plurality of optical units includes a third optical unit and a fourth optical unit, with the third optical unit being configured to form a middle diffusion light distribution pattern that is horizontally diffused to a certain degree smaller than a horizontal diffusion for the diffusion light distribution pattern and overlaps the hot zone and diffusion light distribution patterns, and with the fourth optical unit being configured to form a large diffusion light distribution pattern that is horizontally diffused to a certain degree larger than horizontal diffusion for the diffusion light distribution pattern and overlaps the hot zone, diffusion, and middle diffusion light distribution patterns.

13. The vehicle light according to claim 9, wherein the plurality of optical units each have light emission areas arranged adjacent to each other in a width direction of a vehicle body so that the light emission areas are not adjacent to each other in a vertical direction when viewed from a front side of the vehicle light.

14. The vehicle light according to claim 10, wherein the plurality of optical units each have light emission areas arranged adjacent to each other in a width direction of a vehicle body so that the light emission areas are not adjacent to each other in a vertical direction when viewed from a front side of the vehicle light.

15. The vehicle light according to claim 11, wherein the plurality of optical units each have light emission areas arranged adjacent to each other in a width direction of a vehicle body so that the light emission areas are not adjacent to each other in a vertical direction when viewed from a front side of the vehicle light.

16. The vehicle light according to claim 9, wherein the plurality of optical units are disposed such that an optical unit with a larger horizontal diffusion is arranged at a more sideward and more rearward position and the optical unit at a more sideward position is inclined sideward by a larger angle with respect to a standard axis extending in a front to rear direction of a vehicle body.

17. The vehicle light according to claim 11, wherein the plurality of optical units are disposed such that an optical unit with a larger horizontal diffusion is arranged at a more sideward and more rearward position and the optical unit at a more sideward position is inclined sideward by a larger angle with respect to a standard axis extending in a front to rear direction of a vehicle body.

18. The vehicle light according to claim 13, wherein the plurality of optical units are disposed such that the optical unit with a larger horizontal diffusion is arranged at a more sideward and more rearward position and the optical unit at a more sideward position is inclined sideward by a larger angle with respect to a standard axis extending in a front to rear direction of the vehicle body.

19. The vehicle light according to claim 9, wherein the predetermined white color is defined within a color range surrounded by lines connecting coordinate values of (0.31, 0.28), (0.44, 0.38), (0.50, 0.38), (0.50, 0.44), (0.455, 0.44), and (0.31, 0.35) in the xy color coordinate system.

20. The vehicle light according to claim 9, wherein the predetermined white color is defined within a color range surrounded by lines connecting coordinate values of (0.323, 0.352), (0.325, 0.316), (0.343, 0.331), and (0.368, 0.379) in the xy color coordinate system.

21. The vehicle light according to claim 9, wherein the LED light source is a white LED light source having at least one of a blue light emitting device and an ultraviolet light emitting device, and a wavelength conversion material.

22. A vehicle light comprising an optical unit which is configured to project light beams with a predetermined white color, the optical unit being configured to form a partial light distribution pattern of a low beam light distribution pattern, wherein the optical unit includes an LED light source having at least one side, a solid lens body having a light incident surface through which light beams emitted from the LED light source enter the lens body, a light exiting surface, and a light reflecting surface by which the entering light beams can be reflected toward the light exiting surface so as to form the partial light distribution pattern having a bright/dark boundary line, wherein the light reflecting surface includes a first reflecting area, a second reflecting area, and a third reflecting area, the first reflecting area configured to reflect light beams at a standard wavelength that have been emitted from adjacent the one side of the LED light source and correspond to light beams for forming the bright/dark boundary line which have entered the lens body through the light incident surface perpendicular with respect to the light incident surface and without being subjected to refraction so as to form the bright/dark boundary line, the second reflecting area configured to reflect part of the light beams that have been emitted from the one side of the LED light source and correspond to the light beams for forming the bright/dark boundary line and that have entered the lens body through the light incident surface by a certain incident angle other than 90 degrees with respect to the light incident surface with the light beams being subjected to refraction according to light incident angle and which have wavelengths longer than the standard wavelength so as to distribute the light beams on or below the bright/dark boundary line, the third reflecting area configured to reflect part of the light beams that have been emitted from one side of the LED light source and correspond to the light beams for forming the bright/dark boundary line and that have entered the lens body through the light incident surface by another certain incident angle other than 90 degrees with respect to the light incident surface with the light beams being subjected to refraction according to the another light incident angle and which have wavelengths shorter than the standard wavelength so as to distribute the light beams on or below the bright/dark boundary line, and the LED light source has a color temperature range of 4500 K to 7000 K, and is configured to emit light beams including four color light beams represented by four coordinate values of predicted colors including red, green, blue and yellow in the a* b* coordinate system corresponding to the CIE 1976 L*a*b* color space, the four coordinate values in the a* b* coordinate system being encompassed by respective circle areas having a radius of 5, and each having center coordinate values of (41.7, 20.9) for red, (−39.5, 14.3) for green, (8.8, −29.9) for blue and (−10.4, 74.2) for yellow.

23. The vehicle light according to claim 22, wherein the color temperature range is from 5000 K to 6000 K.

24. The vehicle light according to claim 22, wherein the second reflecting area is configured to reflect the light beams that have wavelengths longer than the standard wavelength so as to distribute the light beams on the bright/dark boundary line or within the light distribution pattern, and the third reflecting area is configured to reflect the light beams that have wavelengths shorter than the standard wavelength so as to distribute the light beams on the bright/dark boundary line or within the light distribution pattern.

25. The vehicle light according to claim 23, wherein the second reflecting area is configured to reflect the light beams that have wavelengths longer than the standard wavelength so as to distribute the light beams on the bright/dark boundary line or within the light distribution pattern, and the third reflecting area is configured to reflect the light beams that have wavelengths shorter than the standard wavelength so as to distribute the light beams on the bright/dark boundary line or within the light distribution pattern.

26. The vehicle light according to claim 22, wherein the light reflecting surface is configured such that light beams emitted from edges of the LED light source are projected from the light exiting surface and distributed on the bright/dark boundary line and within the light distribution pattern, and the light beams emitted from the edges of the LED light source are overlaid on light beams emitted from an other light emission area of the LED light source other than the edges.

27. The vehicle light according to claim 23, wherein the light reflecting surface is configured such that light beams emitted from edges of the LED light source are projected from the light exiting surface and distributed on the bright/dark boundary line and within the light distribution pattern, and the light beams emitted from the edges of the LED light source are overlaid on light beams emitted from an other light emission area of the LED light source other than the edges.

28. The vehicle light according to claim 24, wherein the light reflecting surface is configured such that light beams emitted from edges of the LED light source are projected from the light exiting surface and distributed on the bright/dark boundary line and within the light distribution pattern, and the light beams emitted from the edges of the LED light source are overlaid on light beams emitted from an other light emission area of the LED light source other than the edges.

29. The vehicle light according to claim 22, wherein the predetermined white color is defined within a color range surrounded by lines connecting coordinate values of (0.31, 0.28), (0.44, 0.38), (0.50, 0.38), (0.50, 0.44), (0.455, 0.44), and (0.31, 0.35) in the xy color coordinate system.

30. The vehicle light according to claim 22, wherein the predetermined white color is defined within a color range surrounded by lines connecting coordinate values of (0.323, 0.352), (0.325, 0.316), (0.343, 0.331), and (0.368, 0.379) in the xy color coordinate system.

31. The vehicle light according to claim 22, wherein the LED light source is a white LED light source having at least one of a blue light emitting device and an ultraviolet light emitting device and a wavelength conversion material.

* * * * *